United States Patent
Bladd-Symms et al.

(10) Patent No.: US 11,627,787 B2
(45) Date of Patent: Apr. 18, 2023

(54) PROTECTIVE CASE OR COVER

(71) Applicant: Paua Trading Limited, Chichester (GB)

(72) Inventors: Peter Bladd-Symms, Chichester (GB); Michael Titley, Chichester (GB)

(73) Assignee: Paua Trading Limited, Chichester (GB)

( * ) Notice: Subject to any disclaimer, the term of this patent is extended or adjusted under 35 U.S.C. 154(b) by 813 days.

(21) Appl. No.: 16/608,347

(22) PCT Filed: Apr. 27, 2018

(86) PCT No.: PCT/GB2018/051132
§ 371 (c)(1),
(2) Date: Oct. 25, 2019

(87) PCT Pub. No.: WO2018/197899
PCT Pub. Date: Nov. 1, 2018

(65) Prior Publication Data
US 2020/0187610 A1      Jun. 18, 2020

(30) Foreign Application Priority Data

Apr. 27, 2017  (GB) ..................... 1706749
Jun. 7, 2017   (GB) ..................... 1709087

(51) Int. Cl.
*A45C 7/00*    (2006.01)
*B32B 5/26*    (2006.01)
(Continued)

(52) U.S. Cl.
CPC .......... *A45C 7/0077* (2013.01); *A44B 11/065* (2013.01); *A45C 7/0036* (2013.01);
(Continued)

(58) Field of Classification Search
CPC ... A45C 7/0077; A45C 7/0036; A45C 7/0086; A45C 13/103; A45C 13/26; B32B 3/26
See application file for complete search history.

(56) References Cited

U.S. PATENT DOCUMENTS

| | | |
|---|---|---|
| 4,210,230 A | 7/1980 | Weiner |
| 4,719,952 A | 1/1988 | Geronimo |

(Continued)

FOREIGN PATENT DOCUMENTS

| | | |
|---|---|---|
| CN | 1051496 | 5/1991 |
| CN | 2105890 | 6/1992 |

(Continued)

OTHER PUBLICATIONS

Office Action (Notice of Allowance and Fees Due (PTOL-85)) dated Apr. 19, 2022 for U.S. Appl. No. 17/330,397 (pp. 1-3).

(Continued)

*Primary Examiner* — Sue A Weaver

(57) ABSTRACT

Case for containing an item and method of manufacture comprising: a first panel having a perimeter edge and at least one hinge for folding the first panel. A second panel having a perimeter edge and at least one hinge for folding the second panel. A side panel. A first fastener configured to attach the side panel to the perimeter edge of the first panel. A second fastener configured to attach the side panel to the perimeter edge of the second panel. Method of manufacture of a layered material comprising the steps of: placing a substrate between a first and a second layer of self-reinforced polypropylene (srPP). Bonding the layers of srPP and substrate by: stitching, or riveting through the first layer of srPP, the substrate and the second layer of srPP; or gluing the first layer of srPP, the substrate and the second layer of srPP together.

20 Claims, 47 Drawing Sheets

(51) Int. Cl.
| | | |
|---|---|---|
| *D03D 15/20* | (2021.01) | |
| *A44B 11/06* | (2006.01) | |
| *B32B 3/26* | (2006.01) | |
| *B32B 5/02* | (2006.01) | |
| *B32B 5/12* | (2006.01) | |
| *B32B 27/32* | (2006.01) | |
| *A45C 3/00* | (2006.01) | |
| *A45C 13/10* | (2006.01) | |
| *A45C 13/26* | (2006.01) | |

(52) U.S. Cl.
CPC ............... *B32B 3/26* (2013.01); *B32B 5/028* (2013.01); *B32B 5/12* (2013.01); *B32B 5/262* (2021.05); *B32B 27/32* (2013.01); *D03D 15/20* (2021.01); *A45C 3/00* (2013.01); *A45C 7/0086* (2013.01); *A45C 13/103* (2013.01); *A45C 13/26* (2013.01); *A45C 2003/007* (2013.01); *B32B 2260/021* (2013.01); *B32B 2262/0253* (2013.01); *B32B 2262/0269* (2013.01); *B32B 2439/46* (2013.01)

(56) References Cited

U.S. PATENT DOCUMENTS

| | | |
|---|---|---|
| 4,781,278 A | 11/1988 | Sadow |
| 4,929,094 A | 5/1990 | Becker |
| 5,344,056 A | 9/1994 | Challoner |
| 5,394,913 A | 3/1995 | Zezza, Jr. |
| 5,620,069 A | 4/1997 | Hurwitz |
| 6,210,037 B1 | 4/2001 | Brandon, Jr. |
| 6,244,399 B1 | 6/2001 | Birkestrand |
| 8,912,105 B2 | 12/2014 | Böttger |
| 9,155,359 B1 | 10/2015 | Bailey |
| 9,846,323 B2 | 12/2017 | Kim |
| 10,882,590 B2 | 1/2021 | Bladd-Symms |
| 11,330,877 B2 | 5/2022 | Bladd-Symms |
| 2002/0104725 A1 | 8/2002 | Dexheimer |
| 2003/0102361 A1 | 6/2003 | Terashima |
| 2003/0201198 A1 | 10/2003 | Gantert |
| 2005/0218171 A1 | 10/2005 | Bellerive |
| 2005/0279797 A1 | 12/2005 | Martin |
| 2007/0296117 A1 | 12/2007 | Taeye |
| 2009/0032153 A1 | 2/2009 | Burnett |
| 2009/0165193 A1 | 7/2009 | Michel |
| 2009/0183301 A1 | 7/2009 | Brown |
| 2012/0196104 A1 | 8/2012 | Yeh |
| 2013/0087424 A1 | 4/2013 | Pratt |
| 2013/0134058 A1 | 5/2013 | Boyles |
| 2013/0140120 A1 | 6/2013 | Rasmussen |
| 2014/0065335 A1 | 3/2014 | Chen |
| 2014/0202814 A1 | 7/2014 | Collins |
| 2014/0339109 A1 | 11/2014 | Van Emden |
| 2015/0010525 A1 | 1/2015 | Wells |
| 2015/0122677 A1 | 5/2015 | Norrie |
| 2015/0175310 A1 | 6/2015 | Lassoff |
| 2015/0197320 A1 | 7/2015 | Ventura |
| 2015/0230571 A1 | 8/2015 | Godshaw |
| 2016/0083055 A1 | 3/2016 | Coleman |
| 2016/0113366 A1 | 4/2016 | Sijmons |
| 2017/0042302 A1 | 2/2017 | Farrelly |
| 2017/0318626 A1 | 11/2017 | Kazemi |
| 2021/0114696 A1 | 4/2021 | Bladd-Symms |
| 2021/0274902 A1 | 9/2021 | Bladd-Symms |
| 2021/0274903 A1 | 9/2021 | Bladd-Symms |
| 2022/0079312 A1 | 3/2022 | Bladd-Symms |

FOREIGN PATENT DOCUMENTS

| | | |
|---|---|---|
| CN | 1071064 | 4/1993 |
| CN | 101486404 A | 7/2009 |
| CN | 103112224 | 5/2013 |
| CN | 203246156 | 10/2013 |
| CN | 104323554 | 2/2015 |
| CN | 204994805 | 1/2016 |
| CN | 105566744 | 5/2016 |
| EP | 0 199 993 | 11/1986 |
| EP | 1852938 | 11/2007 |
| FR | 2867986 | 9/2005 |
| FR | 2886273 | 12/2006 |
| FR | 2903579 | 1/2008 |
| GB | 2018580 | 10/1979 |
| GB | 2236174 | 3/1991 |
| JP | H03120468 | 5/1991 |
| JP | 2002199921 | 7/2002 |
| JP | 2008502503 | 1/2008 |
| NL | 1029570 | 1/2007 |
| WO | 2005123369 | 12/2005 |
| WO | 2011/029223 | 3/2011 |
| WO | 2013150472 | 10/2013 |
| WO | 2015/108775 | 7/2015 |
| WO | 2015110667 | 7/2015 |
| WO | 2016/044184 | 3/2016 |
| WO | 2016112987 | 7/2016 |
| WO | 2017/068369 | 4/2017 |

OTHER PUBLICATIONS

Office Action (Notice of Allowance and Fees Due (PTOL-85)) dated May 9, 2022 for U.S. Appl. No. 17/330,392 (pp. 1-6).
Office Action dated Oct. 5, 2021 for U.S. Appl. No. 17/330,397 (pp. 1-12).
Office Action forCN201880042766.2 dated Sep. 8, 2021.
UKIPO Search Report for Application No. GB1706749.7 (dated Oct. 26, 2017).
UKIPO Search Report for Application No. GB1709087.6 (dated Oct. 18, 2017).
ISR & Written Opinion for PCT/GB2018/051132 (dated Sep. 21, 2018).
Morgan et al., "Self reinforced polymer composites: coming of age", ICCM17, Jul. 27, 2009.
Cabrera et al., Filament Winding of Co-Extruded Polypropylene Tapes for Fully Recyclable All-Polypropylene Composite Products, Appl Comps Matter (Apr. 4, 2008).
Kmetty et al., "Self-reinforced polymeric materials: A review", Progress in Polymer Science (2010).
Notice of Allowance dated Nov. 30, 2021 for U.S. Appl. No. 17/330,392 (pp. 1-9).
Office Action (Notice of Allowance and Fees Due (PTOL-85)) dated Jan. 26, 2022 for U.S. Appl. No. 17/330,397 (pp. 1-9).
Office Action (Notice of Allowance and Fees Due (PTOL-85)) dated Dec. 15, 2021 for U.S. Appl. No. 17/330,392 (pp. 1-2).
Soldier Systems Blog Entry, "Sneak Peek—Dyneema Tegris Kit System Ripper" by Honorpoint USA, posted Dec. 6, 2017, https://soldiersystems.net/2017/12/06/sneak-peek-dyneema-tegris-kit-system-ripper-by-honopoint-usa/ (accessed Mar. 3, 2022) (7 pages).
CN Office Action in Patent Application 201680074042.7 (dated Sep. 17, 2020) (16 pages).
EPO Search Report for Application No. 16787544 (dated Feb. 24, 2021) (4 pages).
JP Office Action in Patent Application 2018-540228 (dated Oct. 6, 2020) (11 pages).
Extended European search report for Application 22194107.3 (dated Jan. 3, 2023) (9 pages).
Office Action (Notice of Allowance and Fees Due (PTOL-85)) dated Oct. 13, 2022 for U.S. Appl. No. 17/125,964 (pp. 1-5).

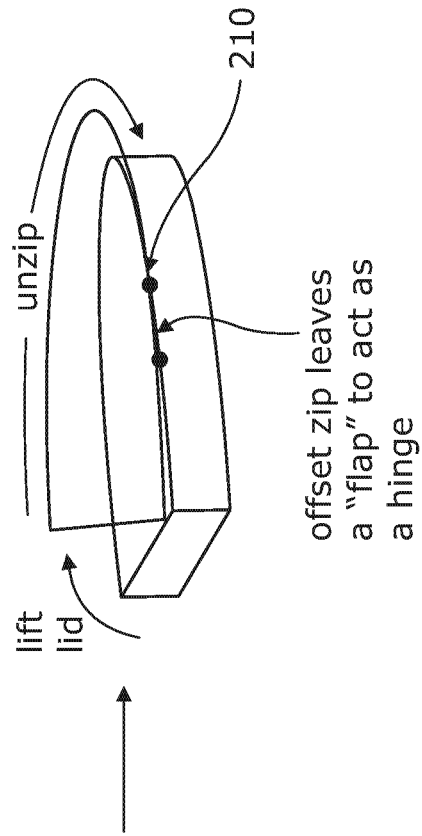
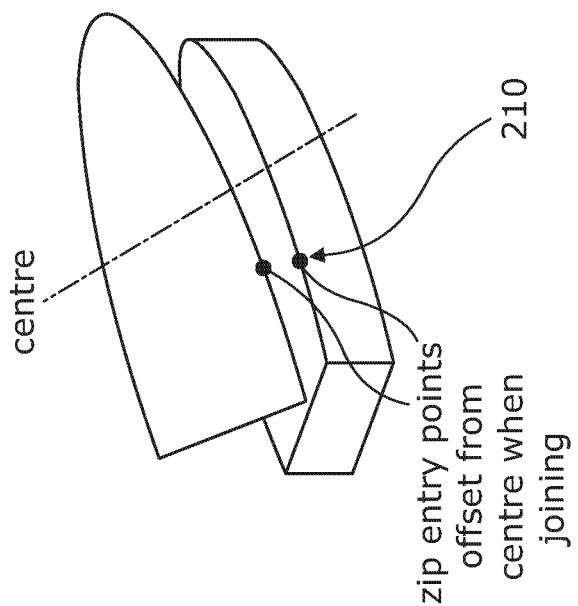
FIGURE 2B
FIGURE 2A

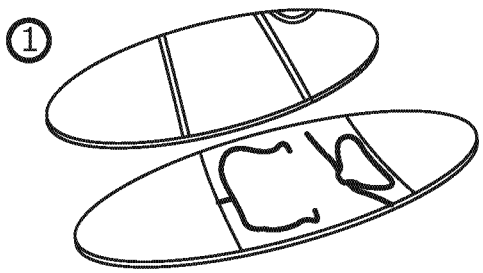
Top and bottom sections
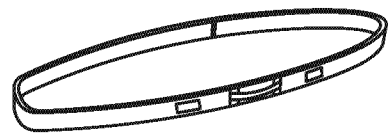
1 x sidewall for 2 board bag
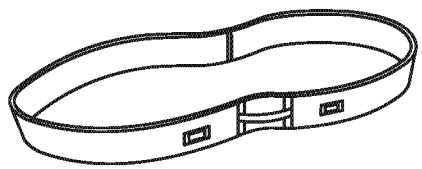
1 x sidewall for 4 board bag
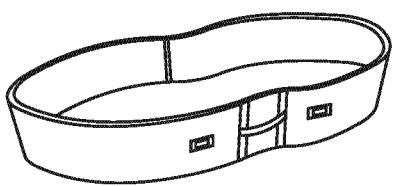
1 x sidewall for 8 board bag
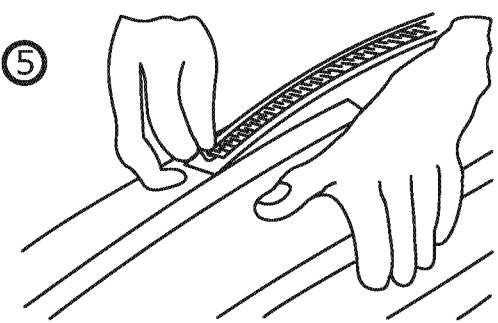
Attach the zip between the required sidewall depth and the bottom section
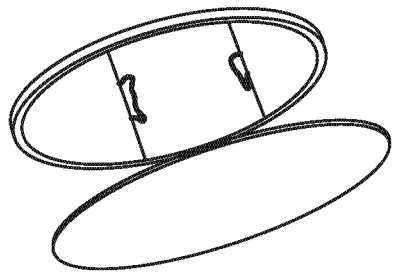
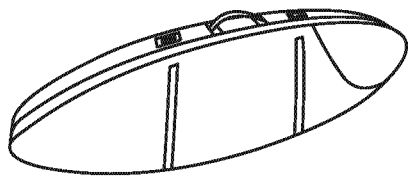
Complete Bag - 6'0" double
FIGURE 6

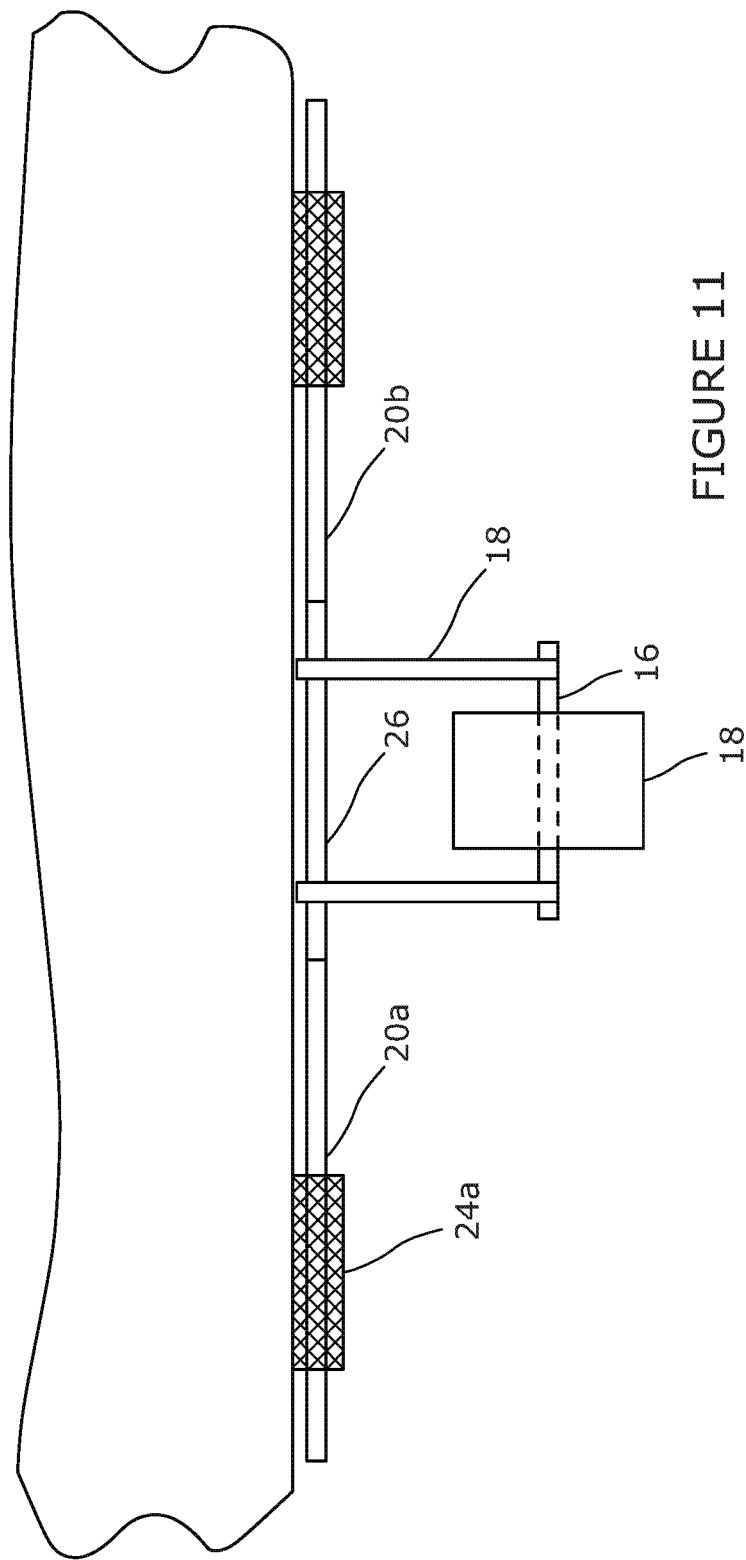

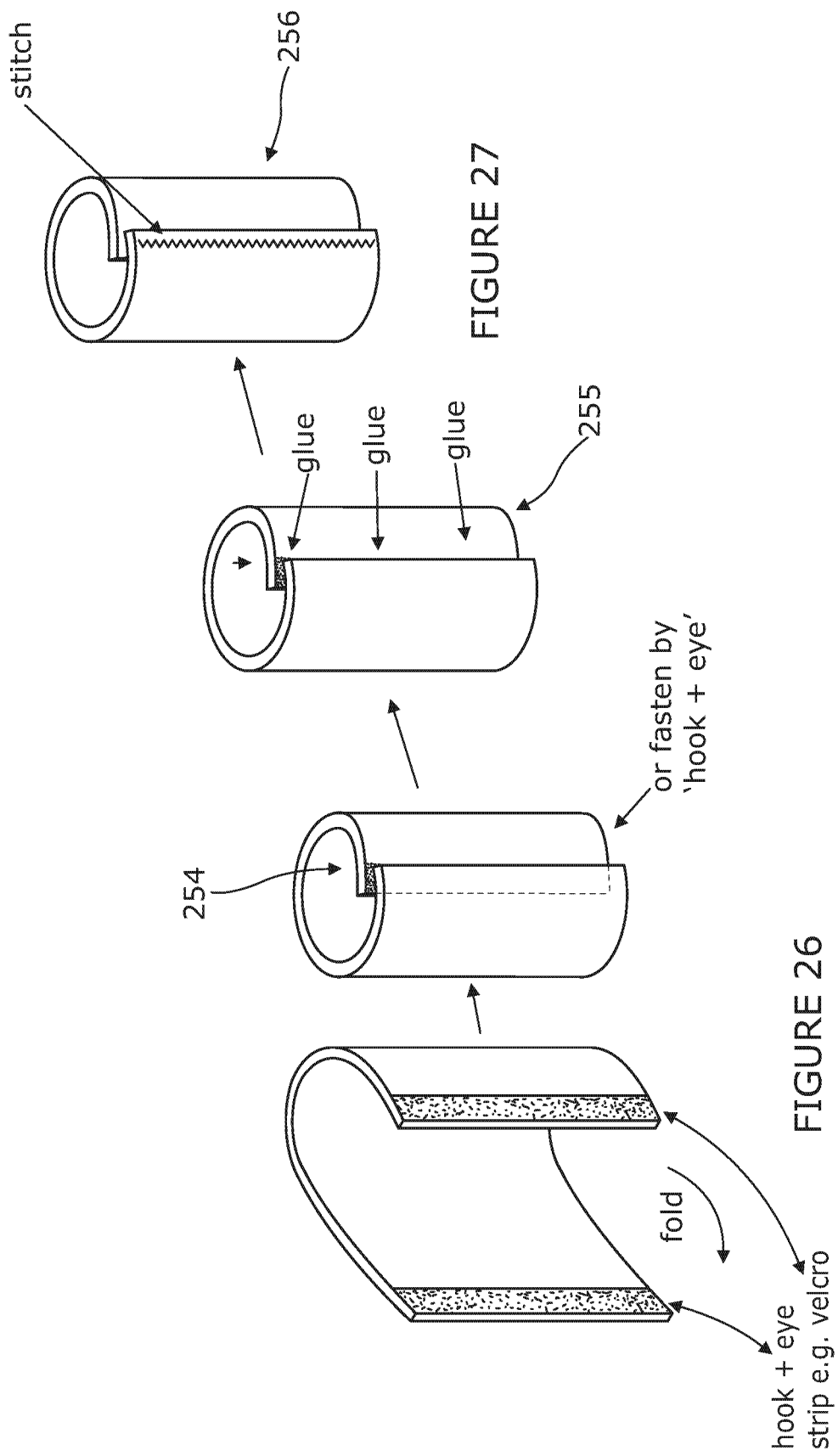

Military pouches etc eg radio pack radio radio holder / case / pouch for belt

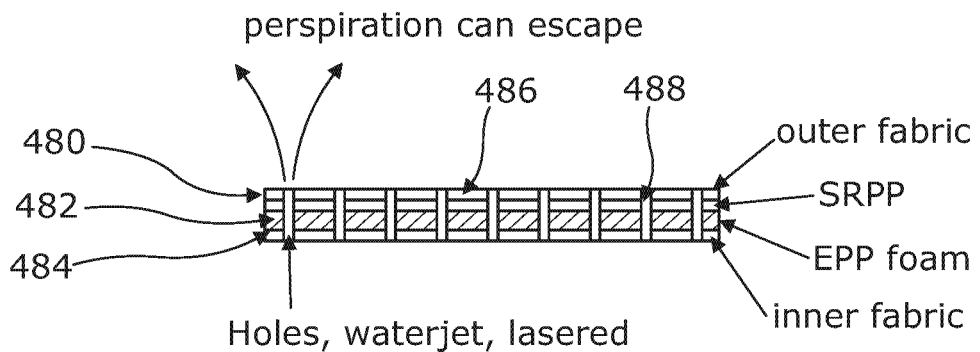
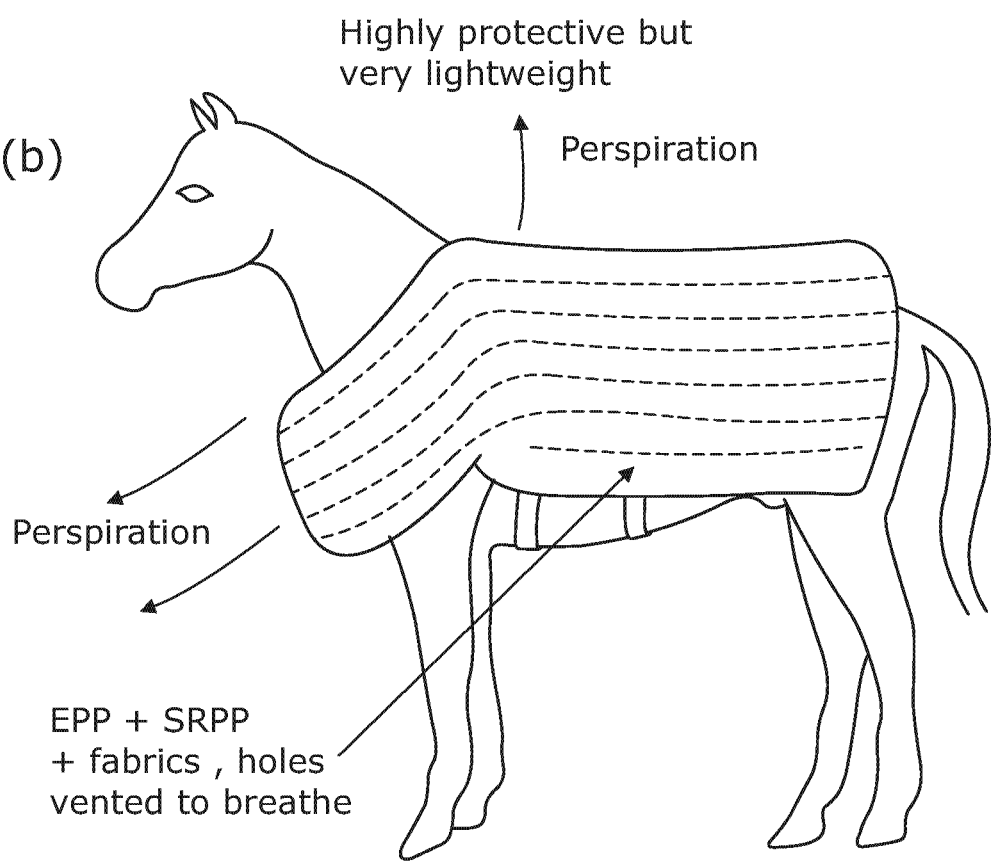
FIGURE 48

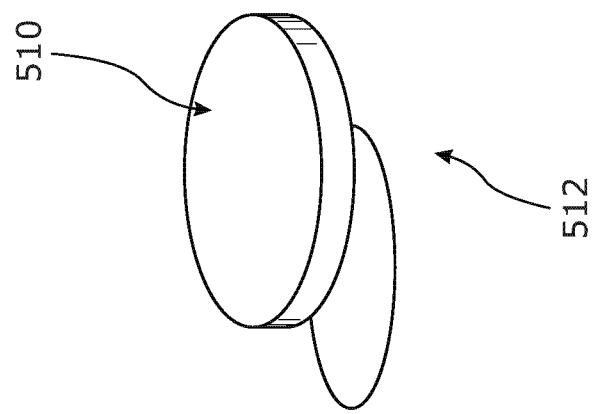
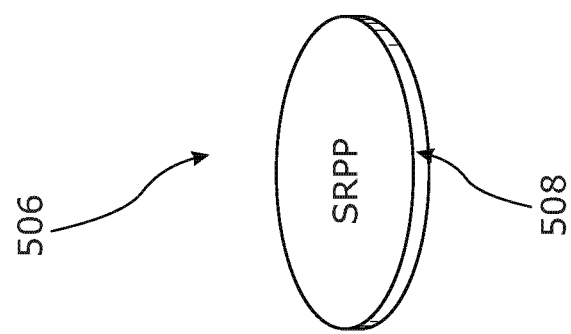
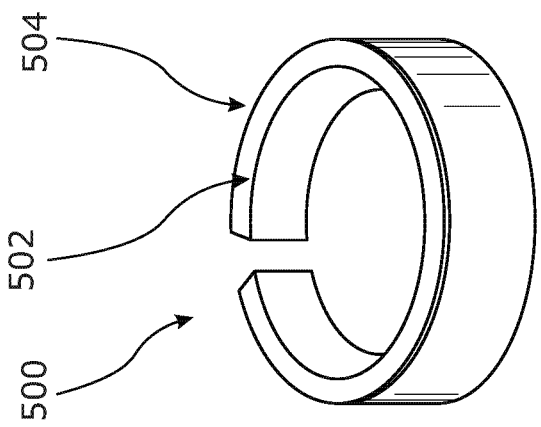
FIGURE 50

PROTECTIVE CASE OR COVER

FIELD OF THE INVENTION

The invention relates to a cover or case for goods, in particular for use as a cover or case for hobby or sports equipment. The cover or case may be used for transportation or storage of goods, including medical, military, emergency services, aeronautical and construction equipment. In some examples, the cover or case may be especially suitable for use as a cover or case for specialised sports equipment such as a board used in sports such as a surfboard, windsurfing board, paddle board, rowing equipment, skis, a snowboard, or for bicycles such as road cycling bicycles and mountain bicycles, or for fishing equipment (such as rods and reels). However, some examples of the case may be suitable for containing other hobby equipment, such as types of sports equipment, musical equipment, photography equipment, computer equipment, audiovisual equipment, fine art pictures or items, monitors, motorbike accessories, drones or dinghy covers.

In some examples, the cover can be adjusted in order to conform to the dimensions of the sports equipment or board. Therefore, the cover is particularly useful to accommodate different sizes and shapes of sports equipment or boards (or other equipment or goods) or be used to pack the cover or case for storage.

The invention relates to reinforcement members that may be used in various applications, including covers or cases for goods (e.g. for hobby, utility, military, emergency service or sports equipment). Other items include straps and buckles formed from srPP (self-reinforced polypropylene), or protective equipment for horses, dogs, military or emergency services headwear, hats or helmets.

BACKGROUND OF THE INVENTION

Increasing travel by individuals, for instance by plane and other modes of public transport, and increased interconnectivity overall has led to a rise in the transportation and delivery of items and products. Such movement of goods requires protective packaging, which is both robust and lightweight.

Moreover, the rise in participants in niche sports and tourism has been accompanied by an increase in those sports where participants travel with their equipment. This has also led to an evolution of a market for highly padded and large, bulky, protective bags for carrying personal equipment to the destination of choice, especially by air. Additionally, the rise in professional sports people and expert level amateurs has meant an increase in the physical number of items being transported by individual sports people as these high end competitors, in particular, may travel with multiple pieces of equipment to accommodate different conditions or as reserves in case of loss or damage.

The types of personal equipment commonly transported may include sports and hobby equipment, or a range of other items requiring robust protection. However, such protective cases and equipment can also be used in sports and military applications.

Such applications may include bicycle sports or water sports including surfing, kiteboarding, windsurfing, paddle boarding, hunting, military packs, rucksacks, radio packs, bow and gun cases. Smaller bags may be used for handheld items. Other such sports may include shooting, archery and racquet sports, or fishing.

The large amount of equipment being transported means that the protective bags are often very bulky to store and heavy to move. If several items of equipment are required within a trip then it may be necessary to buy and own a number of bags or cases. For example a bag for a single surfboard may be a different bag to a board bag built to accommodate multiple boards. The plan shape or footprint of each bag may remain the same but the depth of a required bag may vary; an expert surfer may own and often travel with three or more bags in order to cater for his or her travel requirements and may also be dependent on whether they travel with one, two or more boards. This can lead to considerable expense and require excessive storage space when the bags are not in use.

Such cases typically require some type of internal reinforcement structures to increase rigidity, especially for heavy items. In many applications, there can be a constant trade-off between weight of an article and its rigidity and toughness. In applications where rigidity is required a commonly used material is lightweight aluminium frames or ABS plastic, (e.g. for use in backpacks, military radio packs, bike bags and the like.) However, such materials can increase weight significantly. In military applications, they can also have other drawbacks including a high radar reflectivity and poor infrared shielding.

Therefore, there is required a cover, bag or case that overcomes these problems, as well as a material and structure to provide improved characteristics to address these issues.

SUMMARY OF THE INVENTION

A case, box or flexible bag comprises top and base portions separated by a spacer or wall section. The wall section may take the form of a side wall that extends around the perimeter of the top and base portions, which generally have the same shape and size. The top and base portions may be generally planar or flat but may be contoured to fit different items. The top and base portions may be identical or have differences in shape. For example, the base may be flatter than the top.

The side wall section is removable from both the top and base portions. This allows it to be stored separately or packed more effectively. The top and base sections include fasteners or a joining mechanism around their periphery. In some examples, this may be a zipper or hook and loop fastener, such as Velcro. Corresponding fasteners may be located around the edges of the side wall enabling the side wall to be removably fitted to the top and base portions. The side wall may maintain its overall shape or contain a further fastener or fixing to join its ends where they meet, in order to fully close the side wall.

The top and bottom sections may be configured to fold flat when not attached to the side wall. They may be hinged to allow this. Alternatively, any one or more of the three sections (the top, bottom and side wall sections) may roll up or separate further to allow convenient packing when not in use.

A method of manufacture of the case may include the use of self-reinforced polypropylene (srPP). According to a further aspect, this srPP may be stitched, glued and/or riveted so that a foam or other substrate is sandwiched between srPP layers (e.g. one layer on each side). The substrate may include ethylene-vinyl acetate (EVA), expanded polyethylene (EPE), extruded polystyrene (EPS), expanded polypropylene (ePP), or a biofoam material or another natural fibre. Complex curves and shapes may be formed using this process without requiring thermoforming and still retaining strength. This method may be used to form the curved sections of the side wall and/or more complex contours of the top and bottom sections of the case.

According to a further aspect there is provided an apparatus or wheel assembly for removable or detachable connection of wheels to cases or covers. This aspect may be used and implemented with any bag, case or movable object (or in isolation) or with any of the sports or hobby cases described in this disclosure.

According to a further aspect there is provided a method of manufacturing material (e.g. for using in sports, utility, military, emergency services or hobby bags). The method includes providing a substrate between layers of self-reinforced polypropylene (srPP) and stitching through all three layers at the same time, forming a composite material. The substrate may be foam or other padding such as natural fibres, EVA, EPE or ePP (or combinations of these). Using stitching to form the laminated product means that it not necessary to use heat (thermoforming) to bond the layers and/or form shapes. Curves or shapes may be formed by bending or forming the separate layers (after they have been placed against each other) and then carrying out the stitching step to lock the layers in position in a desired form or shape. Advantageously, this allows the forming of complex shapes in a manner that is more adaptable, without requiring specialist moulds for forming a given shape (as would be needed if thermoforming the material).

Cuts or bends may also be made to the laminate material before the stitching step. Sheets of the laminate (i.e. the sandwich of srPP-substrate-srPP) may be overlapped before stitching and/or bending. Shapes may also be formed using moulds or 3D forms before the stitching step.

Optionally, the srPP material (either or both layers) may have cuts to prevent ruffles occurring when the material is pulled or wrapped around curves, especially when formed over or applied to the substrate (e.g. foam) before the bonding step. This may help to create contours in the material in a similar way to fibreglass may be stretched over foam when creating surfboards. For instance, the substrate may be semi-rigid, and formed in a desired shape. The srPP layer may then be stretched or arranged to 'sandwich' the substrate.

The case may include handles, wheels, wheel assemblies, tags or other items that may be fixed or removable. One or more wheel carriers may be removably attached to any of the parts but preferably the side wall portion. The wheel assemblies may be provided to different cases or items or supplied separately. This includes any corresponding attachment mechanism that may be fitted to items that are to receive the wheel assemblies.

In accordance with a first aspect there is provided a case for containing an item comprising:
a first panel having a perimeter edge and at least one hinge for folding the first panel;
a second panel having a perimeter edge and at least one hinge for folding the second panel;
a side panel;
a first fastener configured to attach the side panel to the perimeter edge of the first panel; and
a second fastener configured to attach the side panel to the perimeter edge of the second panel. Therefore, the case may be dismantled and stored more efficiently and easily and also provides the ability to customise or adjust the size of the case.

Preferably, the side panel may be fully removable from the first and second panels.

Optionally, the first and/or second panels may be planar, substantially planar or flat. This aids storage.

Optionally, the first and/or second fasteners are any of: a zip fastener, hook and loop fastener, clip, or press stud. Other reusable fasteners may be used.

Preferably, the side panel is formed from flexible material. This aids both assembly and storage.

Optionally, the case may further comprise one or more interchangeable side panels of different widths. This facilitates adjustments and customisation.

Preferably, the side panel may be rectangular having a length of the perimeter edge of the first and/or second panels and a width corresponding to a depth of the case. The side panels may form a strip that extends around the case.

Optionally, the side panel may further comprise a handle. Other items may be included on the side panel including tags, wheels, bumpers, etc.

Preferably, the hinge of the first and/or second panels may be in the centre of the panel.

This further aids storage.

Optionally, the first and/or second panels comprise a second hinge. The panel or panels may then be folded in a concertina or zigzag pattern.

Preferably, the first and/or second panels may have a length and a width and the hinge is across the width of the panel.

Preferably, the side panel (and/or the first and second panels) may be formed from flexible material. This may be a rigid or semi-rigid material, such as srPP or a composite (layers) of srPP and a substrate such as a foam. The substrate may be sandwiched between srPP layers and stitched (as described in this disclosure), for example. Other materials may be used.

Optionally, the side panel may comprise one or more hinges.

Optionally, the first fastener may further comprise a hinge portion configured to hingably open the first panel relative to the removable side panel.

Optionally, the hinge portion may be formed from a portion of a zip fastener in the engaged configuration.

Preferably, a pin and box of the zip fastener may be offset from a centre line across a width of the first panel. This allows the zip hinge to be located centrally (along the length of the case or top or first panel).

Optionally, the case may further comprise a flexible sheet forming a hinge flap between the first panel and the side panel.

Optionally, the flexible sheet is removable. This further aids dismantling and storage of the case.

In one example, there is described an apparatus for detachable connection of a wheel to a cover or case, the apparatus comprising a wheel having an axle, a support connected to the axle, and at least one support extension extending from the support, the support extension configured to be passed through an opening to be received within a cavity at the case or cover, for example at the side panel of the case or cover, so as to detachably connect the apparatus to the case or cover.

The wheel assemblies may be provided to the cases described in this disclosure or other cases or items. The axle of a wheel may be connected to a support or platform. The support or platform may have one or more extensions (or 'wings') which are arranged to be received into one or more pockets or tabs at the case or cover. For instance, each extension or wing will slot into a cavity at the pocket or tab. In this way, the support (which is itself connected to the wheel and axle) is fastened to the case or cover. The wheels can then be used by the user to manoeuvre the case or cover.

Advantageously, the mechanism for attachment of the wheels to the case or cover is robust, as it does not require any moving parts from catches or hinges. The described apparatus is easily able to withstand multiple attachments and detachments. The pockets or tabs may be built into the walls of the cover or case. Furthermore, the described apparatus allows the wheels to be detached from cover or case without specialist equipment.

Preferably, the cavity is defined by a pocket, or by a tab forming a loop.

Preferably, the at least one support extension comprises at least two support extensions.

Preferably, each of the at least two support extensions is configured to be received within a separate cavity at the case or cover.

Optionally, at least two support extensions are arranged to extend from the support in directions that are substantially opposite to each other.

Preferably, the cavity is shaped to conform to the shape of the support extension.

Optionally, the at least one support extension is substantially planar.

Optionally, the at least one support extension is formed of at least one layer of a self-reinforced polypropylene material.

The at least one support extension may be formed separately from the support.

Alternatively, the at least one support extension may be formed integrally with the support.

The support may be rigid and the at least one support extension may be resilient.

Alternatively, the support and the at least one support extension may both be resilient.

The support may further comprise a base element, such that the at least one support extension extends from the base element.

Optionally, the base element is substantially planar and the at least one support extension extends from the base element substantially in the plane of the base element.

Optionally, the support is configured to allow rotation of the wheel and axle relative to the at least one support extension.

Preferably, two or more wheels are arranged to rotate around the axle.

Preferably, the wheel having an axle is a first wheel having a first axle and the support is a first support connected to the first axle. The apparatus may further comprise a second wheel having a second axle, a second support connected to the second axle, and a connector element, connecting the first support and the second support, the at least one support extension extending from the first support.

Optionally, the connector element and the at least one support extension are integrally formed.

Preferably, the at least one support extension comprises at least a first support extension and a second support extension, the first support extension extending from the first support, and the second support extension extending from the second support.

Optionally, the connector element, the first support extension and the second support extension are integrally formed.

Optionally, the first support allows rotation of the first wheel and first axle around an axis perpendicular to the first axle.

Optionally, the second support allows rotation of the second wheel and second axle around an axis perpendicular to the second axle.

The first and second support may allow the first wheel and first axle to rotate independently of a rotation of the second wheel and second axle.

Preferably, the apparatus further comprises at least one fastener for securing the apparatus to the case or cover.

Optionally, the at least one fastener being at least one selected from the group comprising: hook and eye fastening, straps connected via a hook and eye fastening, strap and buckle, zips, tie straps.

Optionally, the wheel assembly may take the form of a skateboard or scooter.

Preferably, the case may further comprise one or more straps to secure the skateboard or scooter to the side panel.

Optionally, the one or more straps may include hook and loop or stud fasteners for securing the straps around the skateboard or scooter.

In a further example, there is provided a case or cover for connection to the apparatus described above, the case or cover comprising at least one cavity for receiving the at least one support extension of the apparatus, so as to fasten the apparatus to the case or cover.

Preferably, the at least one cavity is formed by pocket or by a tab forming a loop at the outer walls of the case or cover.

Optionally, the at least one cavity is integrally formed with the outer walls of the case or cover.

Optionally, the at least one cavity is formed by attachment of a tab or a pocket or to the outer walls of the case or cover after manufacture of the case or cover.

Optionally, the tab or pocket is attached to the outer walls of the case or cover by one or more fastenings from the group comprising: stitching, gluing, riveting, a zip fastening, a hook and eye fastening.

Preferably, the cavity is shaped to conform to the shape of the support extension.

Optionally, the case or cover further comprising at least one fastener for securing the apparatus to the case or cover.

Optionally, the at least one fastener being at least one from the group comprising: hook and eye fastening, straps connected via a hook and eye fastening, strap and buckle, zips, tie straps.

In a further example there is provided an apparatus for connection to a sports board cover, or other case or cover. In particular, the apparatus may be connected to the bags and covers described therein. However, a similar apparatus may be applied to other types of bags or cover. The apparatus may be retrofitted.

In particular, the apparatus comprise a wheel having an axle, and an adapter, to connect to the axle so as to detachably couple the wheel to the case or cover.

Preferably, the adapter is permanently fixed to the cover or case, and the adapter detachably couples directly to the axle of the wheel.

Preferably, the adapter is at least one flap fixed to the outside of the case or cover such that, in use, the flap is arranged to radially surround the axle.

Preferably, the flap is secured to radially surround the axle using a fastener, the fastener being at least one from the group comprising: hook and eye fastening, strap and buckle, zip.

Preferably, the case or cover is for hobby equipment. As examples, the case or cover may be used for types of sports equipment, musical equipment, photography equipment, computer equipment, audiovisual equipment, fine art pictures or items, monitors, motorbike accessories, drones or dinghy covers. The case or cover may be used to house aeronautical or aerospace equipment. More preferably, the case or cover is for sports equipment.

Optionally, the case or cover is for a sports board. For instance, the case or cover may be for at least one from the group comprising: surf board, paddle board, windsurf board, kite board, snow board, skis or skate board, rowing equipment, fishing. Such sports have a large number of participants around the world, and require equipment which is both expensive and fragile. Therefore, protection of these equipment or goods is a priority.

In accordance with a further example, there is provided a method of manufacture comprising the steps of:
placing a substrate between a first and a second layer of self-reinforced polypropylene (srPP); and
bonding the layers of srPP and substrate by:
stitching, or riveting through the first layer of srPP, the substrate and the second layer of srPP; or
gluing the first layer of srPP, the substrate and the second layer of srPP together.

This method of manufacture may be used to make any of the first panel, second panel and side panel of the case but may be used to make any other item, for instance the support of the wheel assembly. This material may be strong and resilient yet be relatively simple to manufacture (for flat as well as shaped items).

Optionally, the substrate may be selected from any one or more of EVA. EPE, EPS, ePP, and or natural fibres. Other substrates or fillers may be used.

Optionally, the method of manufacture may further comprise bending or forming the first layer of srPP, the substrate and the second layer of srPP into a shape or curve before or during the bonding (stitching, gluing or riveting) step.

Optionally, the method of manufacture may further comprise cutting through each of the first layer of srPP, the substrate and the second layer of srPP before the bonding (stitching, gluing or riveting) step and after the placing step.

Optionally, the method of manufacture may further comprise the step of overlapping combined first layer of srPP, the substrate and the second layer of srPP with a further combined first layer of srPP, substrate and second layer of srPP before the bonding step.

Optionally, the method of manufacture may involve stitching and bending at the same time to form shapes in the material.

Optionally, the method of manufacture further comprises placing a lining layer adjacent the first or second layer of self-reinforced polypropylene (srPP), such that the said first or second self-reinforced polypropylene (srPP) is between the substrate layer and lining layer.

Preferably, the method of manufacture further comprises placing the substrate, the first and the second layer of self-reinforced polypropylene (srPP) between a lining layer and a fabric layer.

Any of the cases or covers described herein could be formed using the method of manufacture described, and more specifically using the layered material resulting from the method of manufacture.

Shapes may be formed using folding or origami techniques. This may provide improvement in creating complex 3D shapes, yet still enable the use of die cutting or punching from a flat sheet of srPP and then either bending, tucking, or folding the sheet to create different shapes. Such 3D shapes may include adding a protective layer of srPP and/or ePP below fabric in hats and helmets, especially for police or military hats and caps, but may include construction or sports hat and caps (such as those used in water sports, horse riding, ball sports, boxing, or cycling helmets).

A sandwich of srPP may be formed with different densities of foams or other substrates. For example, the layers may be in the form of: srPP top layer, then 60-70 g/l foam, then a layer of srPP, then 35-45 g/l foam, then srPP, then a layer of 20-25 g/l of foam (e.g. a memory foam placed on the inside of a mould. This provides a protective skin and multiple layers of different densities to absorb impact energy or stab resistance, while cushioning the product or person. Such a structure may be used for helmets, hats, caps, body protection, bags, cases or other items.

A cylinder, tube or reinforcement member may also be formed in layers. For example, a foam (e.g. ePP or memory foam) having a diameter of 5 mm-100 mm may be provided. This may be wrapped in a layer of srPP, or srPP and aramid. A pin or rivet entirely through the diameter of the tube may hold this structure (i.e. the layers) together.

In a further aspect, a reinforcement material, structure or member is produced from a sheet of self-reinforced polypropylene (srPP) that is formed into a hollow structure, solid structure and/or cylinder, either by folding or rolling. The sheet of srPP is preferably flexible. Opposing edges of the sheet may be temporarily or permanently joined together, which turns a flexible sheet (of srPP) into a rigid structure. Preferably, this process is reversible so that the reinforcement cylinder is returned to its planar form or back into a flexible sheet. This can aid storage of the reinforcement material when it is not in use. This material can be coupled to a storable or collapsible case, which may incorporate channels or receiving spaces for the reinforcement material (when in its rigid form). Again, these channels may accept the reinforcement material either as a permanently fitting or they may be removable. The reinforcement member does not require heat forming or curing and can remain in its original flexible state yet provide rigidity when rolled or folded into a cylinder or other hollow structure.

In accordance with this aspect, there is provided a reinforcement member comprising a cylinder or hollow structure having walls formed from self-reinforced polypropylene, srPP.

Optionally, the cylinder may be of circular, oval, square, triangular, or rectangular cross-section. Other cross sections (including irregular) can be used.

Preferably, the cylinder may be formed from a planar sheet of srPP having opposing edges (e.g. parallel with a long axis of the planar sheet) joined by a fastener.

Optionally, the fastener may be a: zip fastener, a hook and loop fastener, clip, or one or more press studs. Other fasteners may be used.

Optionally, the fastener or fastening may be stitching, one or more rivets or a pin or pins, or glue. In the case of one or more rivets or pins, the rivets or pins may pass all of the way through the reinforcement member.

Optionally, the walls of the cylinder may be further formed from expanded polypropylene, ePP, bonded to the srPP. This increases resilience to damage.

Preferably, the ePP may be bonded to an outer surface of the srPP. In other words, the ePP may form an outer surface of the cylinder.

Optionally, the reinforcement member may further comprise an outer surface of the cylinder formed from a fabric layer. This can provide further protection and/or allow surface decoration (e.g. camouflage) to be applied.

Optionally, the fabric layer may be formed from nylon or canvas.

Preferably, the srPP walls may be flexible. This allows the walls to be stored more easily, especially when they are returned to their flat or planar sheet state.

Optionally, the reinforcement member may further comprise a film or additional protective surface layer applied to a surface (e.g. outer) of the srPP. For example, Dynema fibres, Kevlar® or the like may be added to the srPP (e.g. panel) to increase stretch resistance, improve toughness, and/or improve resistance to cutting and tearing.

In accordance with a further aspect, there is provided a case, bag, backpack, receptacle, or container having channels configured to receive the reinforcement member according to any previous claim. The case may be the case or cases described within this disclosure or other cases or bags.

The cases or covers incorporating the reinforcement member could be formed using the method of manufacture described, and more specifically using the layered material resulting from the method of manufacture.

A suitable case, box or flexible bag for receiving one or more reinforcement members may comprises top and base portions separated by a spacer or wall section.

According to a third aspect, there is provided a method of manufacturing a reinforcement member comprising the steps of:
providing a rectangular sheet of self-reinforced polypropylene, srPP; and
applying a fastener to the rectangular sheet of srPP configured to fasten opposing long edges of the rectangular sheet of srPP.

Preferably, the method of manufacture may further comprise the step of bonding a layer of expanded polypropylene, ePP, to the rectangular or square sheet of srPP.

In a further aspect, there is described a strap formed from self-reinforced polypropylene, srPP.

Preferably, the strap comprises webbing.
Preferably, the strap is covered in webbing.
Preferably, the webbing is nylon webbing.
Preferably, the webbing is bonded to the srPP.
Preferably, the strap has a longitudinal length and a width, and the width of the srPP is less than 75% the width of the webbing, or less than 50% of the width of the webbing.

Preferably, the strap comprises perforations or cut-outs. More specifically, at least the srPP portion of the strap comprises perforations or cut-outs.

In a still further aspect there is described a buckle formed from srPP.

In a still further aspect there is body armour or a protective garment at least partly formed from srPP.

Preferably, the body armour or protective garment is configured for a human, a horse, a dog, anther working animal.

Preferably, the body armour or protective garment comprises perforations or cut-outs.

Preferably, the body armour or protective garment is a glove.

In a further example, there is provided a method of manufacture for a protective material, comprising the steps of:
providing a layer of a substrate;
providing a layer of self-reinforcing polypropylene (srPP), arranged to cover at least part of an outer surface of the substrate; and
bonding the layer of srPP and the layer of the substrate by:
stitching, riveting or stapling through the layer of srPP and the substrate; or
gluing the layer of srPP and the substrate together; or
fusing the layer of srPP and the substrate together by application of heat.

The bonded layers of the substrate and srPP may then be shaped or formed to provide the desired protective item. The shaping or forming may include further stages of stitching, riveting, stapling or gluing.

Preferably, the substrate is a type of foam. For instance, the substrate may be selected from any one or more of EVA, EPE, EPS, ePP, and or natural fibres.

Preferably, the layer of srPP is a first layer of srPP, and the method of manufacture further comprises, prior to bonding:
placing a second layer of self-reinforced polypropylene (srPP) on the substrate, so that the substrate is arranged between the first and second layer of self-reinforced polypropylene (srPP); and
wherein the bonding step comprises:
bonding the first and second layers of srPP and substrate by:
stitching, or riveting through the first layer of srPP, the substrate and the second layer of srPP; or
gluing the first layer of srPP, the substrate and the second layer of srPP together; or
fusing the first layer of srPP, the substrate and the second layer of srPP together by application of heat.

Preferably, the method of manufacture further comprises providing a camouflage material, and bonding the camouflage layer to the protective material. The method may comprise placing the substrate, the first and the second layer of self-reinforced polypropylene (srPP) between a lining layer and a fabric layer. For example, the fabric layer may be an outer protective or shell fabric layer.

Preferably, the method of manufacture further comprise providing a lining layer, and bonding the lining layer to the protective material. The lining layer may comprise the inner most layer of the protective material. In this example, a further layer could also be used, for example an outer fabric layer. The method of manufacture could therefore require bonding an outer fabric layer, and srPP layer, a substrate layer, and a lining layer (for example, in that order) by stitching, or riveting through the layers or gluing the layers. The outer fabric may be patterned, for example with a camouflage pattern.

Preferably, the protective material resulting from the method of manufacture is, for example for use in the military, police or emergency services.

Optionally, the protective material is incorporated into body armour.

Optionally, the type of body armour includes: a protective jacket, a protective limb sheath, a glove.

Optionally, the body armour is a glove, and panels of the protective material are incorporated at the knuckle regions of the glove.

Optionally, the protective material is shaped to form a hat or helmet.

Optionally, the protective material provides a protective shell or cover for an existing hat or helmet.

Optionally, the protective material is incorporated into an equine or canine protective item or garment.

Optionally, the equine or canine protective item or garment is a protective horse or dog coat, or a protective limb sheath.

Optionally, the protective material is incorporated into a case, cover or pouch.

Optionally, the protective material is incorporated as a reinforcement panel in at least one wall of the case, cover or pouch.

Optionally, the reinforcement panel comprises perforations.

Optionally, rolls or tubes of the protective material form the reinforcement panel.

Optionally, the protective material is incorporated into the straps of the case, cover or pouch.

A number of different embodiments of cases or covers are described herein. The case or cover may be for hobby equipment. As examples, the case or cover may be used for types of sports equipment, musical equipment, photography equipment, computer equipment, audiovisual equipment, fine art pictures or items, monitors, motorbike accessories, drones or dinghy covers. The case or cover may be used to house aeronautical or aerospace equipment. More preferably, the case or cover is for sports equipment.

Optionally, the case or cover is for a sports board. For instance, the case or cover may be for at least one from the group comprising: surf board, paddle board, windsurf board, kite board, snow board, skis or skate board, rowing equipment, fishing. Such sports have a large number of participants around the world, and require equipment which is both expensive and fragile. Therefore, protection of these equipment or goods is a priority.

Any feature from any of these aspects or examples may be used with any combination of other described feature. For example, any case can include the reinforcement member, either permanently attached or as a removable or temporary fitting.

BRIEF DESCRIPTION OF THE DRAWINGS

The present invention may be put into practice in a number of ways and an embodiment will now be described by means of an example only, and with reference to the accompanying drawings in which:

FIGS. 2A and 2B show perspective views of alternative implementations of the case of FIG. 1;

FIG. 6 shows a series of steps used to assemble the case of FIG. 1;

FIG. 11 shows a sectional view of a first example of a wheel assembly apparatus:

FIGS. 26 and 27 shows schematic diagrams illustrating how the reinforcement member of FIG. 25 may be formed by joining edges using various means;

FIG. 48 shows a schematic figure of srPP used for equine coats or protective garments;

FIG. 50 shows a schematic figure of srPP used for hats or helmets; and

Where appropriate, like reference numerals denote like elements in the figures. The figures are not necessarily to scale.

DETAILED DESCRIPTION OF SPECIFIC EMBODIMENTS OF THE INVENTION

Foldable Case or Cover

Figure 1:
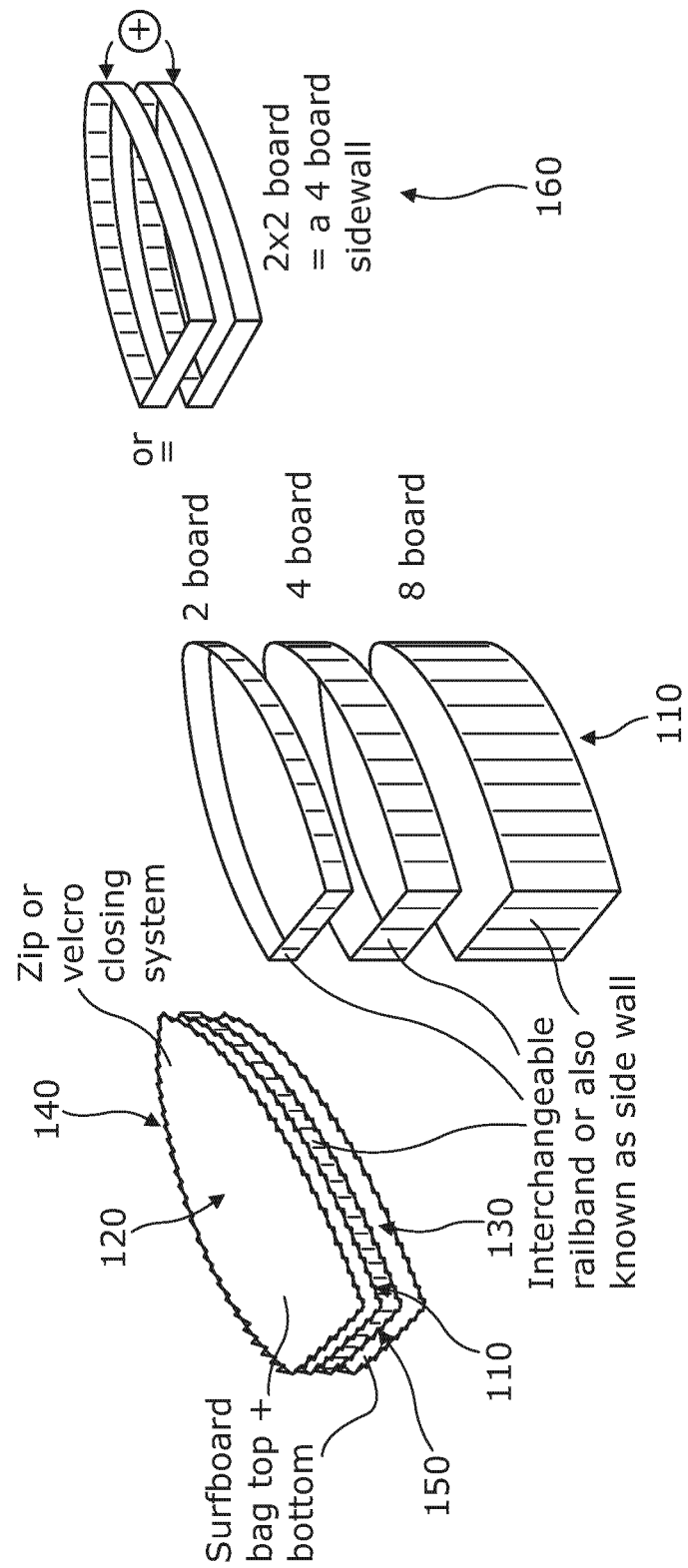
FIG. 1 shows a perspective view of an adjustable case, including interchangeable side portions.

In one example implementation shown in FIG. 1, a case is provided that includes one or more side walls 110 that have matching zips or hook and loop fasteners (e.g. Velcro®) so that the top 120 and bottom panels (first and second sections, respectively) of a protective bag can be separated by a variety of different depth side walls or panels. Multiple sidewalls 160 may be added or joined together (i.e. along their long axis edge, using similar releasable fasteners), to form a larger depth case in order to accommodate multiple pieces of (or larger or wider) equipment.

The case or bag may be deconstructed on arrival at a chosen destination to make the overall bag less bulky for storage than a bag that does not have the removable or separable sides. Again, when at home the traveller or sportsperson can deconstruct the bag and store it effectively and compactly until the next travel event.

The top 120 and bottom 130 panels each comprise fasteners 140 at the perimeter (zips etc.) to match a fastener 150 at the top and bottom edge of each of the interchangeable side panels. As shown in FIG. 1, each side panel has a different depth, so that, when attached, the choice of side panel adjusts the spacing between the top and bottom panel.

As shown in FIGS. 2A and 2B, the releasable fasteners 210 (e.g. zippers, hook and loop) on the lids or panels are preferably offset from centre by between 6 cm and 20 cm (e.g. on a 1-2 m length case) to allow the user to create a "hinge" by only undoing the zip most of the way round but leaving some connection between the sides and tops to allow extraction of the sporting article and then reclose the bag without having to unzip the whole lid or panel.

Figure 3:
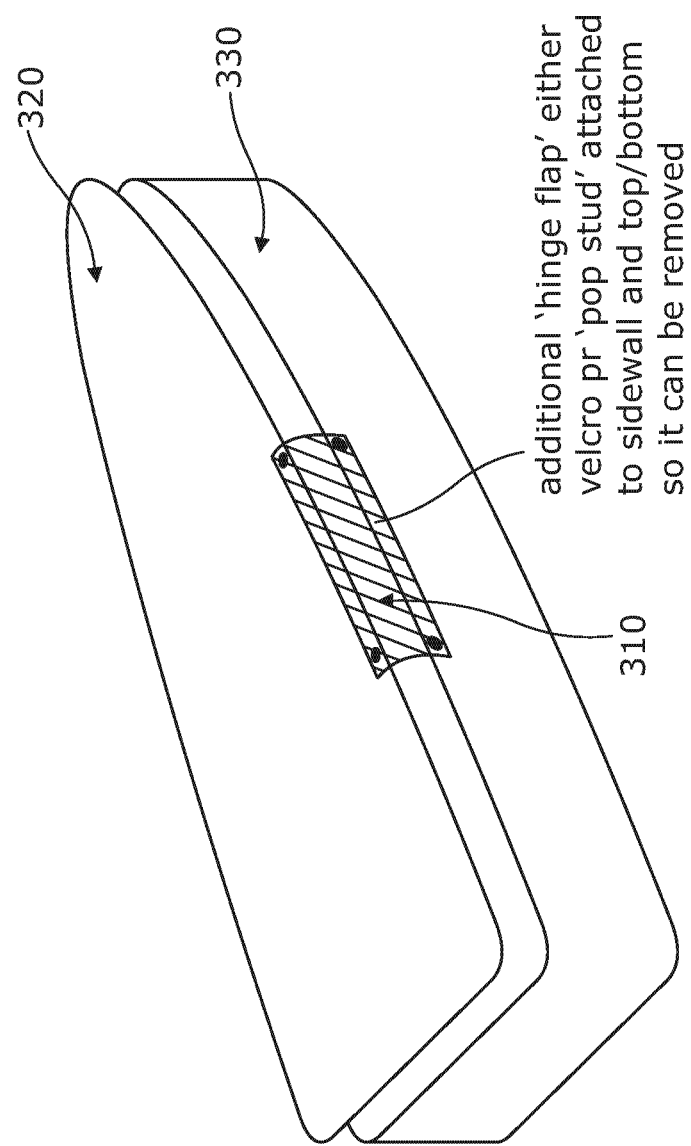
FIG. 3 shows a perspective view of an alternative implementation of the case of FIG. 1.

FIG. 3 shows an alternative example implementation that has a Velcro or stud fastened flap 310 between the lid 320 (top panel or section) and side panel or wall 330 forming a removable hinge that does not rely solely on the zip. This flap 310 may also be used in addition to the fastener (210 in FIGS. 2A and 2B) such as a zip or hook and loop fastener (i.e. preventing the zip from opening further). The flap 310 may be fully removable or removable from only one side (either).

Figure 4:
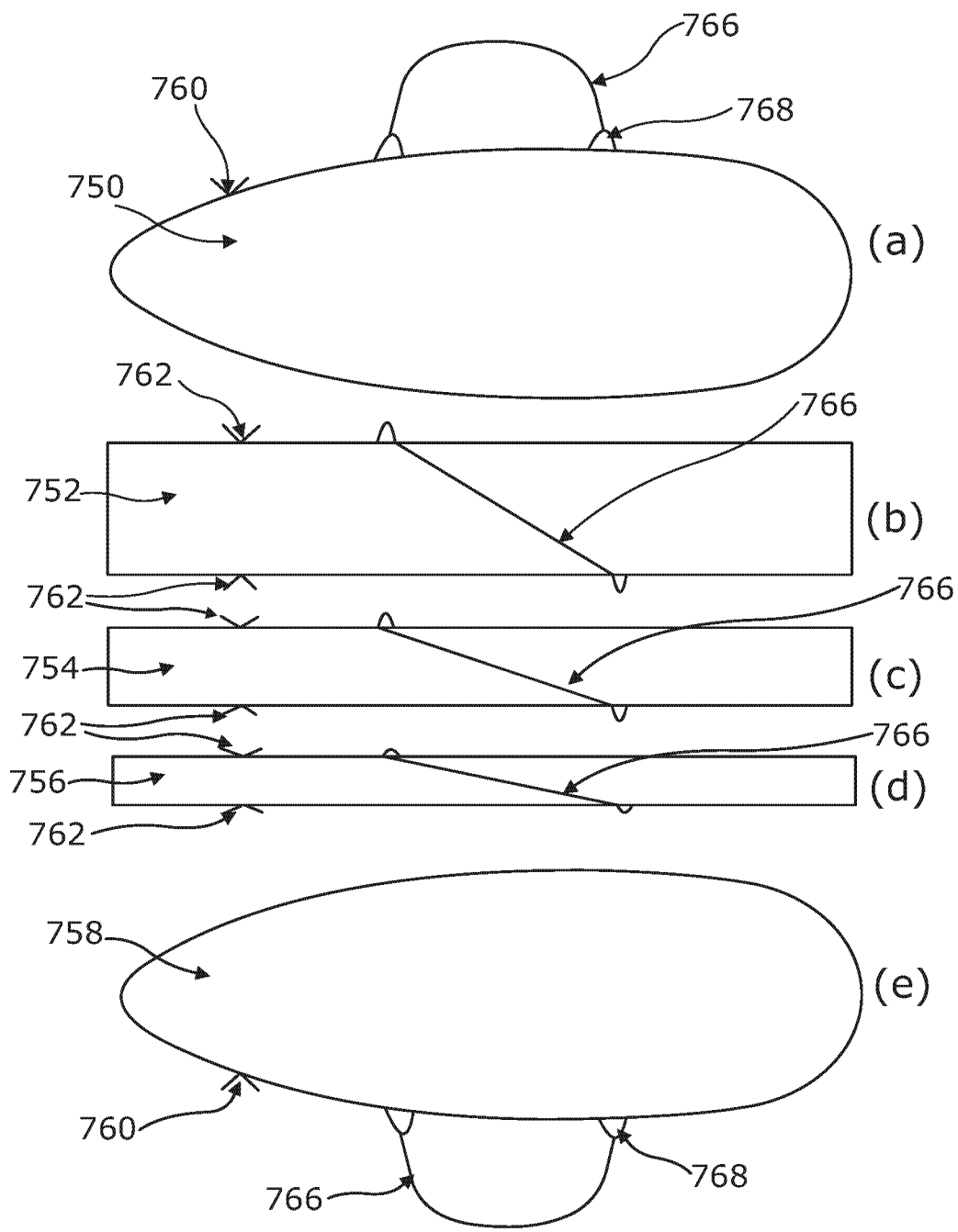
FIG. 4 shows a schematic view of an embodiment of a case or cover incorporating srPP.

FIG. 4 shows a case or cover for sports equipment including interchangeable rail sections or side walls similar to those described with respect to FIGS. 1 to 3. In this particular example, the case may be for sports boards, but a similar configuration of case could be used for cases for other types of equipment.

FIG. 4(a) shows a first 'bottom' panel or section 750 of the case. FIGS. 4(b), (c) and (d) each show different interchangeable side panels or walls 752, 754, 756 of different sizes. FIG. 4(e) shows a 'top' panel or section 758. The outer edges of each of the top and bottom panel comprise zips 760, arranged around the full perimeter or circumferential edge of each of the top and bottom panels. These zips can connect with zips 762 at the top and bottom edge of each of the interchangeable side panels 752, 754, 758. Zipping together the top 758 and bottom 750 panel with the selected interchangeable side panel 752, 754, 756 forms the case or cover, having an inner cavity therein. A perspective view of the cover or case having all of the top 758, bottom 750 and at least one of the side panels 756 joined is shown as FIG. 5.

Use of the interchangeable side panels or rail sections 752, 754, 756 allows the user to change the depth of the bag and its internal cavity, so that a different number of items, or a different size of item can be placed within. In the particular example of a board bag shown in FIG. 4, the user can choose the depth of side panel or rail band 752, 754, 756 for the particular number of boards to be packed within the case, i.e. 2, 4, 6 boards. It will be understood that more than one interchangeable side panel 752, 754, 756 could be used in conjunction with the top 758 and bottom 750 panels.

Each of the top 758, bottom 750 and side 752, 754, 756 panels may comprise a combination of ePP or srPP. Although to provide the most robust protection all of the panels may be formed using the superior combination of srPP and ePP, some of the panels may not contain these materials (for example, to save weight, or costs). Use of the interchangeable side panels or rail sections 752, 754, 756 also allows the user to choose how much protection they require around the contents, and how much money the user is willing to spend on selecting an ePP and srPP top, bottom and side rails, or any combination of these. For example, this allows the user to mix up the different types of panel to save weight and only protect where they feels the items within the case (such as sports boards) are vulnerable.

Figure 5:
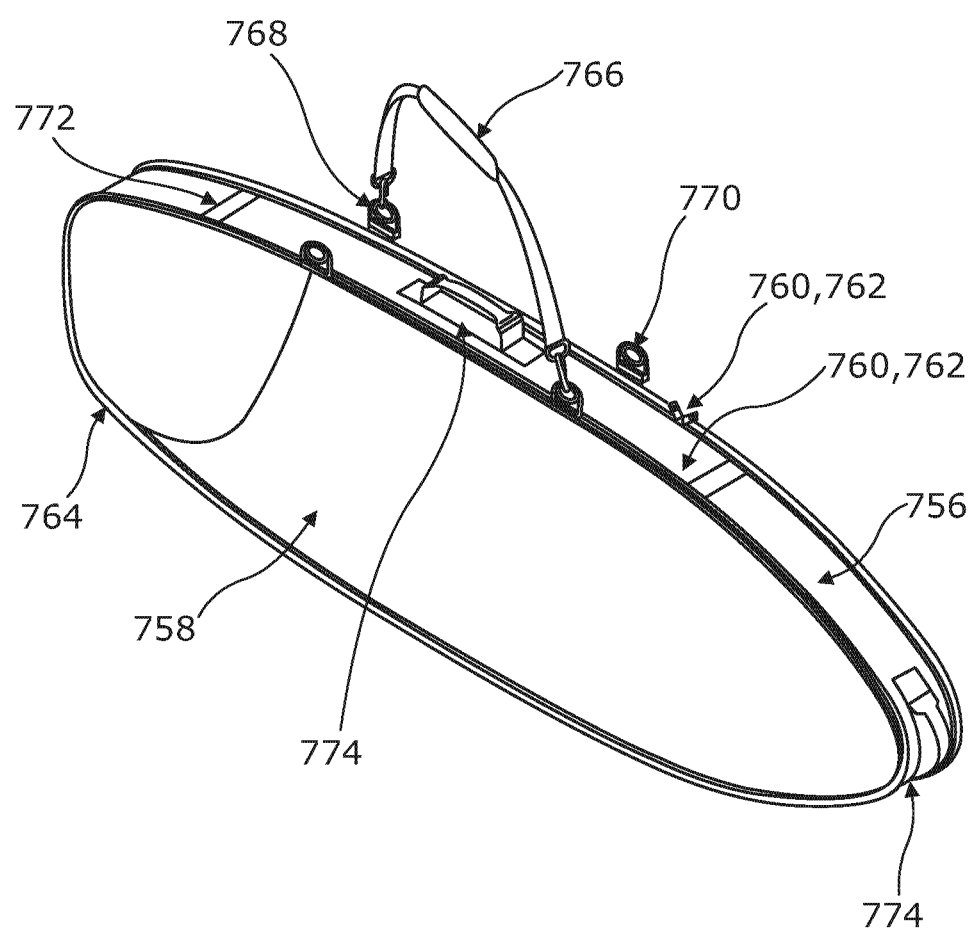
FIG. 5 shows a perspective view of the embodiment of a case or cover of FIG. 4.

A number of additional, optional features can also be seen within the case, cover or bag of FIG. 4 and/or FIG. 5. For example, soft handles 774 are provided for aiding the user to carry the case. Hook and loop (Velcro®) locating straps 764 may be placed on the rear and underside, to attach removable wheels to the bag. A removable shoulder strap 766 is provided to attach to buckles 768 at the bag. Furthermore, lifting buckles 770 may be provided at the side of the bag, for attaching additional straps. Reinforcing sections 772 may be arranged at the interchangeable side panels.

Vents (not shown) may also be embedded into the panels, to allow moisture to be released from within the cavity of the bag. In further examples, straps (not shown) may be provided around the bag, with loops at the outer surface of the panels to retain said straps. Furthermore, an opening may be arranged at one end of the bag, to allow an easier access to the inner cavity. For example, in the example shown, a zipped opening can be provided at the nose or tail of the board bag. Within the bag, dividers may be provided, or additional padding can be arranged to protect certain areas of the bag (for instance, to protect the more vulnerable nose and tip of a sports board, when the case is a board bag).

FIG. 6 shows a series of drawings illustrating how to assemble (and disassemble) the case. FIG. 6(1) shows the top and bottom sections or panels separated and ready to be assembled. FIG. 6(2) shows a single side wall or panel in isolation. This particular side panel is sufficient to accommodate two surf boards within the case. Different height side panels may be supplied and interchanged with the illustrated example side panel. FIG. 6(3) shows a side panel suitable for four boards (e.g. twice the height of the two board side panel) and FIG. 6(4) shows an eight board side panel.

FIG. 6(5) shows the process of attaching a zip between the side panel and the bottom panel. FIG. 6(6) shows as similar process of attaching the top panel to the side panel using another zip. FIG. 6(7) shows the assembled case.

Folding the sports cases or protective cases enables the efficient storage and transportation of the srPP and ePP (or other foam) manufactured bags for sports, travel, utility, catering, military, medical, professional and hobby bags. Other materials may be used to construct these cases. These cases may be used for both professional and hobby equipment such as cameras, video cameras, audio-visual equipment, laptops, computers and other electronics. In addition, the cases may be used with optical equipment and radio equipment (e.g. used by the military).

As the depth of the protective foam increases (usually in order to provide more protection) or where the outer layer uses a tough protective material such as srPP (e.g. thermally set), then the bag may become semi-rigid and unable to "squash" or be compressed for storage and transportation (i.e. without irreversible damage).

Figure 7:
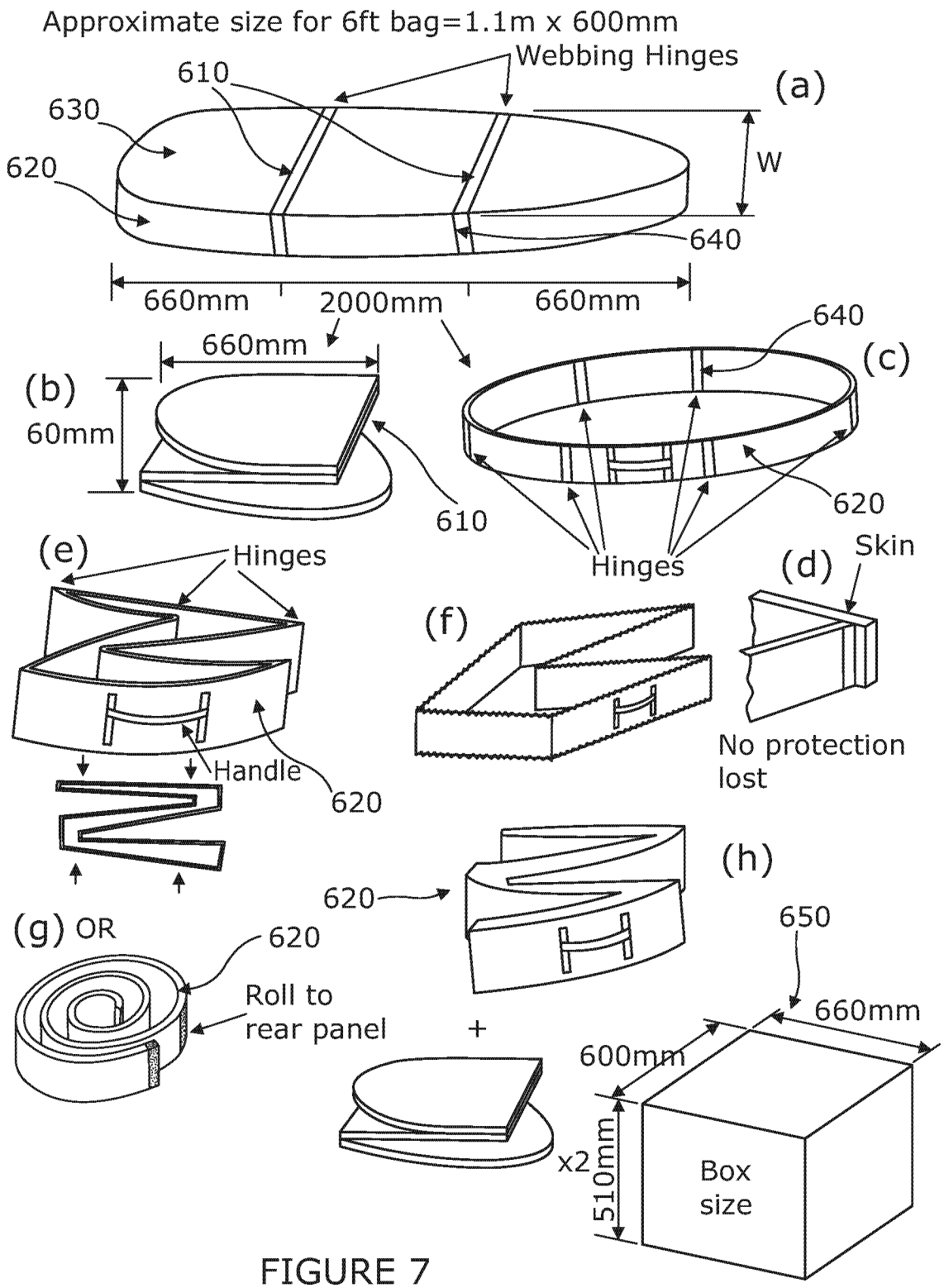
FIG. 7 shows a perspective view of an alternative implementation of the case of FIG. 1.

In the examples shown in FIG. 7, webbing and zips are used to allow panels (either or both side panels 620 and/or top and bottom panels 630) to fold back on themselves as hinges 610. FIG. 7(a) shows the constructed bag, wherein the hinges are 'unfolded' and FIG. 7(b) shows the top panel 630 folded along the hinges 610. Alternatively the use of hook and loop fasteners (e.g. Velcro®) may allow the folding panels to also be completely dismantled, if required.

Side panels 620 of this case may be formed flexible enough to either roll up (see FIG. 7(g)) or alternatively fold in a concertina-type manner (e.g. one, two, three or more folds) along hinges 640 (see FIG. 7(c), 7(e), or 7(f)) so as to allow the entire case or bag to be stored using less space. As shown in FIG. 7 (h), each of the foldable top and bottom panels 610, combine with the foldable (or coiled) side panel 620, to be fitted into a small volume. The piece may be enclosed in a box 650 for compact storage.

For larger bags that require internal frames, the use of srPP insets and srPP tubes or ribs, as described below, especially with reference to FIGS. 25 to 29, may allow the bag to maintain its weight advantage without increasing weight significantly. These tubes and insets may then be removed from the bag (e.g. from channels or sleeves formed within the case or bag) and collapsed prior to the bag being folded. This would also keep the entire bag fully recyclable as it may be made from polypropylene derivatives. Alternatively, aluminium or other metal tubing, nylon or other similar plastic tubing could be used if lower weight, and/or infrared or radar shielding was not required. This folding type design can be used for military applications, snow sports bags and large musical instrument bags such as cellos, for example.

Figure 8:
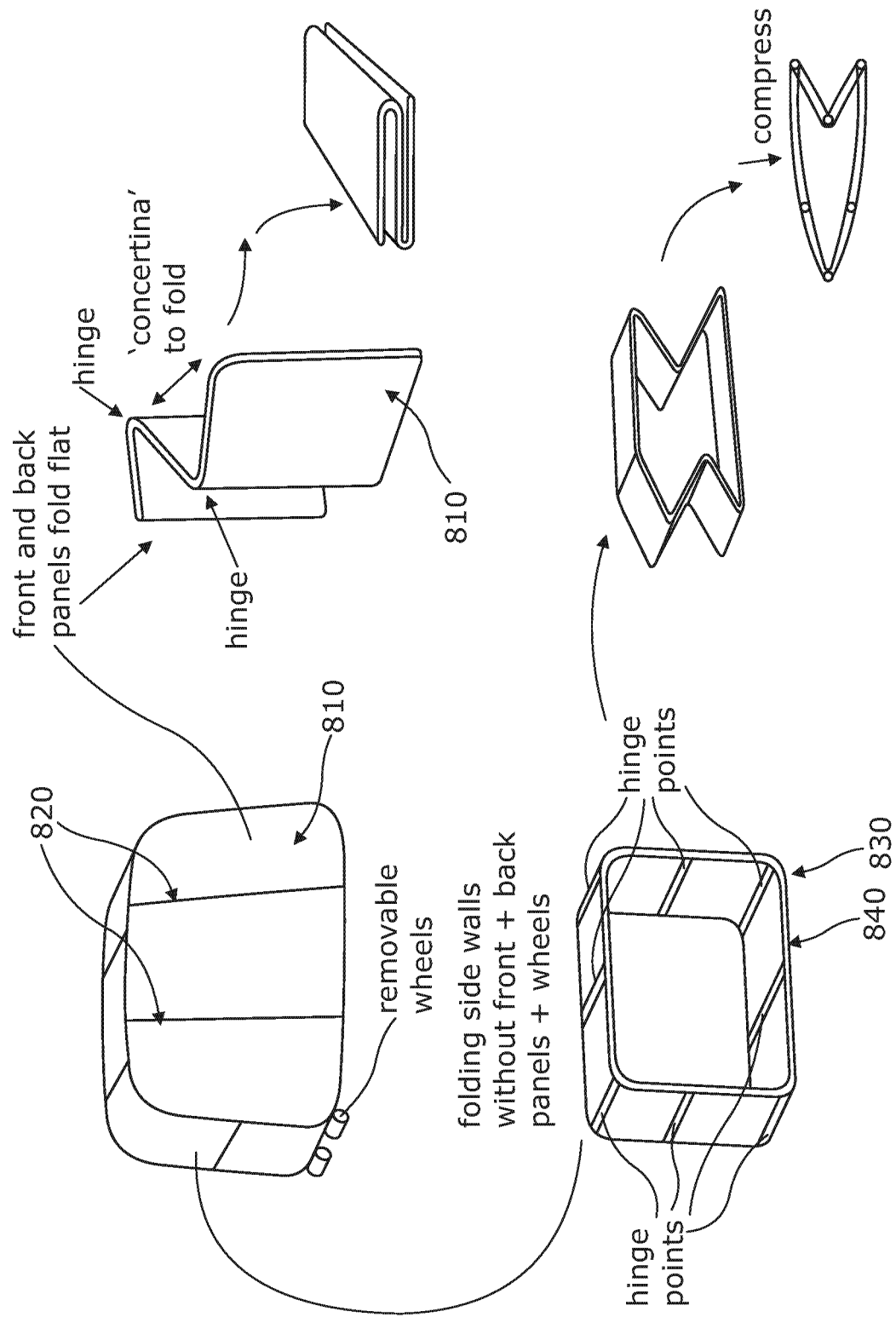
FIG. 8 shows a perspective view of an alternative implementation of the case of FIG. 1, used to transport bicycles.

FIG. 8 shows a further example implementation of the case used as a bicycle bag. In this example, front and back panels 810 (first and second panels, respectively) are also planar or flat and so can pack easily when the side wall is removed. The front and back panels correspond with the top and bottom panels in the other examples and may be assembled and disassembled in a similar manner. The front and back panels 810 may also include one or more hinges 820 to allow them to fold or concertina. The side panel 830 of this example may also fold (and include one or more hinges 840) and/or roll up. Hinges 840 may be placed on the corners and/or in the centre of each side. Although the hinges or folds 820 at the front and back panels are shown as "vertical" hinges or folds in FIG. 8, it will be understood that the hinges or folds can be arranged in any orientation on the front or back panel (including perpendicular to those shown in FIG. 8.

As each of the interchangeable side panels (e.g. different heights) will all require wheels to aid transport, this could increase costs and be less environmentally friendly, as only one panel is in use at any time (and so not all wheels will be used at the same time if permanently fixed). According to another aspect, there is provided a removable wheel assembly, panel or multiple panels made of tough, stiff but light materials with wheels fixed to that panel. The panel material should preferably be a composite polyolefin such as srPP but may be another plastic or metal.

Figure 9:
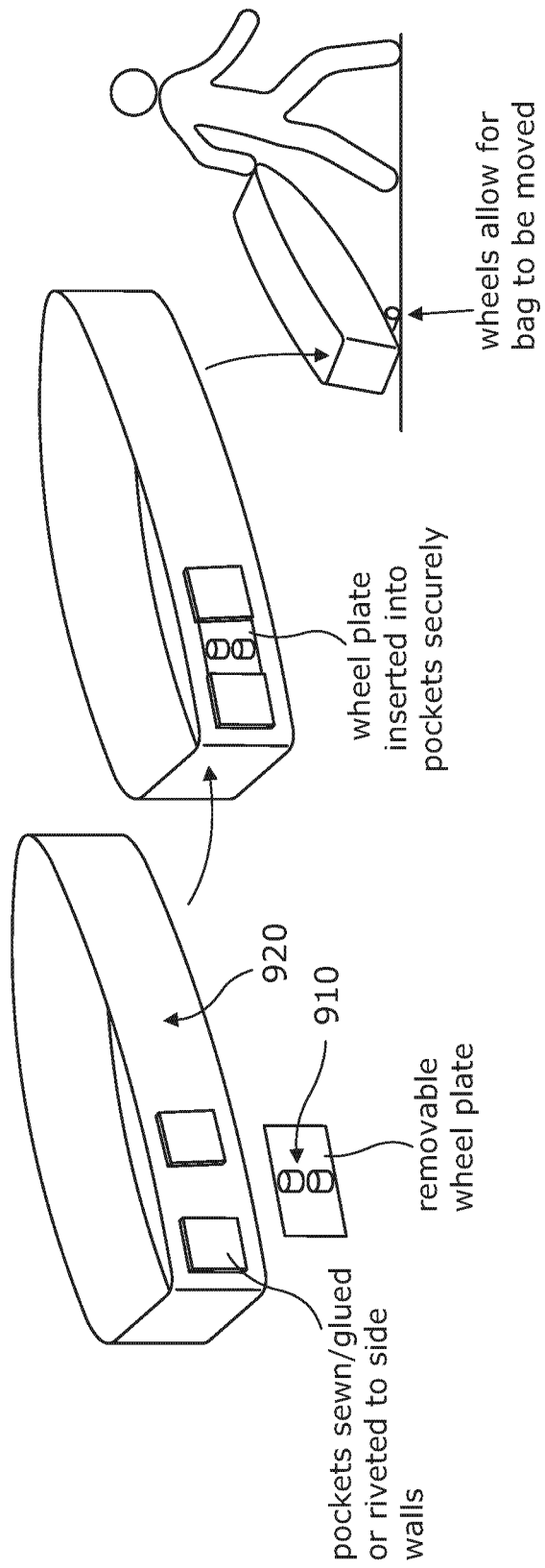
FIGS. 9A, 9B and 9C show perspective views of alternative implementations of the case of FIG. 1, including a removable wheel assembly.

FIGS. 9A, 9B and 9C show the use and fitting of a removable wheel assembly or wheel plate 910. This wheel assembly 910 may be removed for storage but fixed to the side panel 920 when required. This allows easier storage but enables large or bulky bags (especially for water sports or bicycle transport) to be more easily maneuvered while walking with the bag. As conventional bags do not have removable side panels then such wheels may be normally fixed to a case by rivets.

The described removable wheel assemblies or panels are fixed to the side panel of the bag by inserting into pockets or cavities located on the side panel. Alternatively or additionally, straps or hook and loop fasteners (e.g. Velcro®) may be used to hold the wheel assembly in place.

Yet another alternative is that the removable wheels form the whole or part of a skateboard or scooter (shown in FIG. 18) so that once removed from the panels e.g. during flight or when at your destination, the wheel set becomes useful for personal transportation or recreation.

The skateboard or scooter deck would preferably, be held in place on the side panel by hook and loop fasteners such as Velcro®, straps and/or the ends of the board deck may fit into the pockets on the panel.

Further detail of the wheel assembly follows. It should be noted that this wheel assembly may be used or supplied to any case or object and not limited to the cases described in this disclosure. However, combinations of the described wheel assemblies and any of the cases or bags that are described may be implemented.

Figure 10:
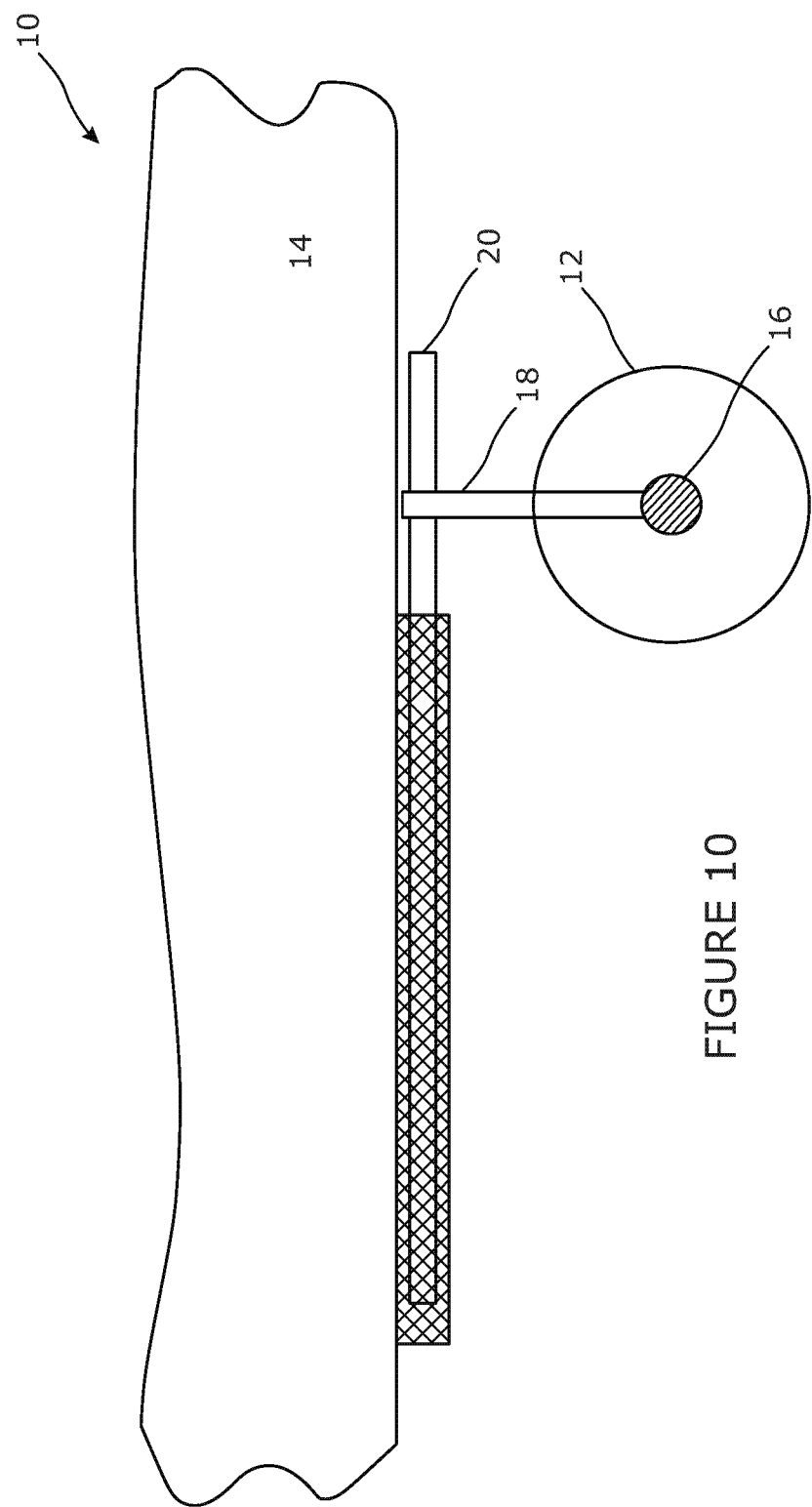
FIG. 10 shows a perspective view of wheel assemblies used for the case of FIG. 1.

FIG. 10 shows a sectional view of apparatus or wheel assembly 10 for detachable connection of a wheel 12 to a cover or case 14. The wheel is configured to rotate around an axle 16. The axle 16 is connected to a support 18. A support extension (or wing) 20 extends from the support 18.

In this example, the support 18 is a rigid piece or frame, arranged between the axle 16 and the support extension 20. The support is arranged to hold the axle such that the longitudinal axis of the axle is approximately perpendicular to the longitudinal axis of the support. The support 18 is connected to the support extension by penetration through the support extension 20.

The support extension 20 is a wing, arm or projection from the support 18. In this case, the support extension 20 is arranged to project from the support 18 at an angle of around 90° from the support 18. The support extension 20 is substantially planar, so that the plane of the support extension 20 extends approximate perpendicular to a longitudinal axis of the support 18. The support extension 20 extends from the support 18 at a distance multiple times the diameter of the wheel 12 (in this example, extending around three times the diameter of the wheel 12 from the region when the support and the support extension are connected).

In use, the apparatus 10 is connected to the case or cover 14. In particular, the support extension is inserted into a cavity, formed by a pocket or envelope at the case or cover. The portion of the support extension extending into the cavity of the pocket is enclosed or surrounded. Friction between the surfaces of the pocket, the wall of the case or cover, and the support extension act to hold the apparatus in place. In the example of FIG. 10, the pocket is configured to tightly fit the support extension, to increase the frictional fit.

In this way, the wheel can be used to move and manoeuvre the case or cover. For example, the case or cover could comprise a handle at a portion of the case opposite the wheel, so that the case or cover can be wheeled or dragged using the apparatus. As will be understood by the skilled person, any number of wheels according to the example of FIG. 10 could be connected to the case, so as to increase ease of manoeuvre of the case.

In the arrangement shown in FIG. 10, the direction of protrusion of the support extension and the receiving pocket may be arranged so that the apparatus is biased to push the support extension into the pocket when the case or cover is pulled in a particular direction. For example, this could be especially useful where the case or cover has a shape such that the movement will primarily be in a single direction. For instance, a cover for a surfboard has a longitudinal length, wherein a wheel at one end of the longitudinal length can be actuated by pulling the cover by a handle at the opposite end of the longitudinal length. In this case the support extension and pocket can be configured to push the support extension into the pocket when the case or cover is pulled in a 'forward' direction.

FIG. 11 illustrates a sectional view of a second example of the apparatus. In this example, a wheel 12 is once again arranged to rotate around an axis 16, with the axis connected to a support 18. In this example, two support extensions 20a, 20b extend from the support 18. A first support extension 20a extends from the support 18 in a direction opposite to the direction in which the second support extension 20b extends from the support 18.

In the particular example of FIG. 11, the first and second support extension 20a, 20b are integrally formed, so as to comprise a single element connected to the support 18 such that the first and second support extension 20a, 20b form 'wings' extending to each side of the support 18 (and wheel 12). In this way, the apparatus could be considered to comprise a connector element 26 between the first and second support extension. The first support extension 20a, the connector element 26, and the second support extension 20b are integrally formed. In the example of FIG. 11, the element comprising the first support extension 20a, the connector element 26, and the second support extension 20b are substantially planar.

In use, the first support extension is arranged to be received into a cavity defined by a tab or loop 24a at the wall of the case or cover. The cavity defined by the tab or loop is open at first and second, opposite ends, so that the support extensions can be inserted through the tab or loop. In the example of FIG. 11, the tabs are arranged so that when both the first and second support extensions are inserted into their respective tab or loop, the apparatus is braced between the tabs.

Importantly, in this example the tabs are fixed to the case or cover, and the piece or element forming the first support extension 20a, the connector element 26, and the second support extension is formed from a stiff but resilient material. This allows a force to be applied to bow or bend the piece sufficiently to allow the support extensions to be slotted through the tabs, but then for the apparatus to be held securely in place once the force is removed and the piece returns to its resting state (which in this example is substantially planar).

Figure 12A:
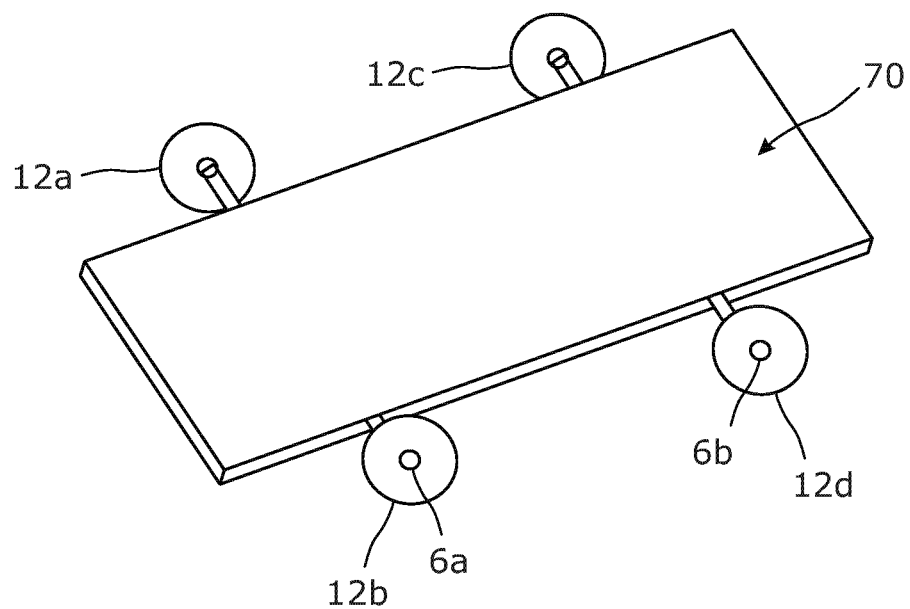
FIGS. 12A and 12B show sectional views of a second example of the apparatus.
Figure 12B:
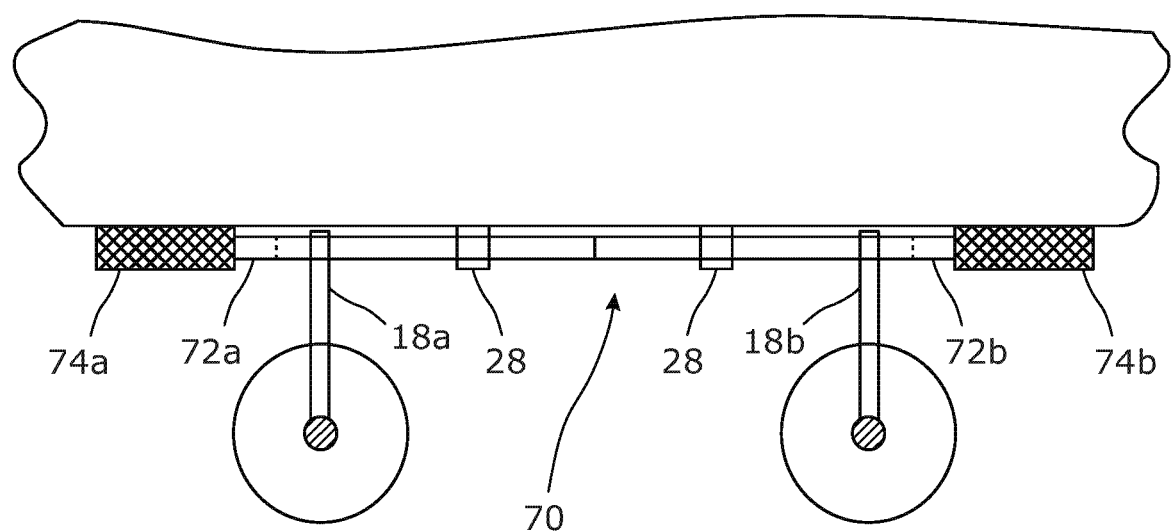

FIG. 12A provides a projection view of the apparatus of a third example, prior to attachment to the case or cover. FIG. 12B shows a sectional view of the same example of the apparatus once connected to the case or cover.

This example of the apparatus includes a first axle, having a first pair of wheels 12a, 12c arranged to rotate around the first axle 6a. The apparatus further includes a second axle 16b having a second pair of wheels 12b, 12d arranged to rotate around the second axle 6a.

A single element is arranged as a platform or deck, with the first and second axle connected to the deck 70 via a first and second connector 18a, 18b. The deck 'overhangs' the wheels and axis, providing extensions or wings from the position of connection of the first and second axle to the deck. These wings provide the first and second support extension. In this example, in a similar manner as the example of FIG. 11, the first and second support extension are connected and formed as a single piece. The portion of the deck connecting the first and second support extension (i.e. arranged between the first and second support) can be considered a connector element 26.

As shown in FIG. 12A the apparatus forms a wheeled deck, similar to a skateboard or scooter. In some examples the dimensions of the apparatus could be made suitable to be used as a skateboard or scooter when not connected to the case or cover.

FIG. 12B shows a sectional view of the example of the apparatus in FIG. 12A, connected to the case or cover. The regions or wings of the deck 70 forming the first and second support extensions 72a, 72b are received at a respective first and second cavity 74a, 74b at the wall of the case or cover. In particular, the first and second cavities 74a, 74b are formed by a first and second pocket in the wall of the case or cover.

Similar to the example of FIG. 11, the deck 70 is resilient but relatively stiff. This allows the deck (comprising the first support extension 72a, connector element, and second support extension 72b) to be bowed sufficiently to allow the user to insert or slot the first and second support extension into the respective first and second pocket 74a, 74b. Advantageously, use of a pocket (rather than a looped tab) helps to prevent movement of the apparatus in the longitudinal direction of the deck, as a result of the closed cavity provided by the pocket buffering the ends of the support extensions.

In this example, additional fasteners 28 are provided for connection of the apparatus to the case or cover. In particular, the fasteners in this example are straps connected by a hook and eye or loop fastening (e.g. Velcro®) fixed to the wall of the case and arranged to wrap around the connection element of the apparatus.

Figure 13A:
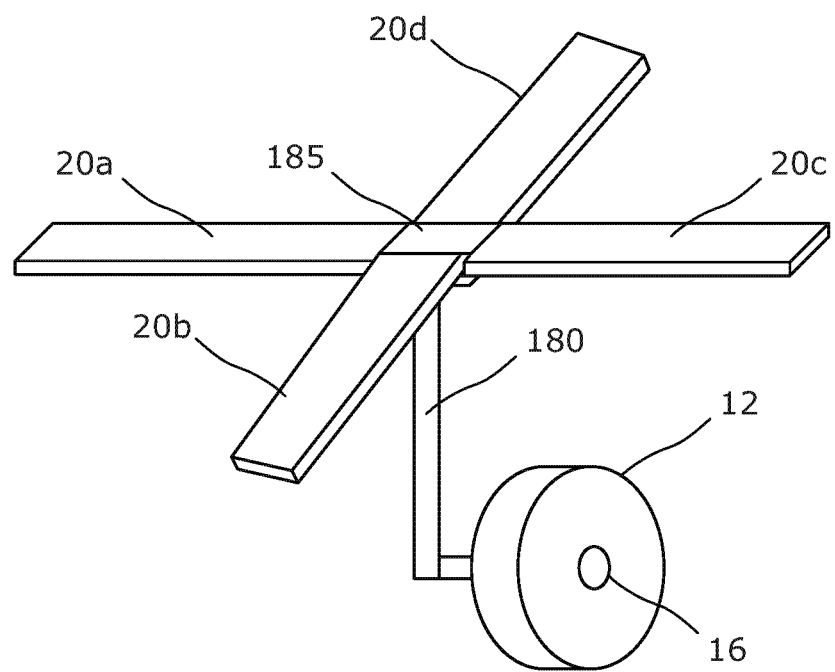
FIG. 13A shows a perspective view of a third example of the apparatus.
Figure 13B:
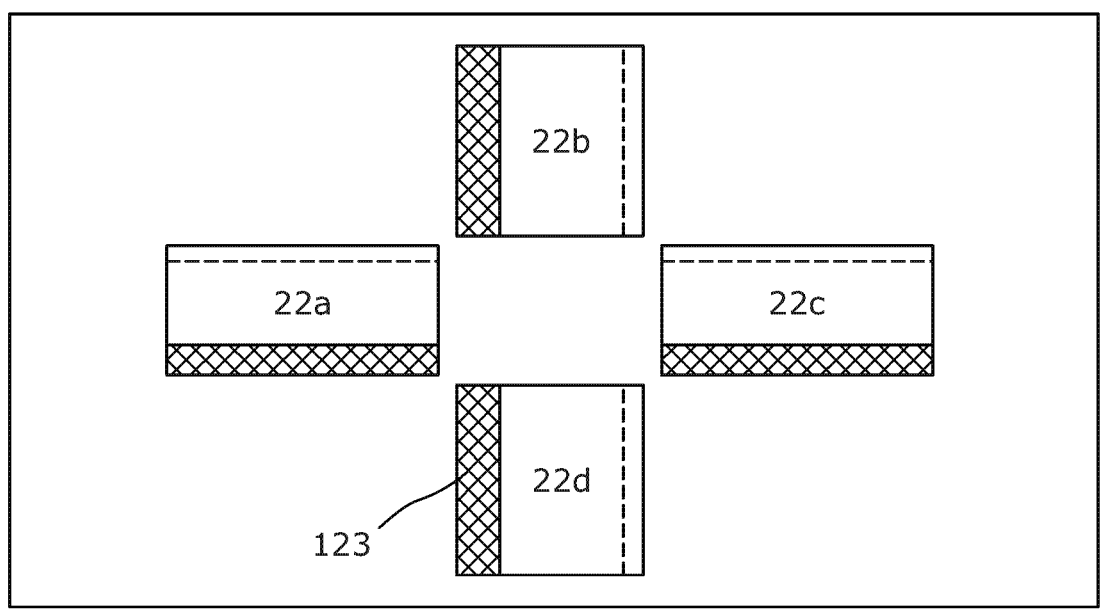
FIG. 13B shows a sectional view of the apparatus of FIG. 13A, when in use.

FIG. 13A shows a projection view of a still further example of the apparatus. FIG. 13B shows a plan view of the case or cover for connection with the apparatus of FIG. 13A.

FIG. 13A illustrates an apparatus having a wheel 12, arranged to rotate around an axle 16. The axle is connected to a support, the support consisting of a first element 180 and further comprising a base element 185. Four separate support extensions 20a, 20b, 20c, 20d extend from the base element 185 of the support. The four support extensions 20a, 20b, 20c, 20d are arranged to extend in the same plane, but in different directions from the base element 185 of the support.

In this example, the first element may rotate with respect to the base element 185. This allows the wheel 12 and axle 16 to rotate compared to the base element 185. Furthermore, this allows the wheel 12 and axle 16 to rotate relative to the support extensions 20a, 20b, 20c, 20d.

FIG. 13B illustrates a plan view of a wall of the case or cover, to which the apparatus shown in FIG. 13A can be connected. The case or cover includes four cavities formed by four pockets 22*a*, 22*b*, 22*c*, 22*d*. Each pocket is arranged to receive one of the respective four support extensions shown at the apparatus of FIG. 13A.

The pockets of FIG. 13B are permanently fixed to the wall of the case or cover on one side by stitching. Two further sides of the pocket are coupled with the wall of the case or cover via a detachable fastener 123 (in this case, a zip). This allows the pockets to form flaps when the fasteners are uncoupled (i.e. the zips are undone). In this way, the support extensions can be more easily inserted into the cavity formed by the pockets, and the detachable fasteners secured around the four support extensions.

Figure 14A:
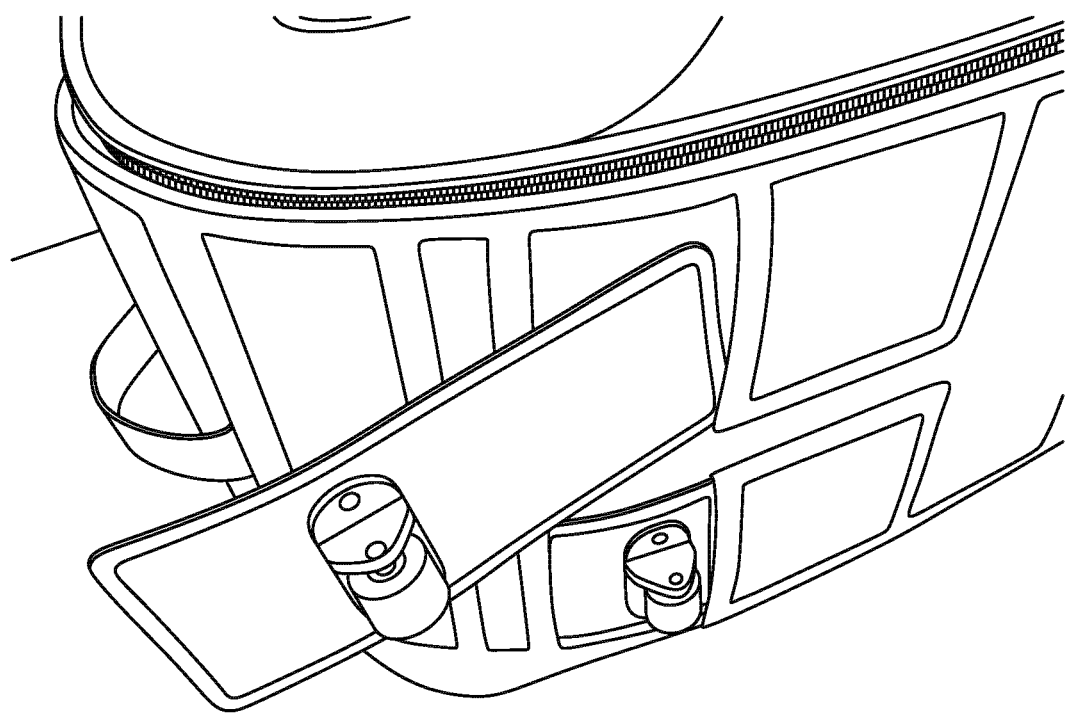
FIGS. 14A and 14B show a photograph of the wheel assembly apparatus includes within a bag or cover.
Figure 14B:
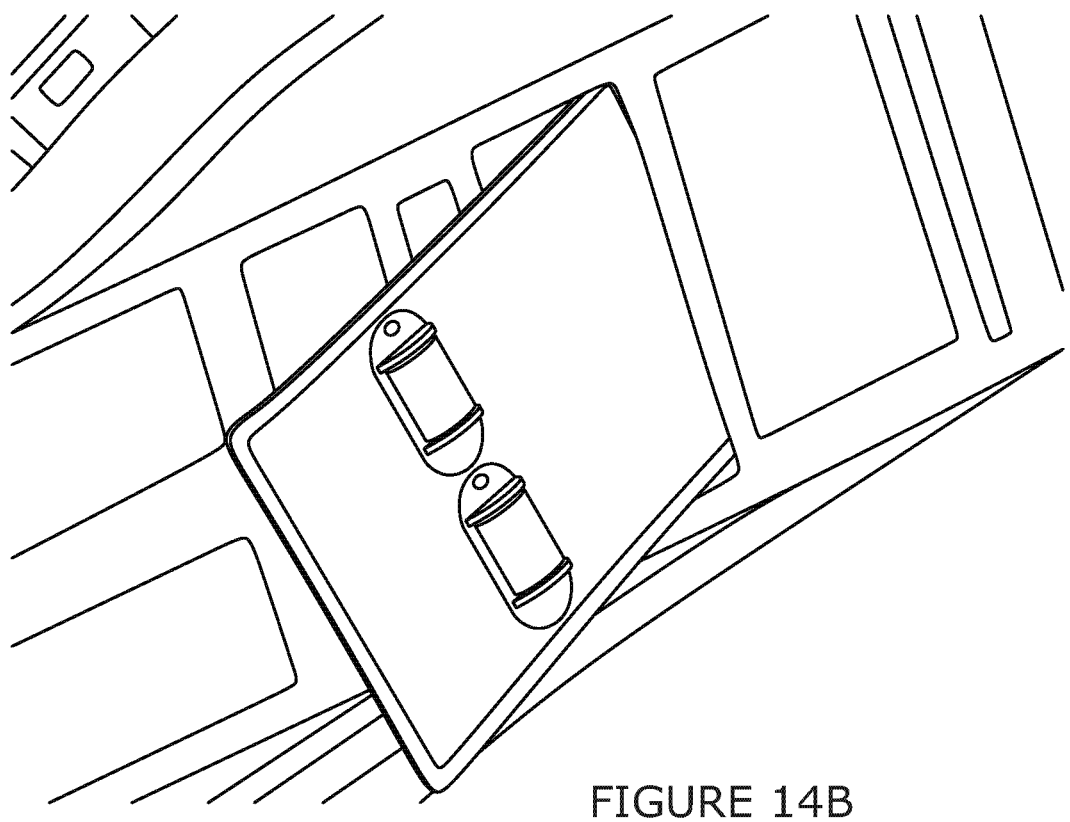
Figure 15:
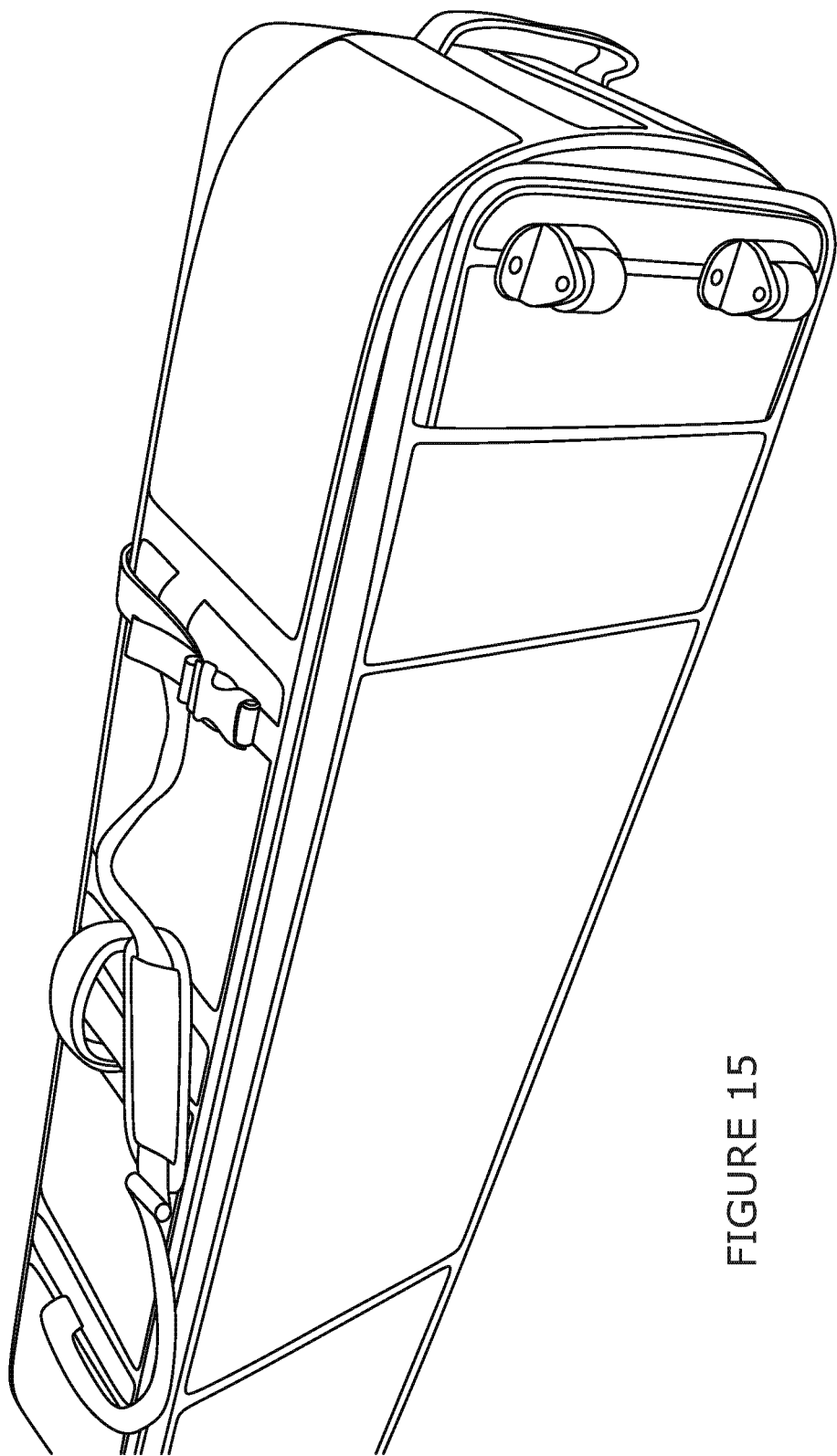
FIG. 15 shows a photograph of a bag or cover according to FIG. 1, including a removable wheel assembly apparatus.

FIG. 14 and FIG. 15 shows photographs of example cases having removable wheels. For instance, FIG. 14(*a*) shows a side panel of the case or cover having a great width than FIG. 14(B). This, FIG. 14(*a*) shows two separate a flexible decks, each having a wheel attached. The decks slot into a pocket attached to the side panel of the case, in order that each wheel is separably removable. FIG. 14(*b*) shows a single deck, having two wheels attached. Again, the deck slots into a pocket or cavity on the side panel or wall of the case.

The wheel assembly may attach to a top or bottom panel of the case, rather than a side panel. This is shown in FIG. 15. Here, a deck incorporating 2 separate wheel assemblies is inserted into the pocket on a 'bottom' panel of the case. FIG. 15 shows the removable, hinged side panels, the removable, hinged top and bottom panel, and the removable wheels assembled to form a case, in the manner described above.

Figure 16:
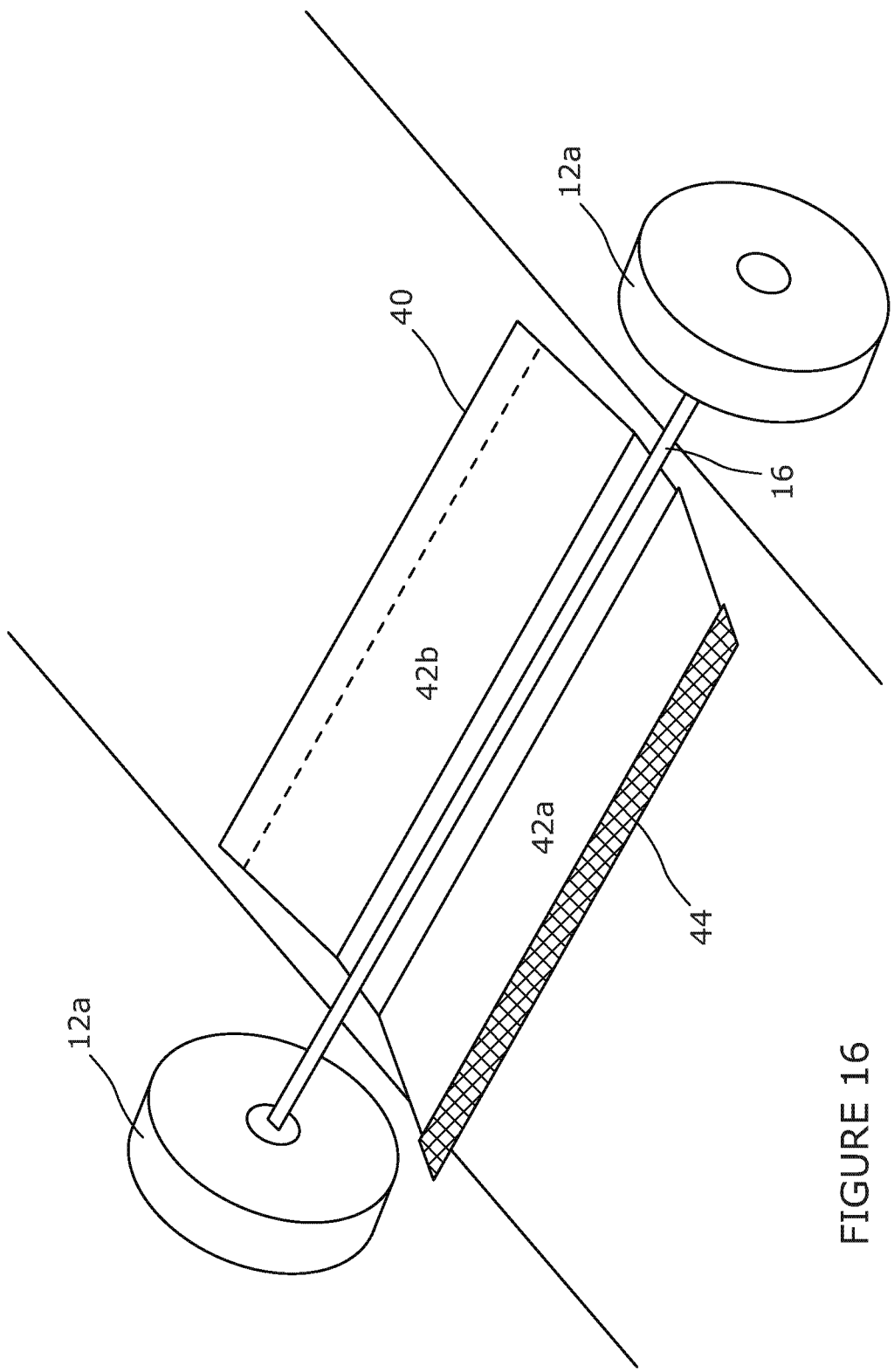
FIG. 16 shows a perspective view of a fourth example of the apparatus.
Figure 17:
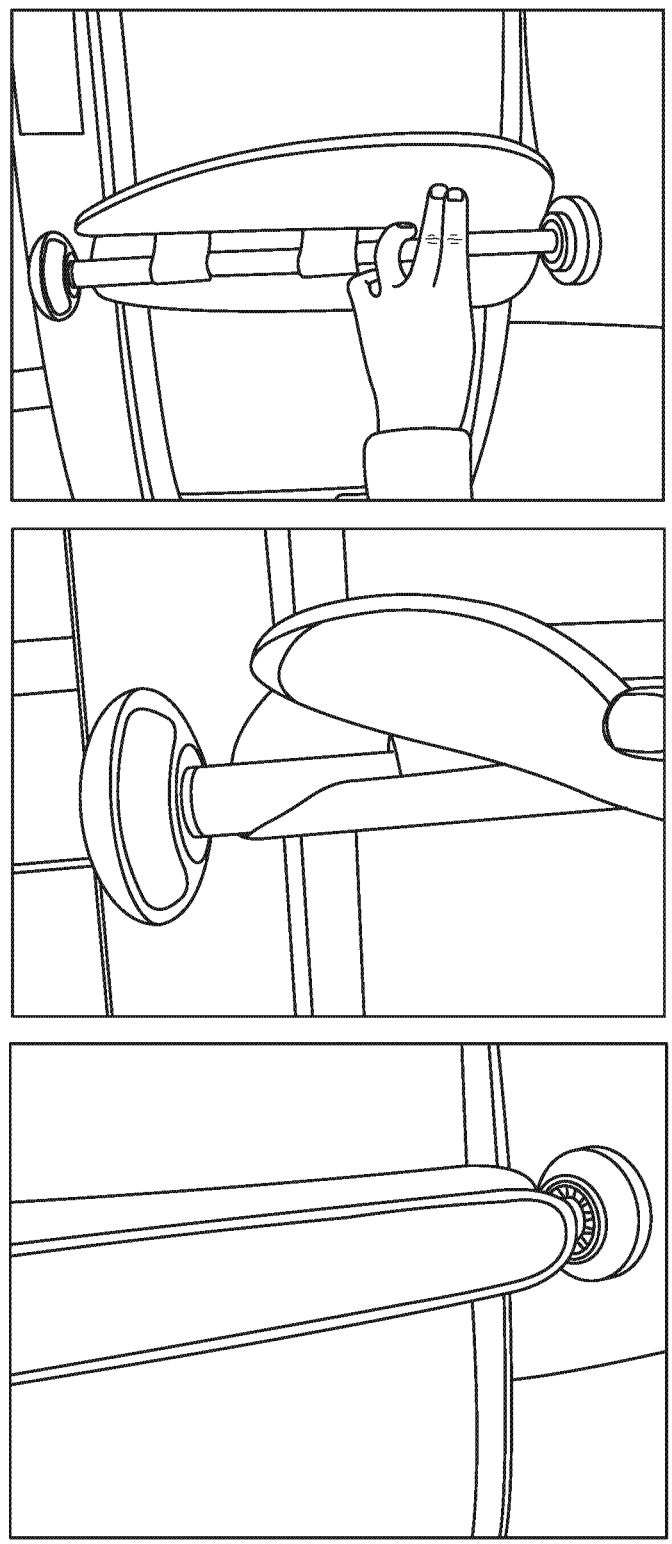
FIG. 17 shows a photograph of the fourth example of the apparatus, attached to a case or cover.

FIG. 16 shows a still further example of a detachable wheel for a case or cover. A photograph of the detachable wheel for a case or cover in FIG. 16 is shown in FIG. 17. In this example, wheels 12*a*, 12*b* are arranged to rotate around an axle 16. An adaptor 40 is arranged at a wall of the case or cover. The adaptor comprises a first 40*a* and second 40*b* flap which can be secured around the axle 16, to form bushings for the axle to rotate therein.

The first and second flap of the adaptor can be fastened around the axle using a fastener 40. In this example, the first and second flap comprises hook and eye fasteners (such as Velcro) which can be used to couple the two flaps. In this way, the flaps form an envelope around the axle, to hold the axle. The axle (and attached wheels) can therefore rotate within the adaptor.

In the example for FIG. 16, the flaps can be made from a layered material, for example layers of webbing. The layered material may further comprise at least one layer of self-reinforcing polypropylene. The flaps may be joined to the outer wall of the case or cover by stitching, riveting or gluing (e.g. as described within this disclosure).

In some alternative implementations, the examples of FIG. 10, FIG. 11, FIG. 12A, FIG. 12B, FIG. 13A and FIG. 13B the support is connected to the axle at an angle around 90° from the longitudinal direction of axle. However, it will be understood that the support could be arranged at an angle less than or greater than 90° to the axle.

Furthermore, in the examples illustrated in FIG. 10, FIG. 11, FIG. 12A, FIG. 12B, FIG. 13A and FIG. 13B the support extensions extend at an angle of around 90° from the support. However, the support extensions can extend from the support at another angle. Ideally the angle between the support and the support extensions will be greater than 30° and ideally greater than 45°. In most examples where a plurality of support extensions is used, the plurality of support extensions will extend from the support so as to be arranged in substantially the same plane.

The examples of FIG. 10, FIG. 11, FIG. 12A and FIG. 12B each show a support comprising a single element connected to the support extensions. However, it will be understood that the support may comprise more than one element. For instance, the support may comprise a base, platform or footing element specifically for connection to the support extension, as demonstrated in FIG. 13A. The support may further comprise two or more elements to allow rotation of the wheel relative to the support extensions (which, in use, will be connected to the wall of the case or cover).

In the examples of FIG. 10, FIG. 11, FIG. 12A, FIG. 12B, FIG. 13A and FIG. 13B the at least one support extension is held in place by friction between the adjacent surfaces of the support extension, pocket or tab and case or cover. It will be understood that a layer of a specific material could be applied to these adjacent surfaces, in order to increase friction there between. For example, the surfaces could be coated in a rubberised material. In other examples, a 'tread' could be applied at the adjacent surfaces to increase friction between the surfaces (e.g. an interference fit).

It will be noted that in the example of FIG. 11, the axle is arranged having a longitudinal direction parallel to the direction in which the support extensions extend. This is in comparison to the example of FIG. 10, in which the wheel is arranged such that the longitudinal direction of the axle is configured to be perpendicular to the direction of extent of the support extension. As will be understood be the skilled person, in any of the described examples the arrangement of the angle of the axle relative to the direction of extent of the support extension can be configured according to the specific requirements of the user and the case or cover for connection with the apparatus.

Furthermore, although in the examples of FIG. 10, FIG. 11, FIG. 12A and FIG. 12B the tabs are shown to be fixed to the case or cover, it should be understood that the tabs could be detachable from the case or cover, or could be formed as a flap having a first fixed (i.e. stitched) edge and a fastening mechanism to couple a second, opposite edge to the cover or case (for instance, as illustrated with respect to FIG. 13A and FIG. 13B). In this way, the apparatus could be arranged at the surface of the case or cover and the flaps or tabs fastened over the support extensions to hold them in place. If the tabs are configured in this way, the support extensions may not be resilient, as the cavity defined by connection of the tabs to the case or cover can be arranged around the support extension, without requiring bending or reshaping the support extensions. The pockets or tabs can be connected to case or cover by various types of connector or fastener including by not limited to stitching, riveting, gluing, a zip fastening, a hook and eye (e.g. Velcro) fastening.

In any of the examples of FIG. 10, FIG. 11, FIG. 12A, FIG. 12B, FIG. 13A and FIG. 13B, the support extensions may be formed of a resilient material. This may be particularly the case where the pockets or tabs are permanently fixed to the wall of the case or cover, as the resilient support extensions may be bent or bowed so as to insert or slot into the cavity at the pocket or tab.

In any of the described examples, the support extensions may comprise at least one layer of self-reinforcing polypropylene material. In certain instances, the support extensions may be formed using a plurality of layers. The plurality of layers may comprise a plurality of different types of material, for instance two layers of srPP with a substrate therebetween, as described elsewhere in the description.

We note that although additional fasteners to secure the apparatus to a case or cover are shown only in the example of FIGS. 12A and 12B, additional fasteners could be used in any of the described examples. For instance, straps or buckles, zips or hook and eye fastenings could be used to couple the apparatus to the wall of the case or cover, in addition to the mechanisms described using the support extensions.

Figure 18:
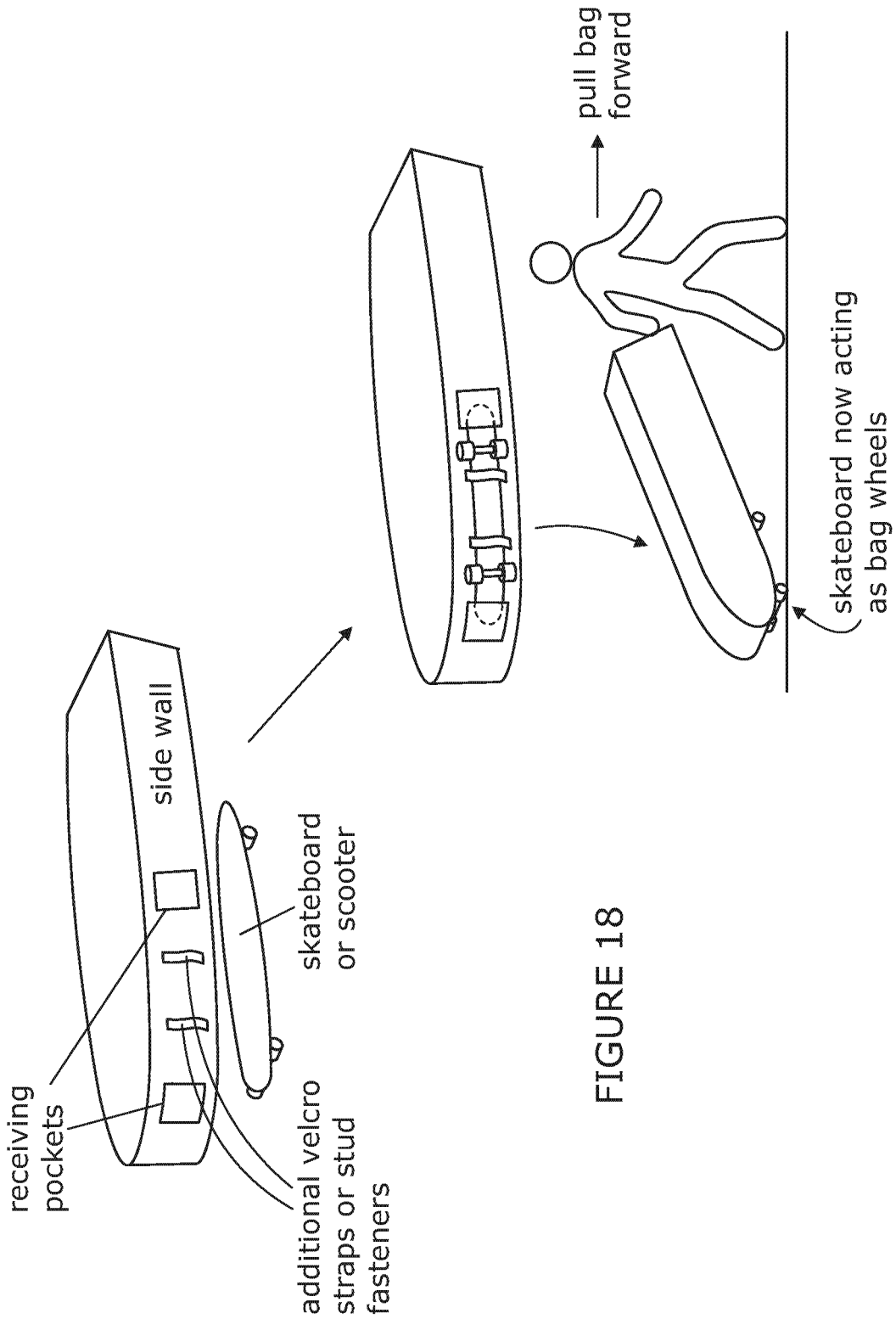
FIG. 18 shows a perspective view of a fifth example of the apparatus.

FIG. 18 shows a skateboard or scooter, which can be attached to the side wall of a bag or case. The ends of the skateboard can be received in pockets attached to the case or cover, with additional fastenings to hold the deck of the skateboard in place. As such, this embodiment is similar to the embodiment of FIG. 12A or 12B. However, in the example of FIG. 18, the skateboard is also suitable for use as a personal mode of transportation, when not attached to the case or cover.

Methods of Manufacturing Multilayer Panels Comprising srPP

Figure 25:
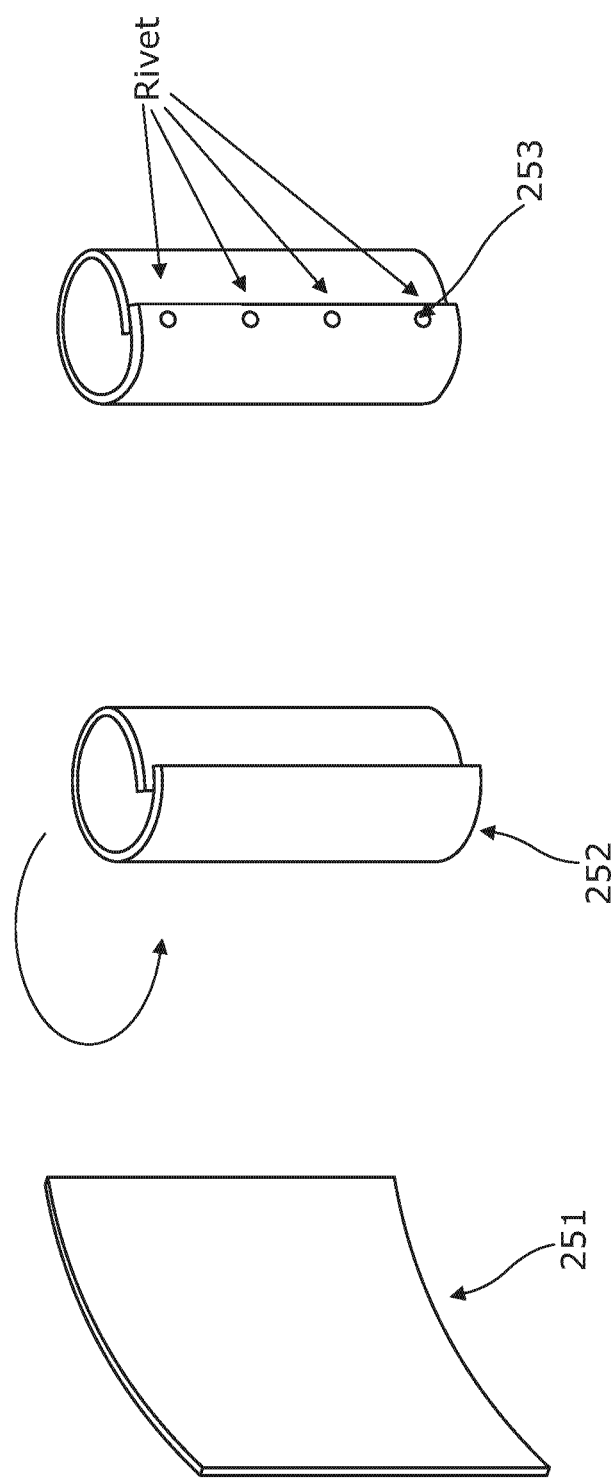
FIG. 25 shows a perspective diagram showing how a sheet of srPP may be rolled and joined to form a reinforcement member.
Figure 28:
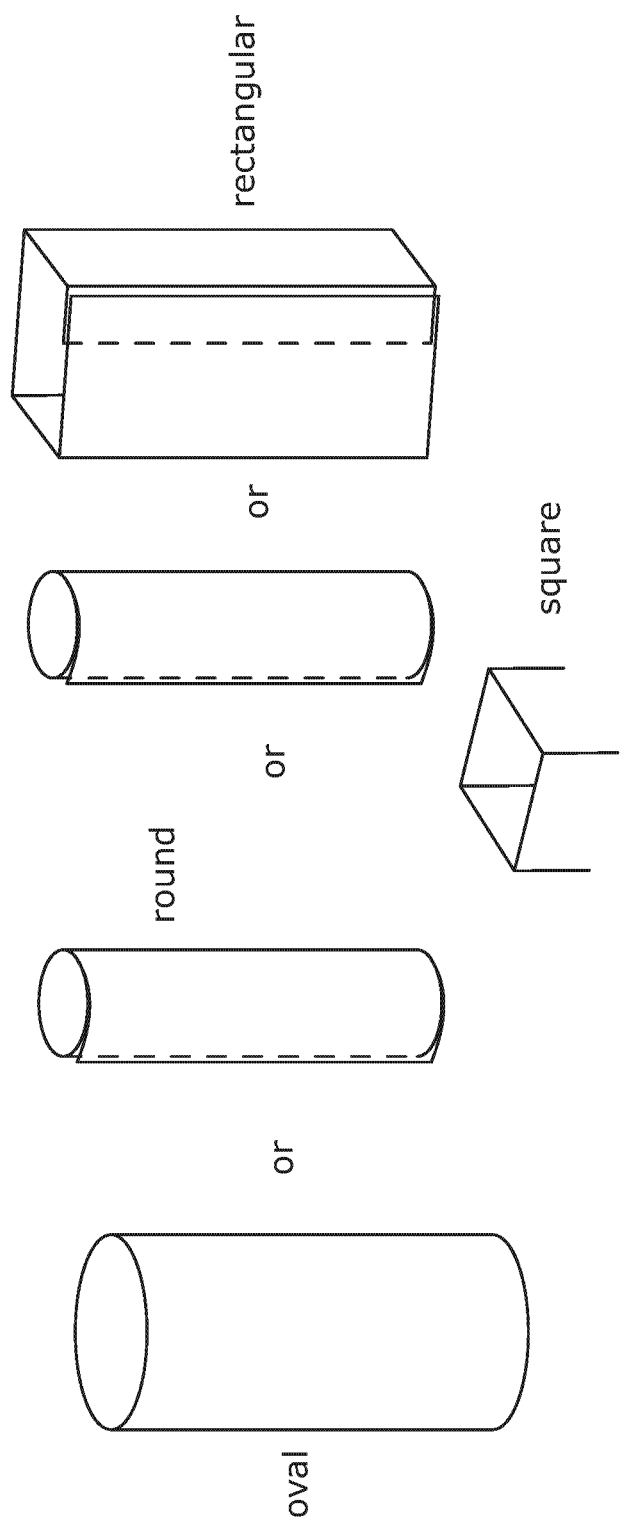
FIG. 28 shows an example set of shapes of the reinforcement member of FIG. 25.

The following describes the use of innovative manufacturing techniques to allow the use of self-reinforced polypropylene (srPP) and optionally ePP combined to add structural integrity to packaging cases, bike bags, backpacks, personal protective gear, hobby, sports, military accessories and other items. A flat sheet srPP may be rolled into tubing or folded into sections or otherwise form a cylinder, as shown in FIG. 25.

Figure 19:
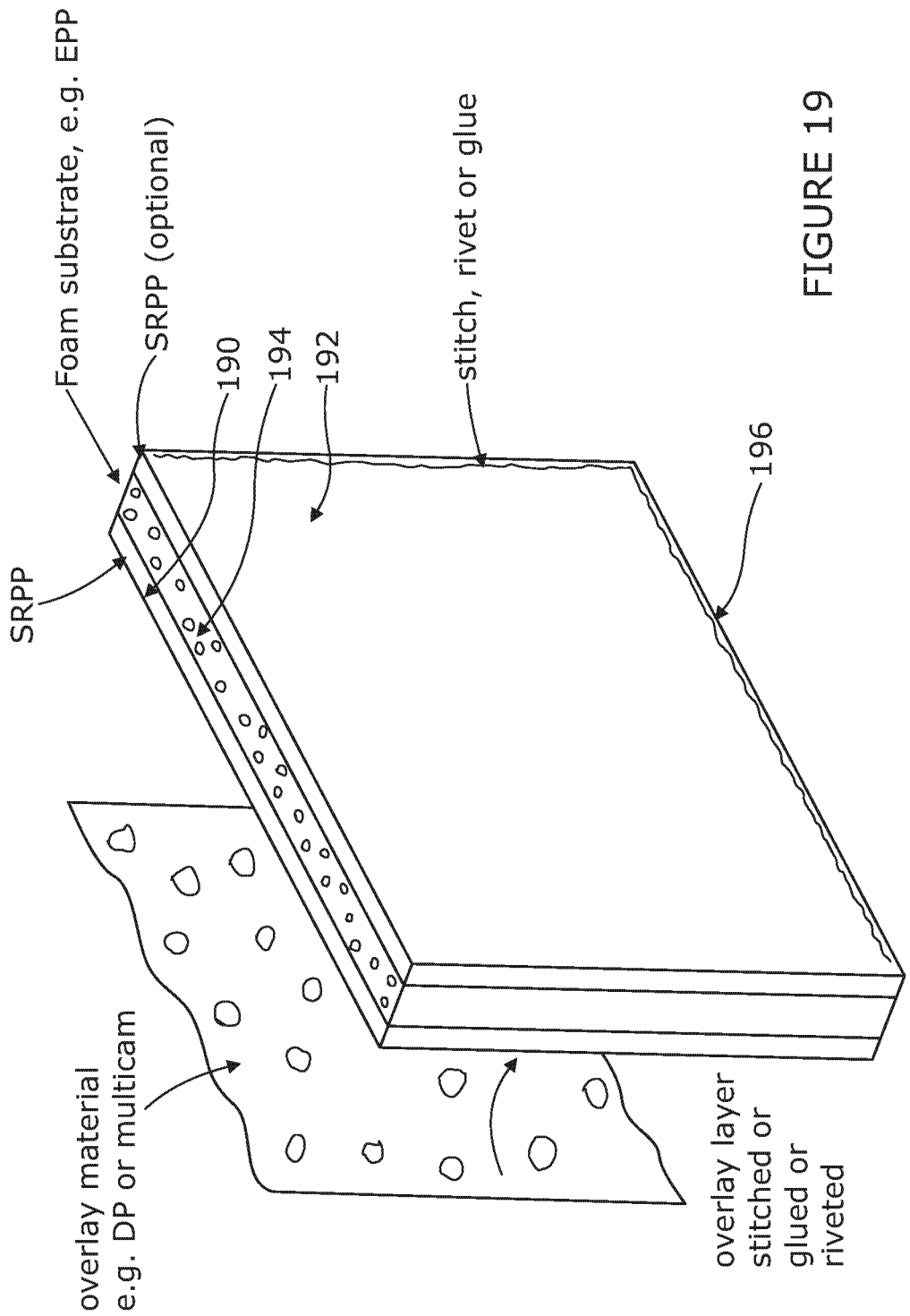
FIG. 19 shows a schematic diagram of a material composition or layered structure used to form the case of FIG. 1 and other items.

FIG. 19 illustrates a multilayer material formed by stitching, gluing, riveting 196, (or otherwise bonding) outer layers of srPP, 190, 192 between a substrate 194 such as ePP. This material is lightweight, heat and infrared resistant and can provide military grade protection for equipment such as radios, ammunition, and other sports and military gear.

Figure 20:
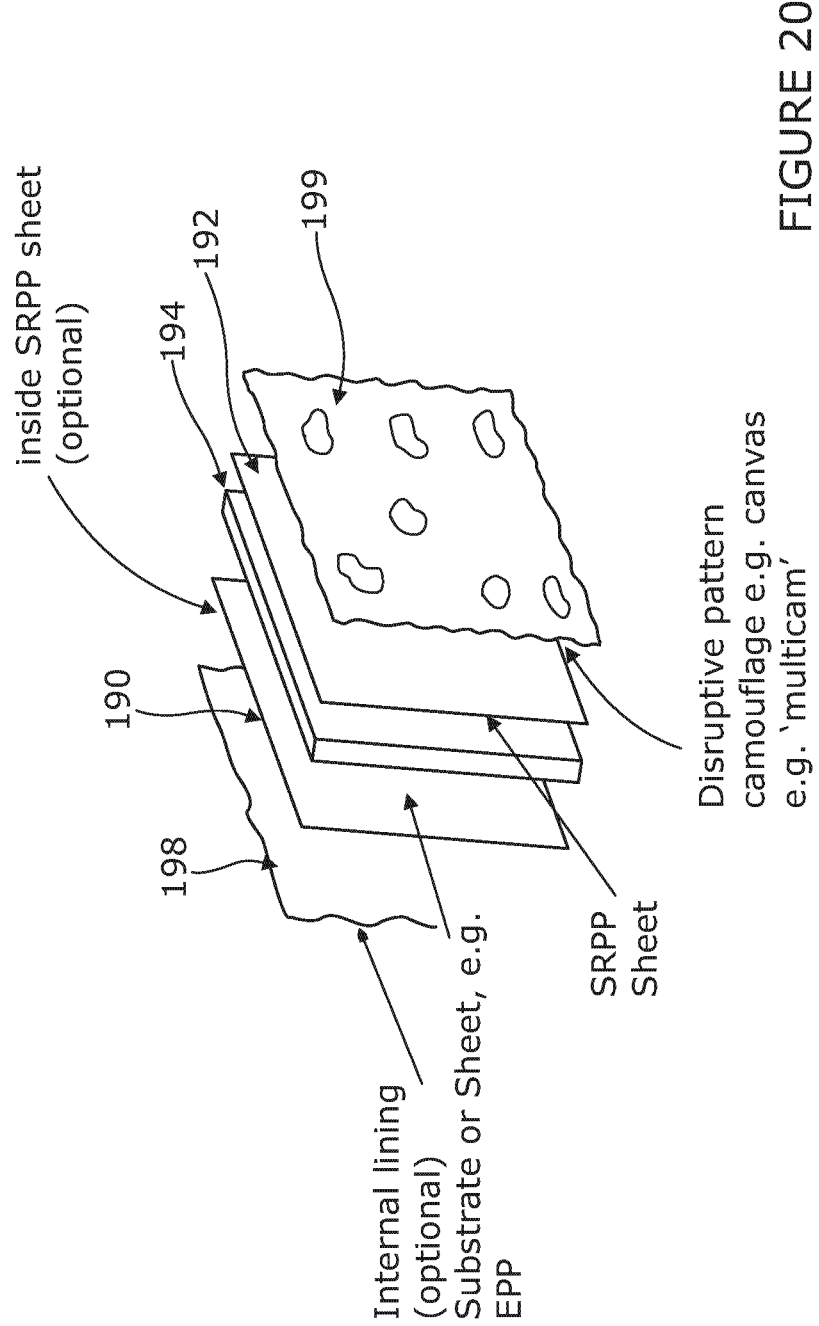
FIG. 20 shows a schematic diagram of a further material composition or layered structure used to form the case of FIG. 1 and other items.

FIG. 20 shows a further example multilayer material formed by stitching, bonding, gluing or riveting srPP 190, 192 and ePP 194 sheets. This example includes an outer decorative layer of fabric 199. This may be of camouflage or other design. Benefits of this material include being hardwearing, low IR footprint, shrapnel or ballistic protection, flexible (as thermoforming is not required) and lightweight. This multilayer material also comprises an optional internal lining layer 198.

The following describes manufacturing techniques to enable the use of srPP on sports, travel, utility, catering, military, medical, professional and hobby bags and other applications. In addition, the biological properties of srPP, e.g. wipe clean on both the internal and external layers of an insulated box would be a useful in many applications, including but not limited to catering, medical.

The use of srPP (self-reinforced polypropylene) as a lightweight, highly protective material answers many of the technical requirements for the above application demands. However, whilst it is commonplace in a thermoformed environment with curves and bending of packaging being achieved in complex moulding processes, this results in only one layer, usually the external layer being srPP being bonded to a substrate foam.

Instead, a method of manufacturing includes stitching, gluing or riveting two layers of srPP on either side of a foam or other substrate sandwich such as EVA, EPE, ePP or bio foams or natural fibres. This material may be used flat or can be formed into complex curves and shapes, without the need for thermoforming.

Figure 21:
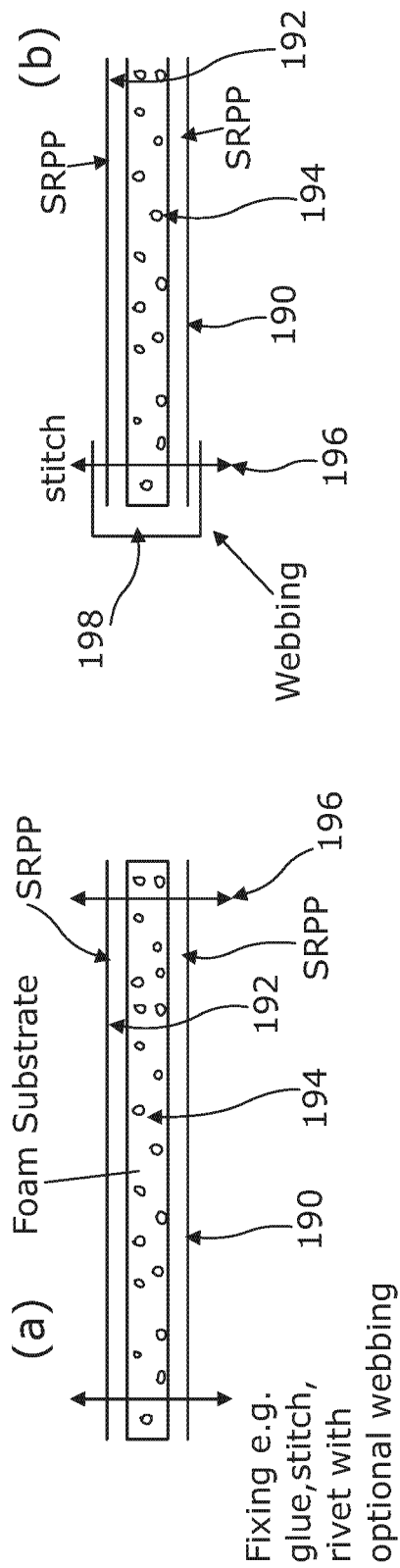
FIG. 21 shows a series of schematic diagrams illustrating different methods of manufacture based on the material composition of FIG. 19.

FIG. 21 illustrates the general form of this manufactured material. A substrate layer 194 (comprising a foam such as EVA, EPS, EPE, ePP, biofoam or another type of foam) may be 'sandwiched' between a first and a second layer of srPP 190, 192. In FIG. 21(*a*), a fastener 196 is used, which penetrates through the two layers of srPP and substrate, in order to bod the layers. The fastener comprises a rivet or stich, for example. In FIG. 21(*b*), webbing 198 is secured around to the edge of the multilayer material, and the fastener 196 further penetrates the webbing when bonding the srPP and substrate layers. By bending the srPP any substrate layers, and then stitching or bonding the layers to hold the tension of the bent layers (relative to each other), complex shapes and forms for the multilayer structure can be achieved. This is shown in FIG. 21(*c*).

This method means produces a material that can be incorporated into a foldable bag or case (e.g. of the types described in this disclosure) for ease of initial transportation from the place of manufacture and then efficient storage at the distributors warehouse and then efficient storage by the customer when the bag is not in use.

This material can be manufactured for both internal and external protection purposes, which are not currently possible with thermoformed techniques. In some examples, circular or semi-circular shapes could be used to make drum kit bags for large spherical or cylindrical equipment that requires the protective capability of a srPP and ePP (or other substrate) combination.

Figure 22:
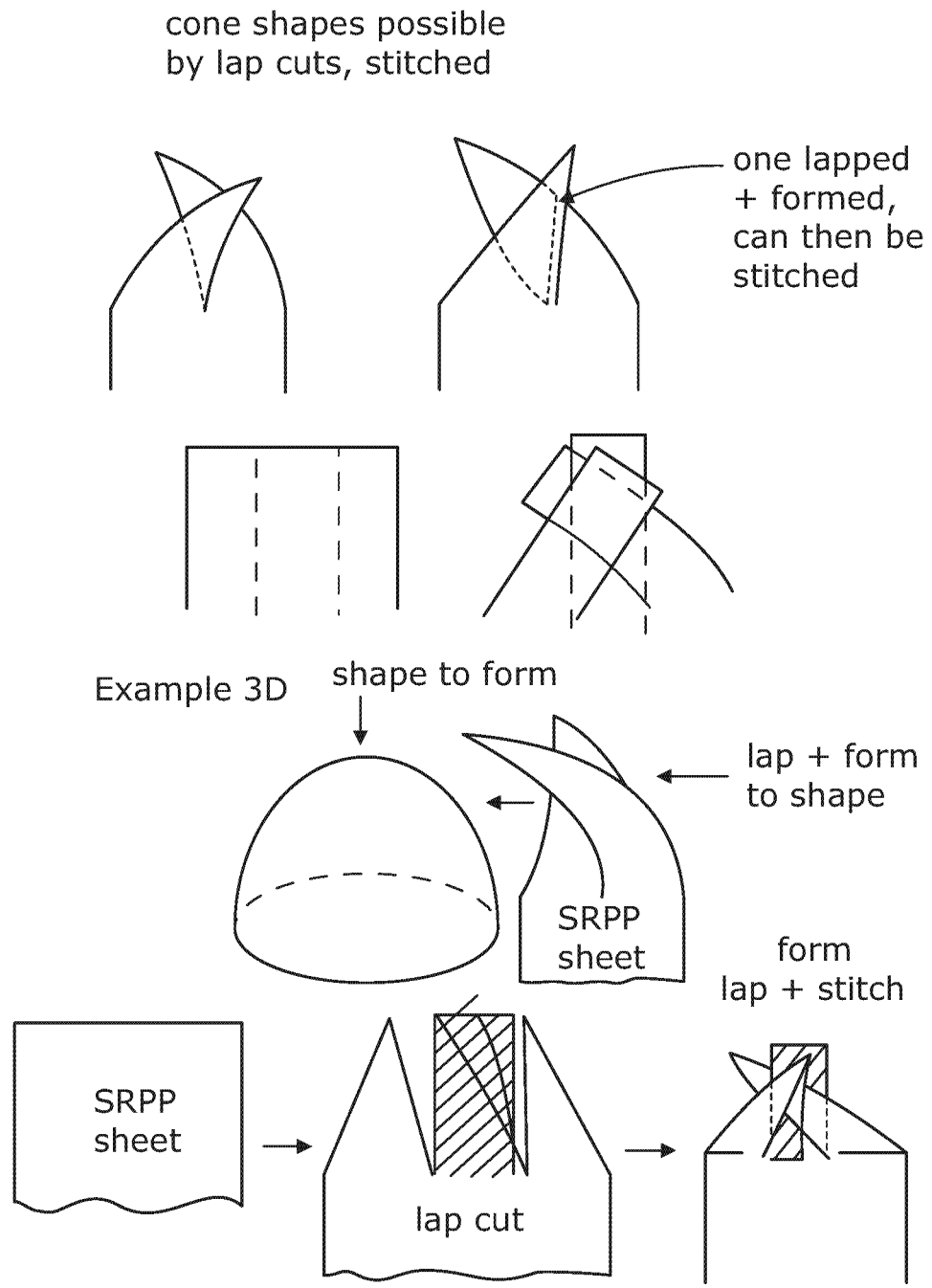
FIG. 22 shows further example steps illustrating different methods of manufacture based on the material of FIG. 19.

FIG. 22 illustrates further example steps that may be included in the method of manufacture. Cuts and laps may be included in the sandwich of layered material (srPP-substrate-srPP) to form more complex shapes before or during the bonding step (preferably stitching through all layers but may be riveting or gluing).

Figure 23:
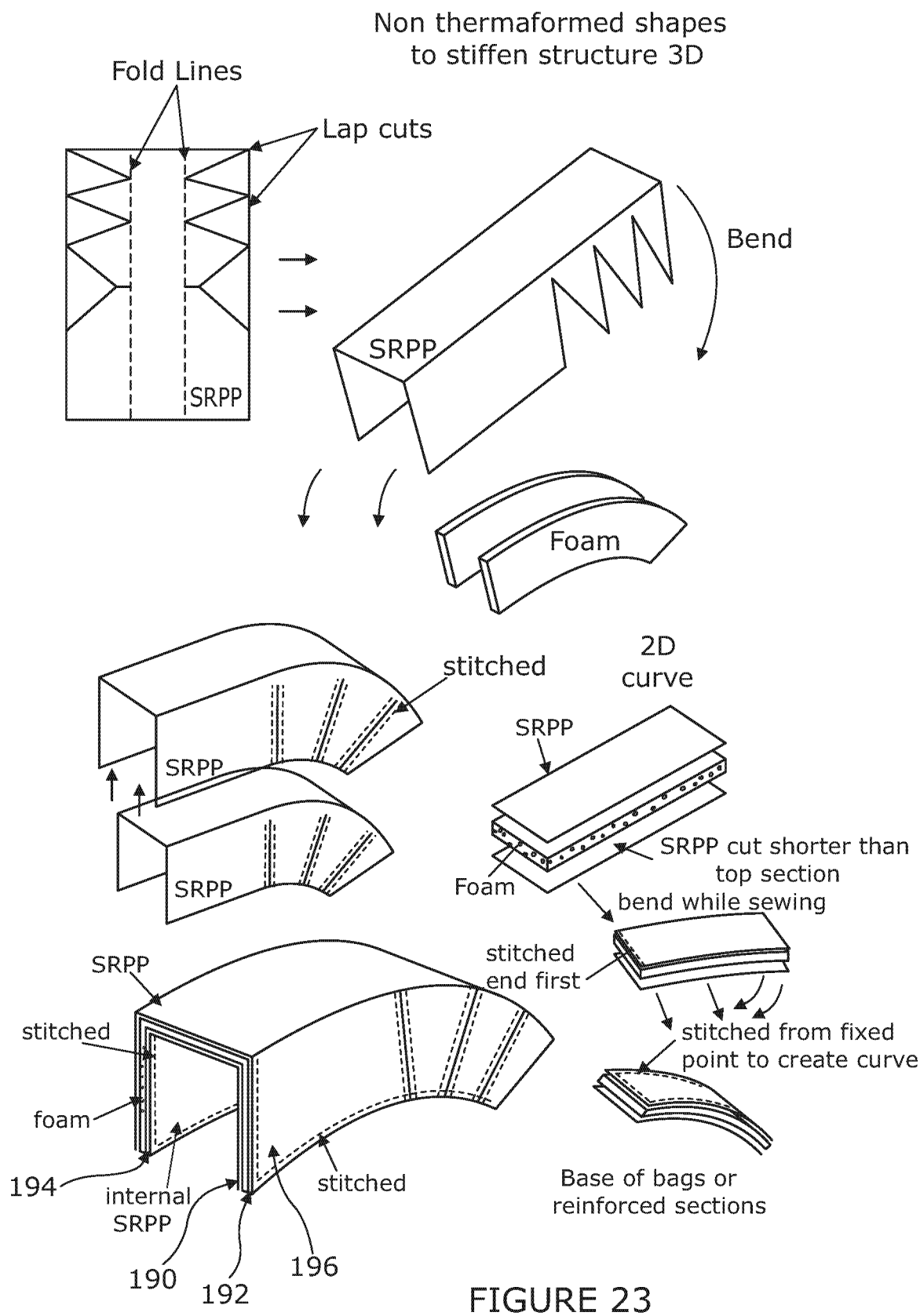
FIG. 23 shows further example steps illustrating different methods of manufacture based on the material of FIG. 19

FIG. 23 illustrates further example steps that may be included in the method of manufacture. Individual items may be manufactured from any combination of these steps. A foam template or form is shown in this figure. Again, cuts are used to enable the srPP layers to form around the substrate and the item is then stitched. 2D curves are formed by bending during the sewing step. This may be used, in particular, for the bases of cases.

Figure 24:
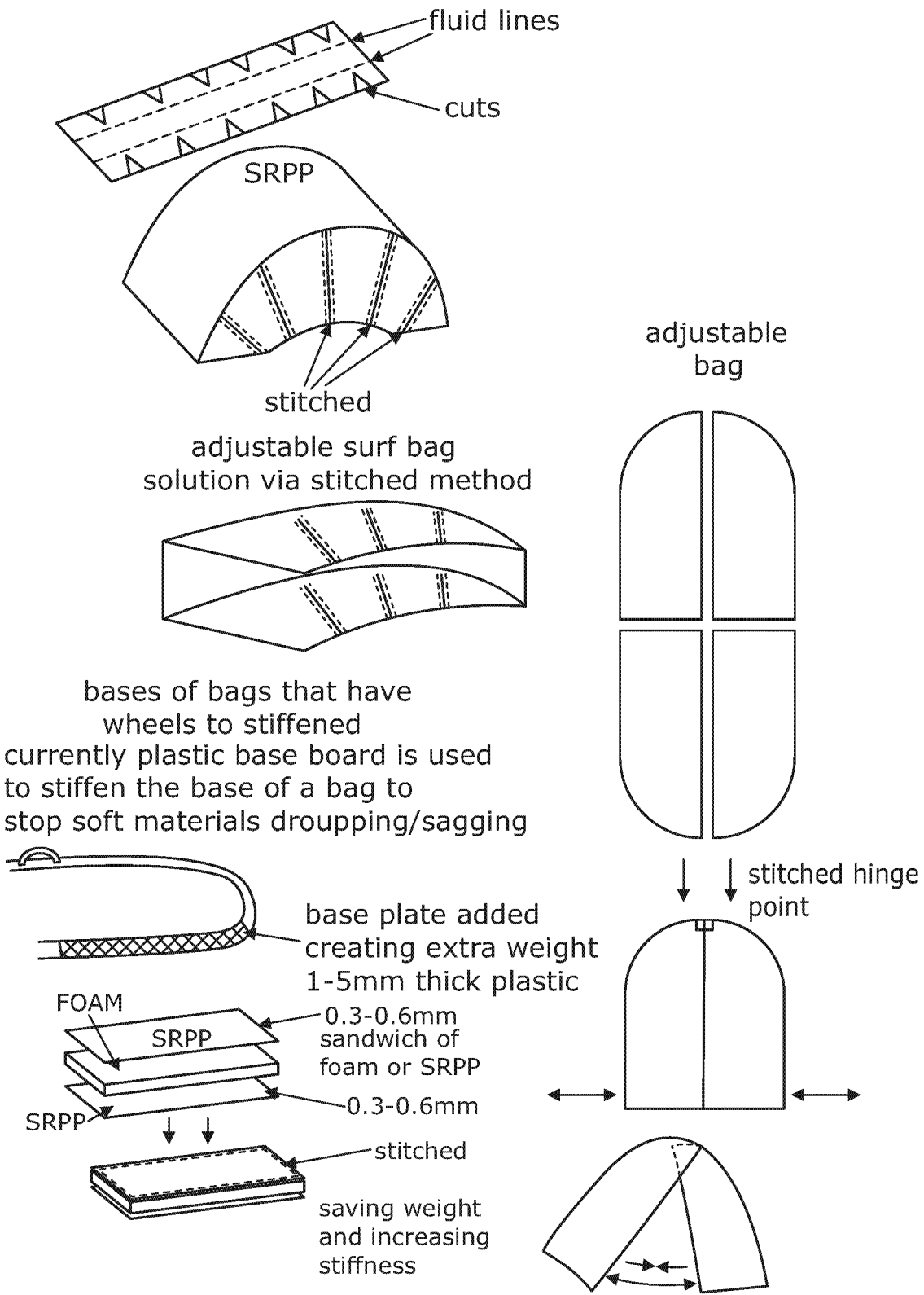
FIG. 24 shows further example steps illustrating different methods of manufacture based on the material of FIG. 19

FIG. 24 illustrates further example steps that may be included in the method of manufacture. This figure shows how the method of manufacture may be used to form portions of the adjustable or foldable case described in this disclosure. These portions include the first and second (e.g. top and bottom panels). Reinforcing plastics material may be added before or during the bonding (sewing) steps. However, preferably, the srPP material replaces the plastic base board traditionally used in bags and bases. Said plastic base boards reduce sagging of soft wall bases of a bag, but can add significant weight. Thus use of srPP, or in particular the multiplayer material discussed with respect to FIG. 19 or FIG. 20, can significantly increase the robustness of the bag (increasing the stiffness of the walls compared to soft wall bags) and reduce sagging of the bag walls, without significant weight increase.

The substrate or foam layer may be rigid or semi-rigid. An existing or preformed foam 3D shape may be covered with srPP or alternatively be stitching appropriately and in strategic places in order to make a complex shape with contours and curves out of flat srPP. Flat foam and flat srPP as the bottom (and/or top layers) may then hold their shape after the bonding or stitching.

Reinforcement Members Comprising srPP

In many applications there is a constant trade-off between weight of an article and its rigidity and toughness. In applications where rigidity is required the material of choice has been lightweight aluminium frames or ABS plastic.

These include such examples as backpacks, military radio packs, bike bags and the like.

srPP is often used in thermoformed products such as cases. This requires the use of expensive moulds and complex moulding manufacturing techniques. However, as rigidity may not be high enough the moulded case may be combined with aluminium or similar hard frames. This further increases the complexity of the manufacturing process. Furthermore, the use of mixed materials can add weight.

However, use of the srPP as the reinforcement material has advantages in that it is generally 100% recyclable, presents a very low or nil radar footprint and when combined with ePP can have a low infrared footprint. Such attributes may be especially useful for military and hunting applications. In addition, srPP is remarkably lightweight for its strength.

However it can be difficult to extrude srPP into tubing. Instead, a flat (e.g. flexible) sheet srPP may be rolled or folded into tubes for reinforcement. In the example of FIG. 25, a flat panel of srPP 251 is rolled into a tube or hollow cylinder of srPP 252. The tube of srPP can be secured by use of a fastener 253 such as rivets, poppers, zips or Velcro®.

The flat (e.g. flexible) sheet srPP may be rolled or folded into ovals, round, square, rectangular or other shaped tubes in relatively small diameter (e.g. 5 mm to 10 mm or 10 mm to 50 mm) and then by using stitching 256, riveting, gluing 255 or hook and eye 254 (Velcro®) to close the tube or cylinder of the reinforcement material (see FIGS. 26 and 27). In addition if hook and eye or other reusable or separable fasteners are used then the tube or cylinder may be fully disassembled and returned to the form of a flat sheet, for the purposes of packing (e.g. flat). The sheet may include pre-folded ridges or creases to aid folding. This process forms reinforcement members that in use can be both robust and lightweight (i.e. compared with metal or plastics material) and formed into different shaped cylinders (see FIG. 28, which includes oval, round, circle, square and rectangle cross-sectioned cylinders or tubes). The process also forms reinforcement members that can be easily dissembled and stored.

These tubes or cylinders comprising srPP may be used as structural supports in cases and backpacks, such as rucksacks, radio cases, drone cases, bike boxes and bags, surf bags, and music cases, for example. This provides significant compression resilience and increase stiffness without excessive weight gain. It also maintains a preferred shape for the body of the bag.

Figures 29, 30:
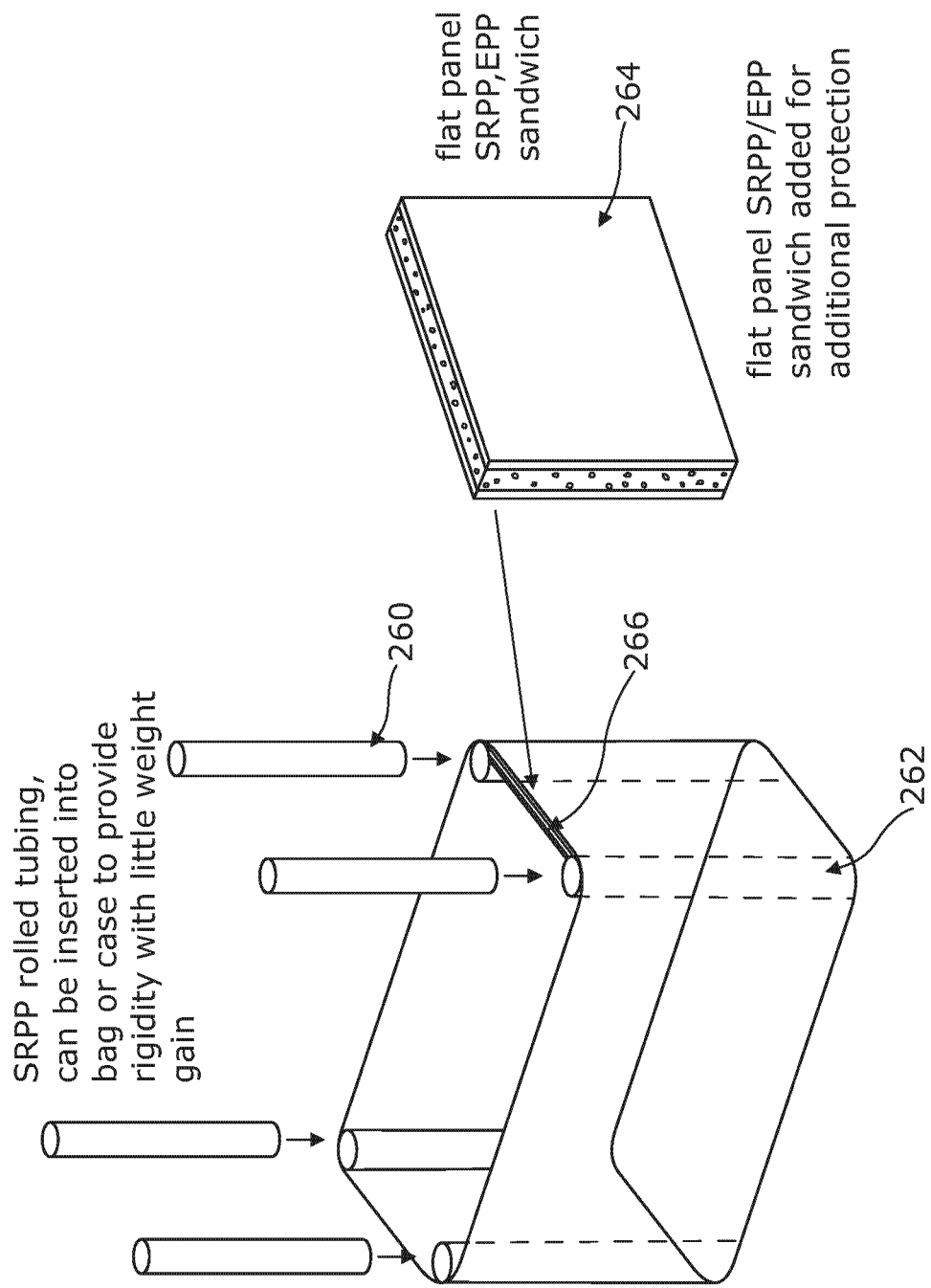
FIGS. 29 and 30 illustrate how the reinforcement member of FIG. 25 may be added to a case or other article.

FIGS. 29 and 30 illustrate how such reinforcement members 260 may be added to cases, which may include channels or sleeves 262 to receive the reinforcement or support members.

In addition a srPP flat sheet 264 when combined with ePP (as described above, for instance), can form a lightweight and highly protective mid layer which can optionally be overlaid with fabric (e.g. camouflaged material) made form canvas or nylon, such as for example, Crye Multicam®. Such reinforcement material may be used in the production of rigid protective pouches for the use by the military, backpacks, military radio packs, bike bags, bow and gun cases, hunting equipment and similar applications (such as in the police or other emergency services). Such flat panels may be received within a slot 266 in the body of a bag, to form a wall of the bag.

There are additional advantages to such materials as they improve the shielding of radios and other metal objects, such as guns, from infrared and radar detection. These improvements are significant, especially over aluminium or simple canvas. Furthermore, this reinforcement material provides superior article protection for very little weight gain.

Figure 31:
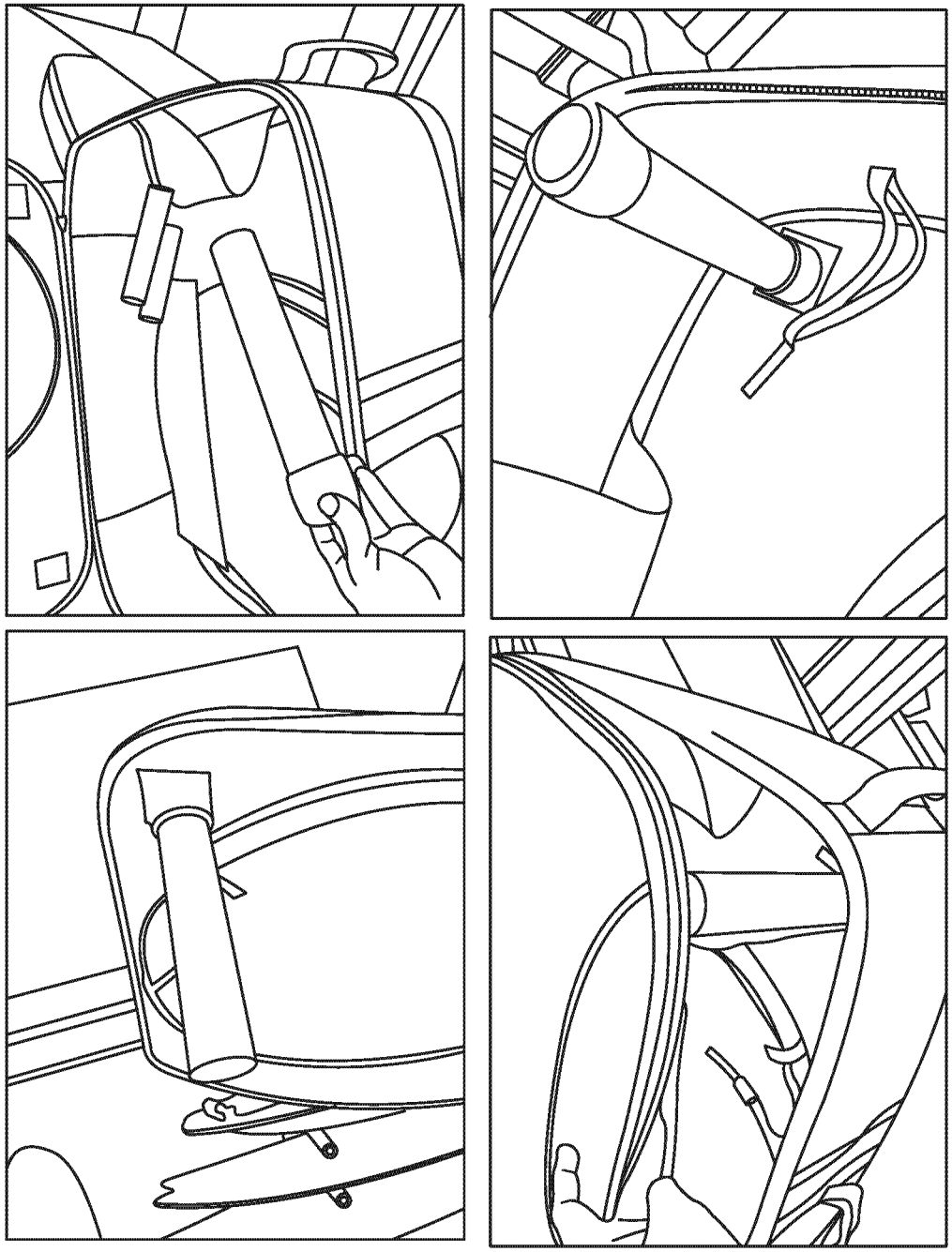
FIG. 31 shows a photograph of the reinforcement member of FIG. 25 added to a case or cover.

FIG. 31 shows photographs of example reinforcement members being placed within a bag or case. FIG. 31 shows photographs of example reinforcement members (in this case, srPP wrapped around a rod and held in place with hook and loop fasteners).

Uses of srPP

Figure 32:
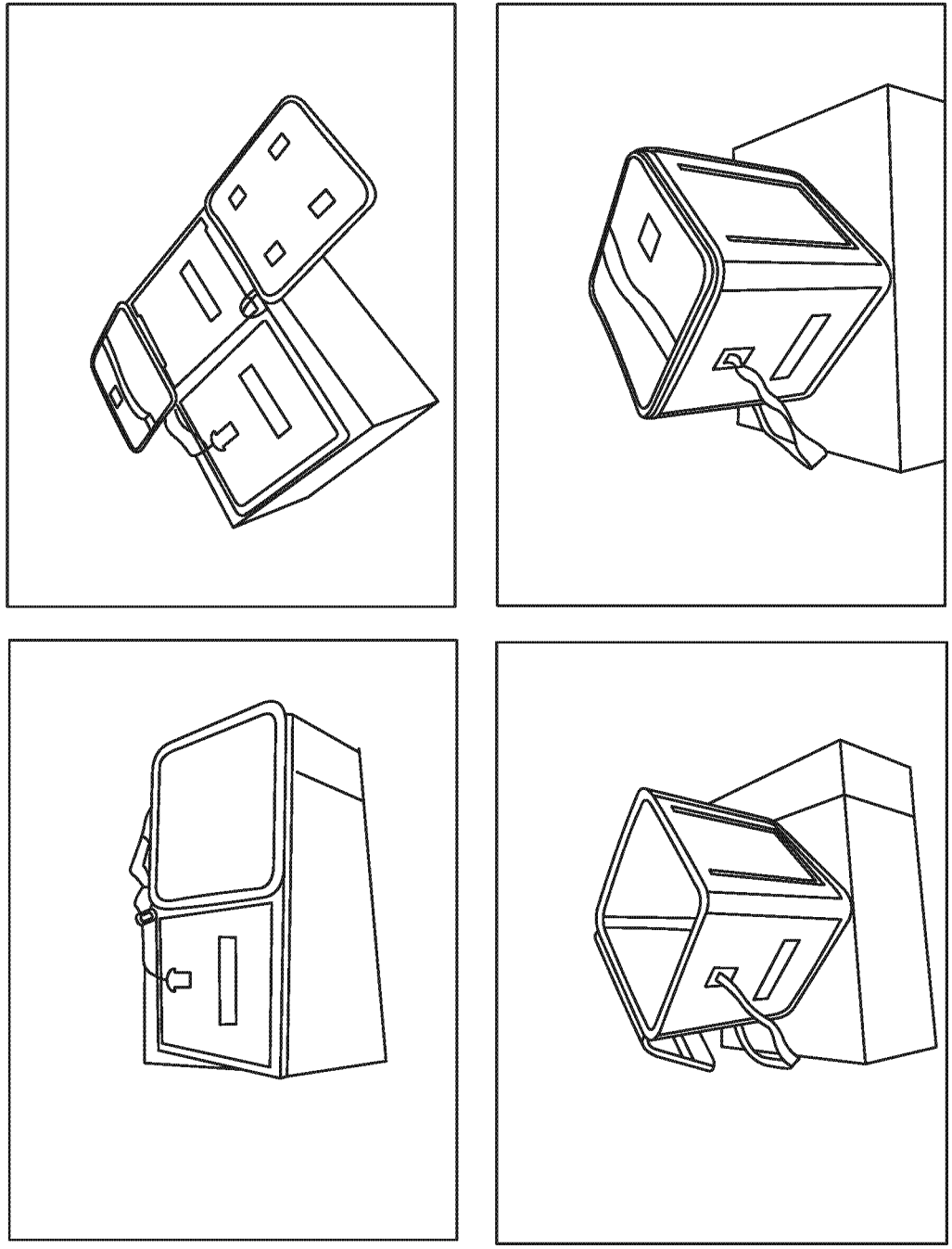
FIG. 32 shows a foldable box or pallet cover comprising srPP.

FIG. 32 shows photographs of an example collapsible case (in the form of a cube that packs flat). Each wall of the cube has been formed using a multilayer material comprising srPP and a substrate, as described above. Each wall of the cube or packing case is hingedly attached to at least one other wall of the cube or packing case. The other edges of the walls can be secured to form a 3D cube using fasteners, such as Velcro. Advantageously, the packing case is lightweight, robust, but can pack flat when not in use.

The use of flat sheet srPP and/or ePP when combined with stitching, gluing or riveting (or other bonding) techniques can also then be used for manufacture of personal protective gear (for example, in the military) such as hard knuckled combat gloves (see FIG. 33), or protective body plates or body armour. Similar techniques can be used for gloves for hobbies such as gardening, cycling, fencing, horse riding, hunting or sports such as martial arts (see FIG. 34). The protective gear may also be used in forestry and rigging type jobs such as scaffolding etc.

Figure 33:
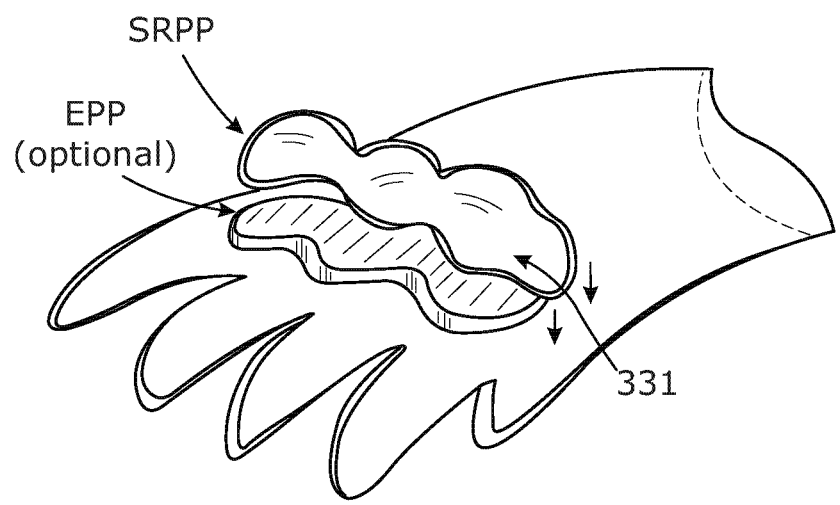
FIGS. 33 and 34 illustrate further uses of srPP to reinforce gloves or other apparel.
Figure 34:
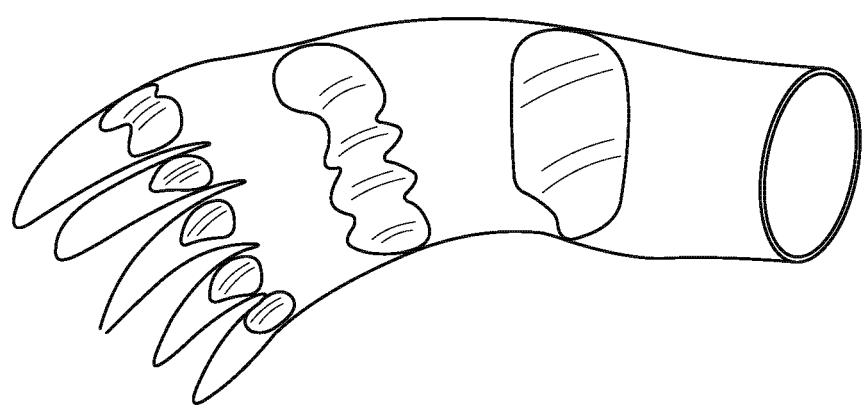

In the examples shown in FIG. 33 and FIG. 34 srPP and optionally ePP panels 331 are stitched into or onto gloves as extra protection on knuckles, fingers, palms and elsewhere (in particular the regions of the glove experiencing highest wear-and-tear).

Figure 35:
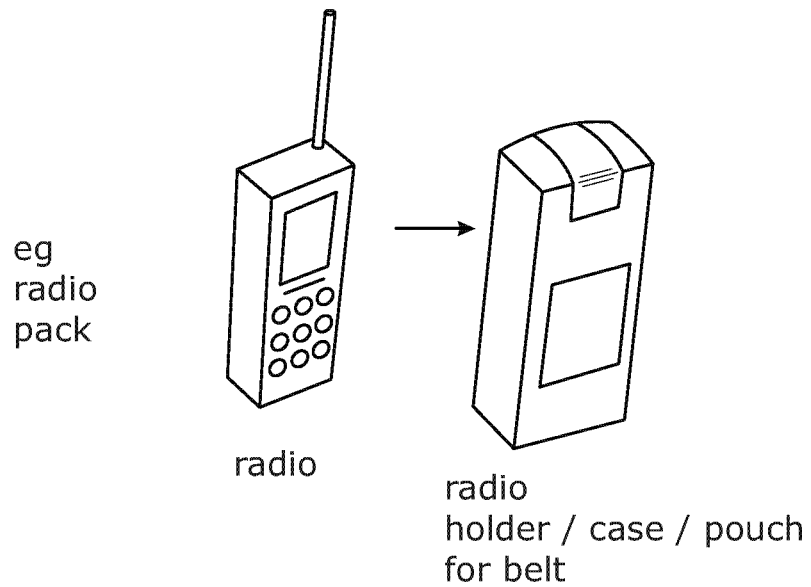
FIG. 35 illustrates the use of srPP to form pouches for military purposes, such as a radio holder to pouch for connection to a belt hook.
Figure 36:
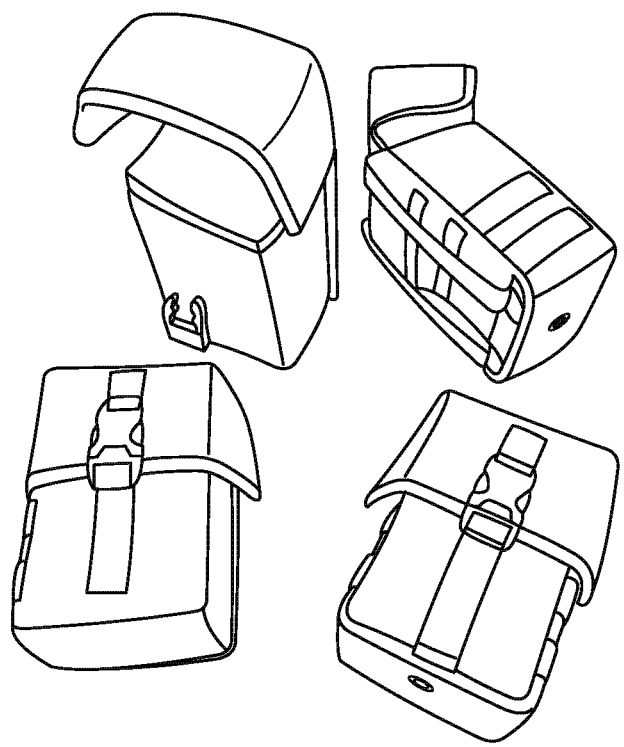
FIG. 36 shows a photograph of an example military pouch.

A further example of the uses for srPP, either as a flat panel or in the multilayer structure described above, is shown in FIGS. 35 and 36. In particular, FIG. 36 shows a pouch or case for military purposes. FIG. 35 shows a radio pack or holder. The pouch or holder of FIGS. 35 and 36 can be attached to a belt, for example. The use of srPP may be beneficial in these examples, as a result of its lightweight properties, whilst also being hardwearing.

Figure 37:
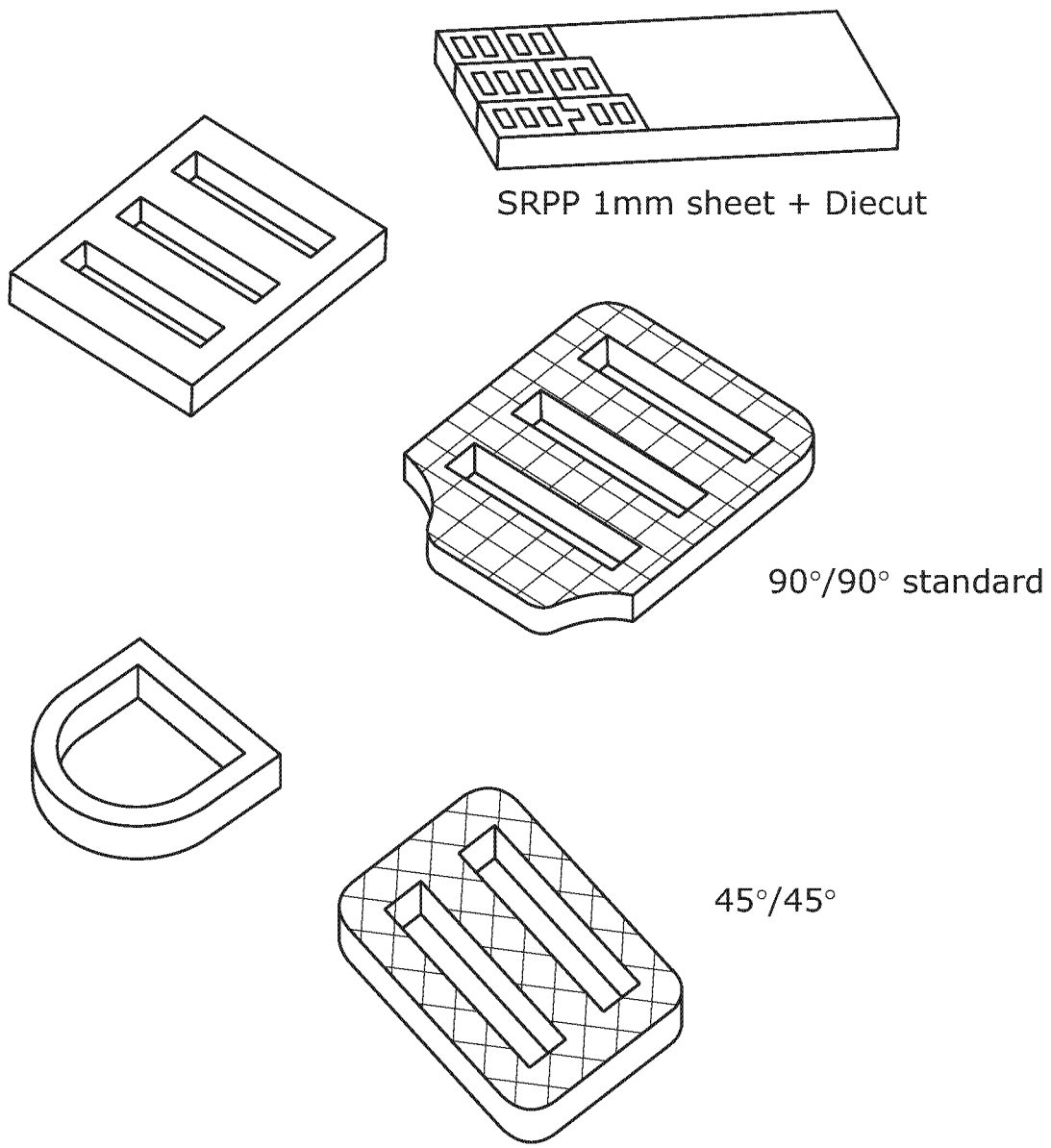
FIG. 37 shows a schematic diagram of buckles formed from srPP.
Figure 38:
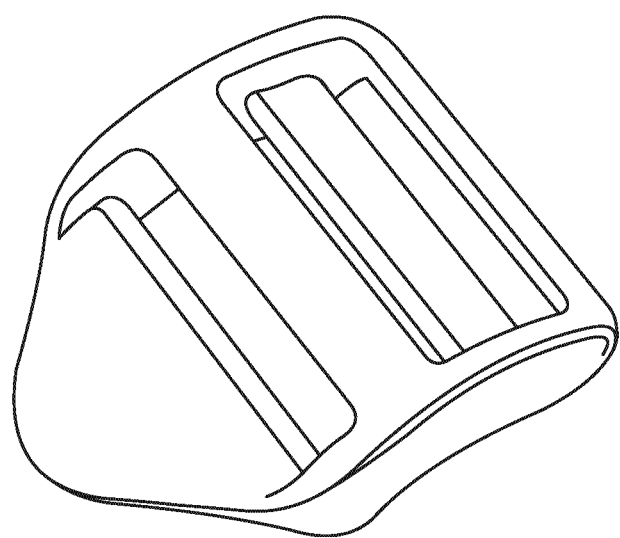
FIG. 38 shows a perspective view of a prior art buckle.

FIG. 37 shows some example drawings of a buckle formed from srPP. In examples shown in FIG. 37, the reinforcing fibres of the srPP may be arranged so as to provide additional strength to the buckle. For instance, successive layers of the reinforcing fibres may be arranged perpendicular to each other, and also parallel or perpendicular to the cut-outs of the buckle. Alternatively, successive layers of the reinforcing fibres may be arranged perpendicular to each other, and also 45° to the cut-outs of the buckle. In a further example, the buckle may also be a hybrid aramid/srPP buckle. For comparison, FIG. 38 shows an existing polymer buckle, formed of plastic.

Figure 39:
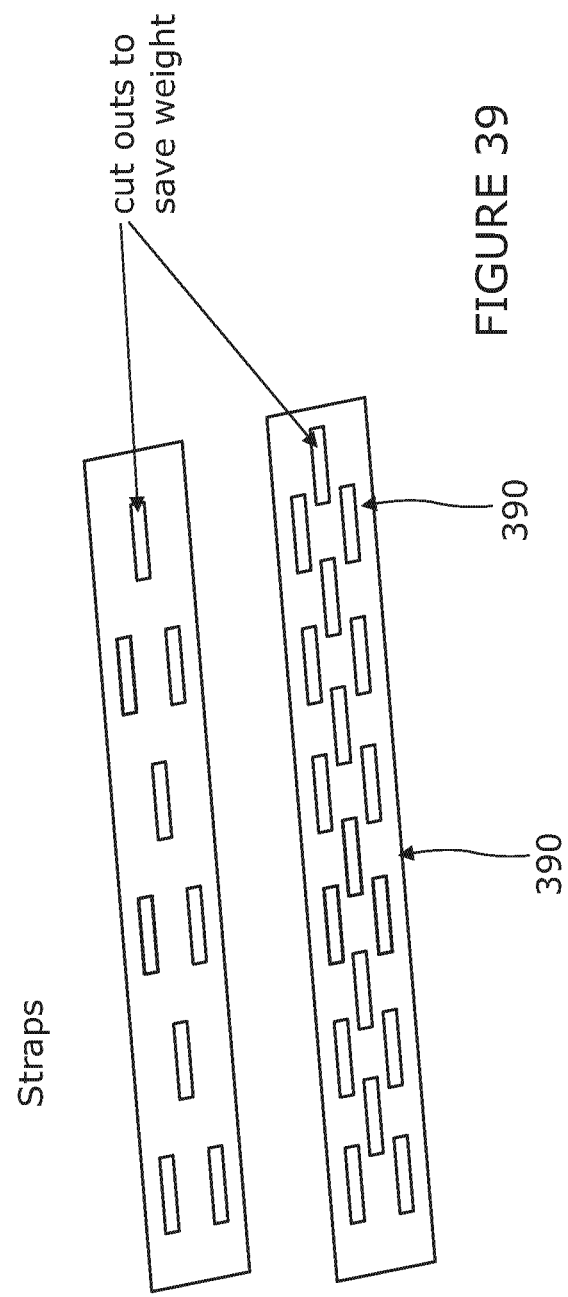
FIG. 39 shows a schematic diagram of straps formed from srPP.

FIG. 39 shows a strap made of strips of srPP 390. Advantageously, perforations or cut-outs 392 may be made in the srPP strips. This is to reduce the overall weight of the straps, and is possible due to the strength and robustness of the srPP material. Thus, even with the given perforations, the straps maintain sufficient strength.

Figure 40:
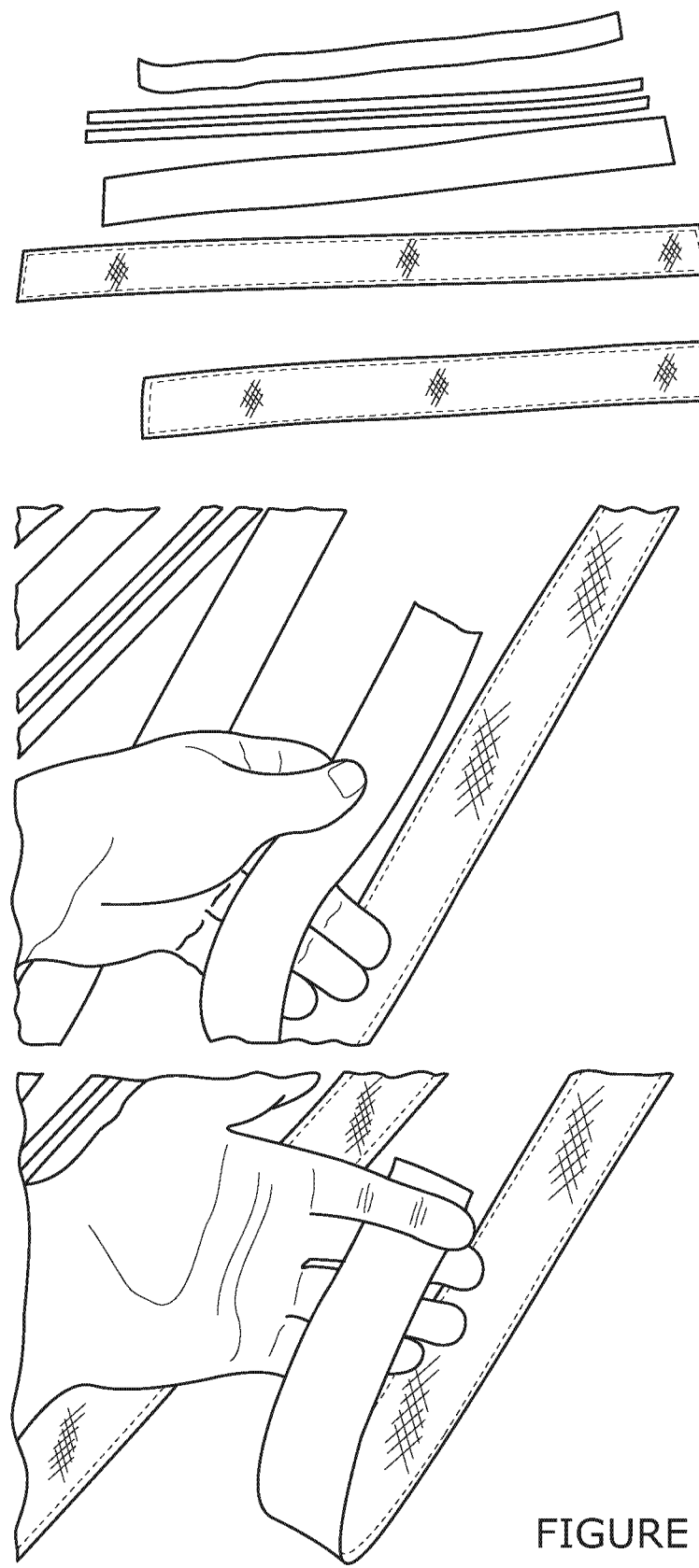
FIGS. 40, 41 and 42 show photographs of example straps formed from srPP.

FIG. 40 show example straps formed from flexible srPP material. This has a much higher strength to weight ratio than webbing (e.g. nylon) straps. Nevertheless, the srPP material can be used to laminate a known webbing strap, for reinforcement.

Straps formed from srPP provide much thinner, stronger and lighter straps. Optionally, the srPP may be shrouded in a polypropylene or other webbing material to soften or shield the edges of srPP.

Figure 41:
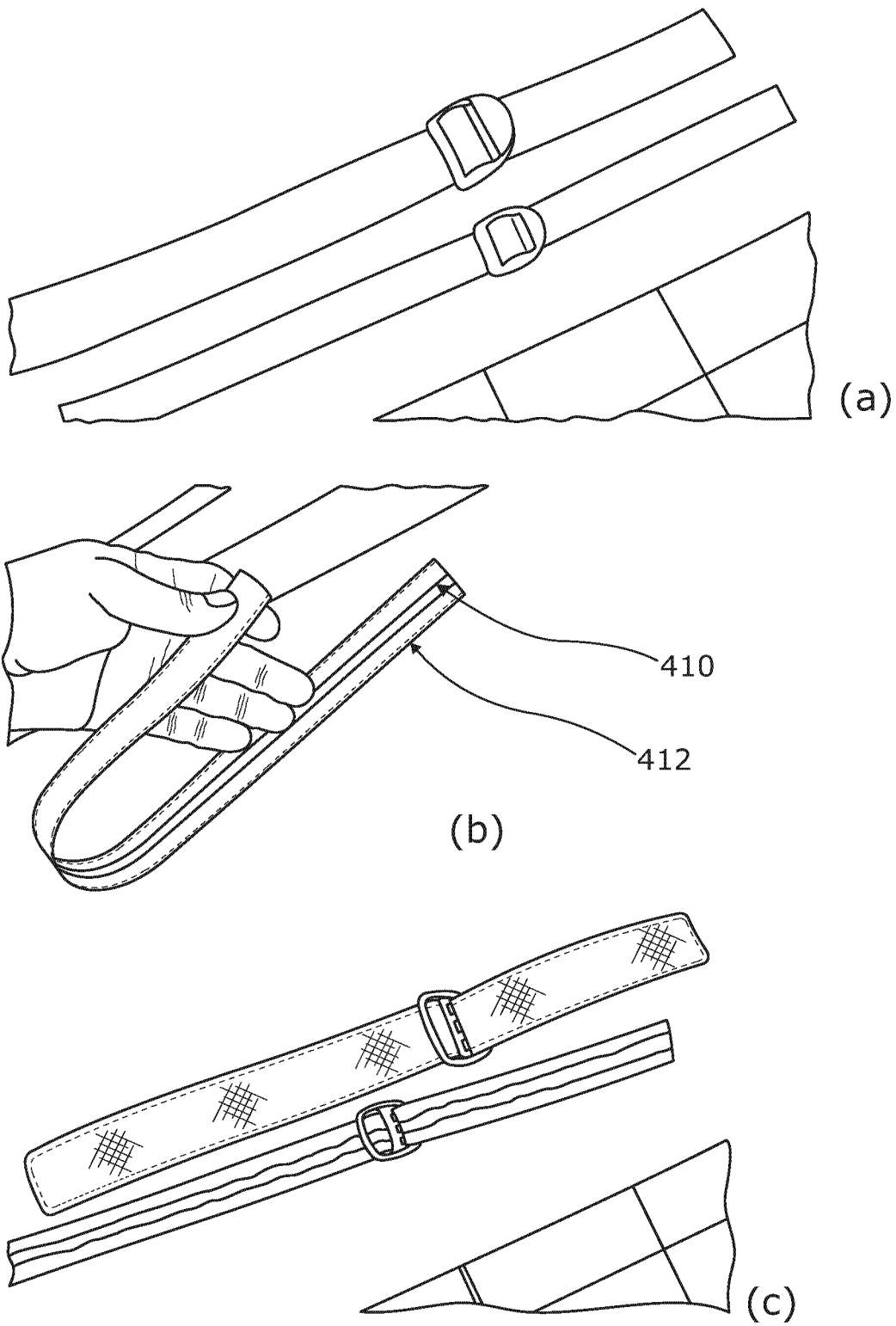
Figure 42:
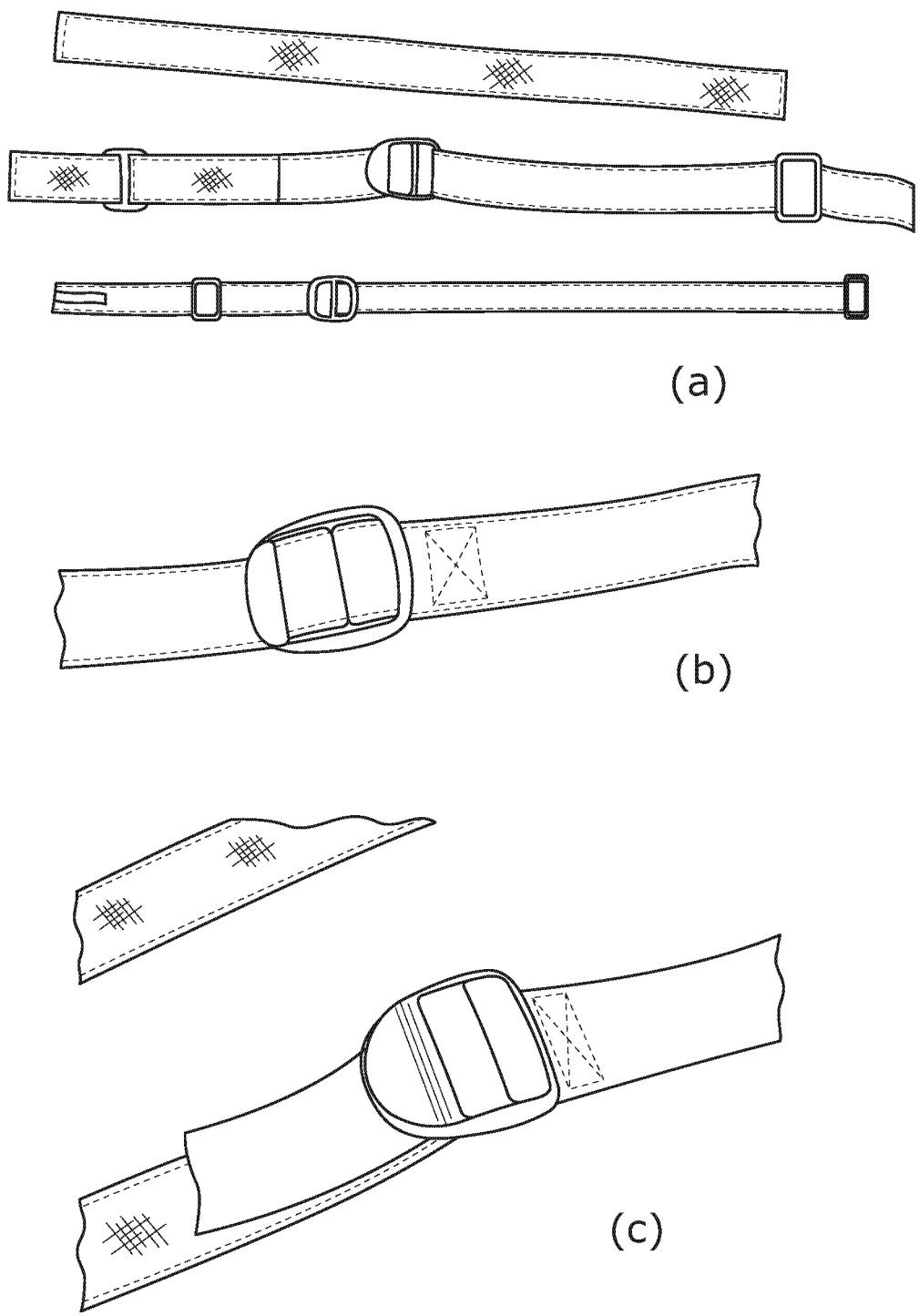

FIG. 41, and FIG. 42 shows various types of strap incorporating srPP. In the examples of FIGS. 41(b) and (c) is can be seen that a narrow strip of srPP 410 is used to reinforce a webbing strap 412. This provides the additional advantages of the strength and robustness of the srPP material, without excessive increase in weight. For instance, the srPP strip may comprise a trip having a width around 75% or less, or 50% or less of the width of the webbing strap it is used to reinforce.

Figure 43:
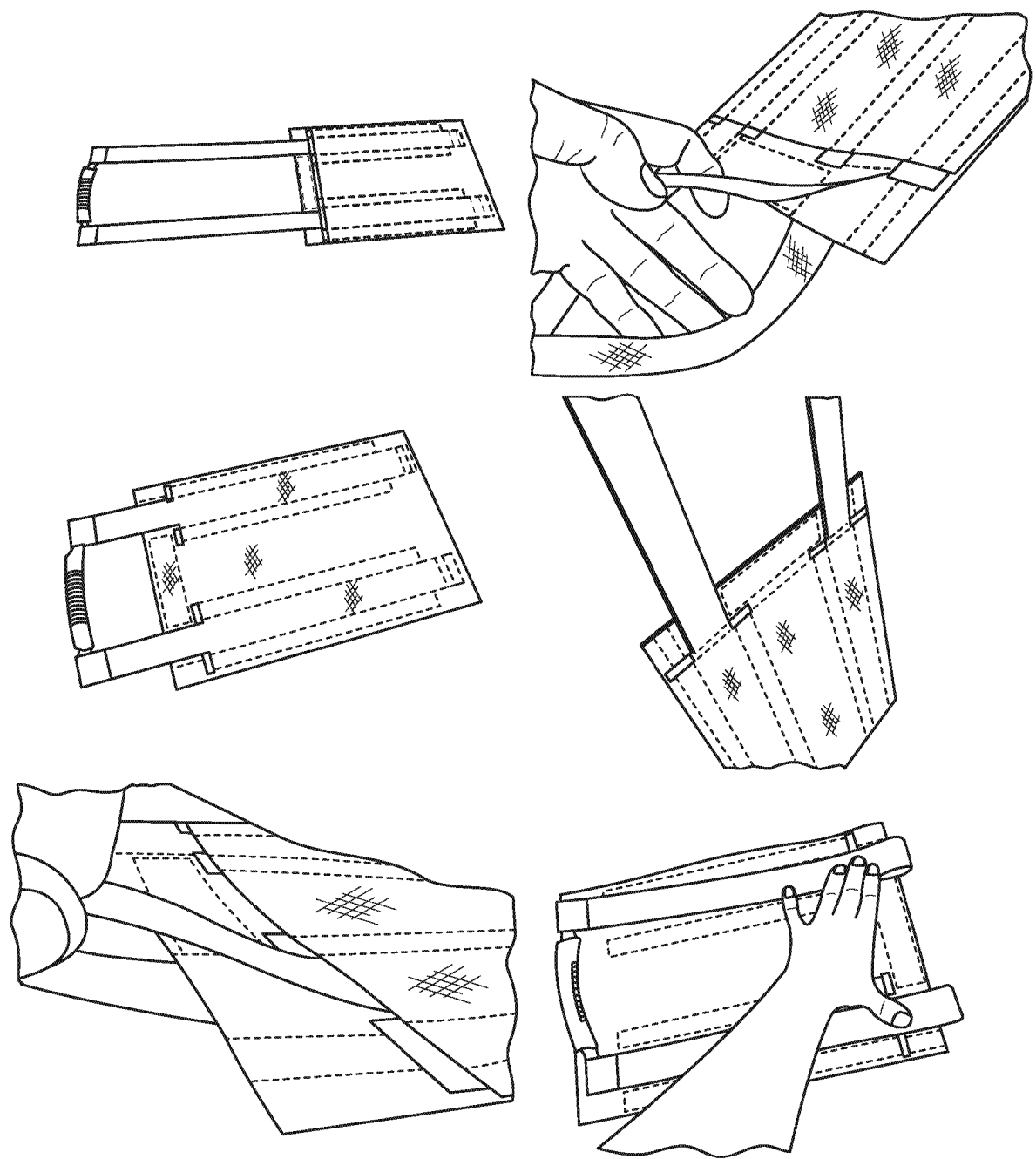
FIG. 43 shows photographs further example uses of srPP.

FIG. 43 shows photographs of example cases highlighting the structure of a handle, also formed from srPP (flexible or not heat fixed). In particular, FIG. 43 shows photographs of an example handle for a case, bag or cover. In one example, the handle folds back and is fixed by hook and loop fasteners when stowed or not in use.

Figure 44:
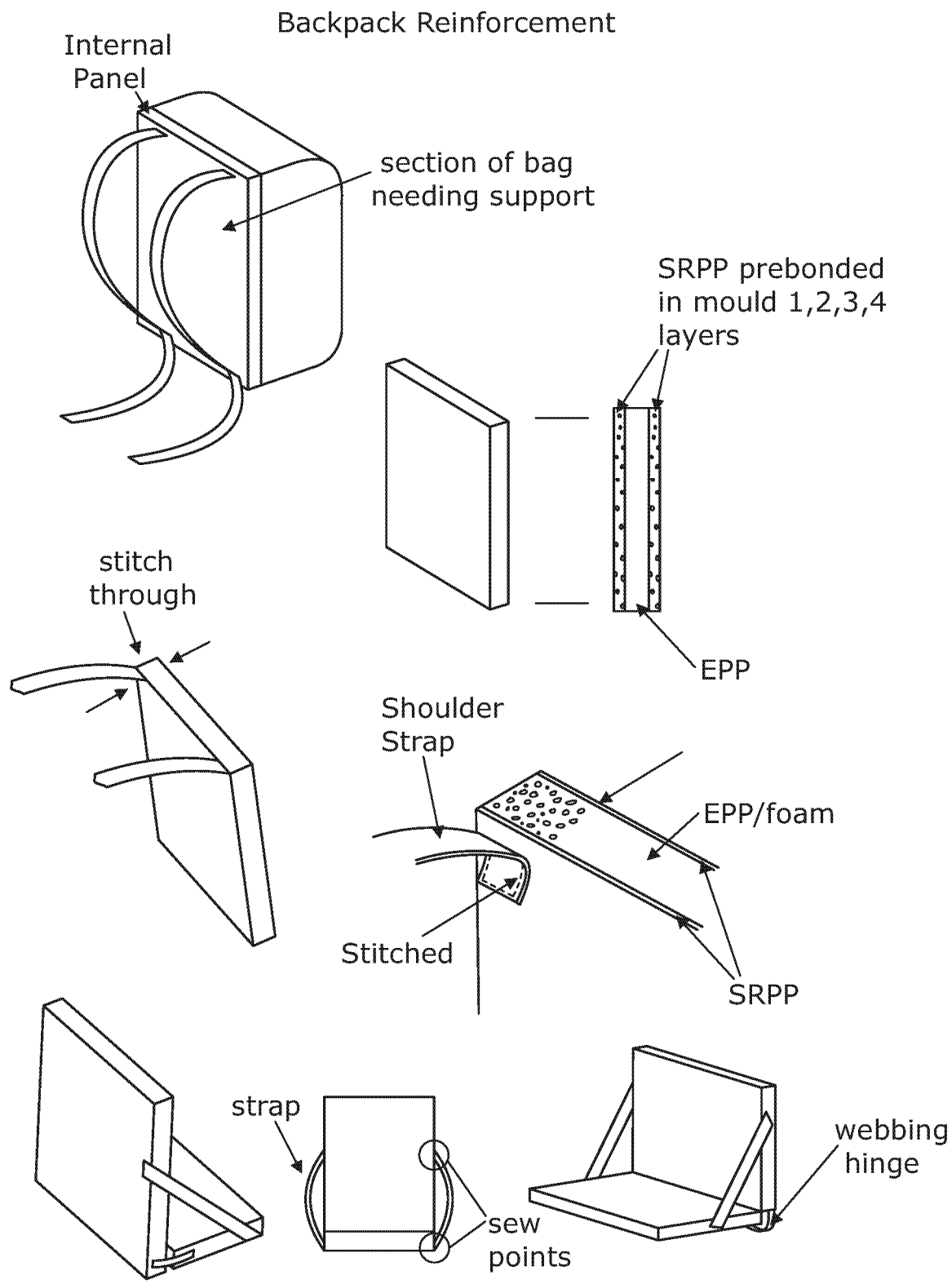
FIG. 44 shows perspective views of portions of a backpack including reinforcement portions and straps described with reference to other figures.

FIGS. 44 to 47 show photographs of bags and straps formed using and srPP panel, or a panel of multilayer material (srPP and a substrate), the production method of which was previously described. FIG. 44 shows some perspective views of a backpack including a reinforcing section, straps and breathable areas. The straps and buckles may be those shown in FIGS. 37 to 42 and the reinforcement sections may be those illustrated in FIGS. 25 to 31.

When foam/ePP is sandwiched between srPP in in-mould production further enhancements in properties can be shown. The foam greatly increased stiffness whilst having a slight elasticity. This provides an improved back panel stiffening option. This can also reduce weight compared with traditional metal framed back panels (e.g. army backpacks). The backpacks may include reinforcing panels or sections of srPP in its walls.

Figure 45:
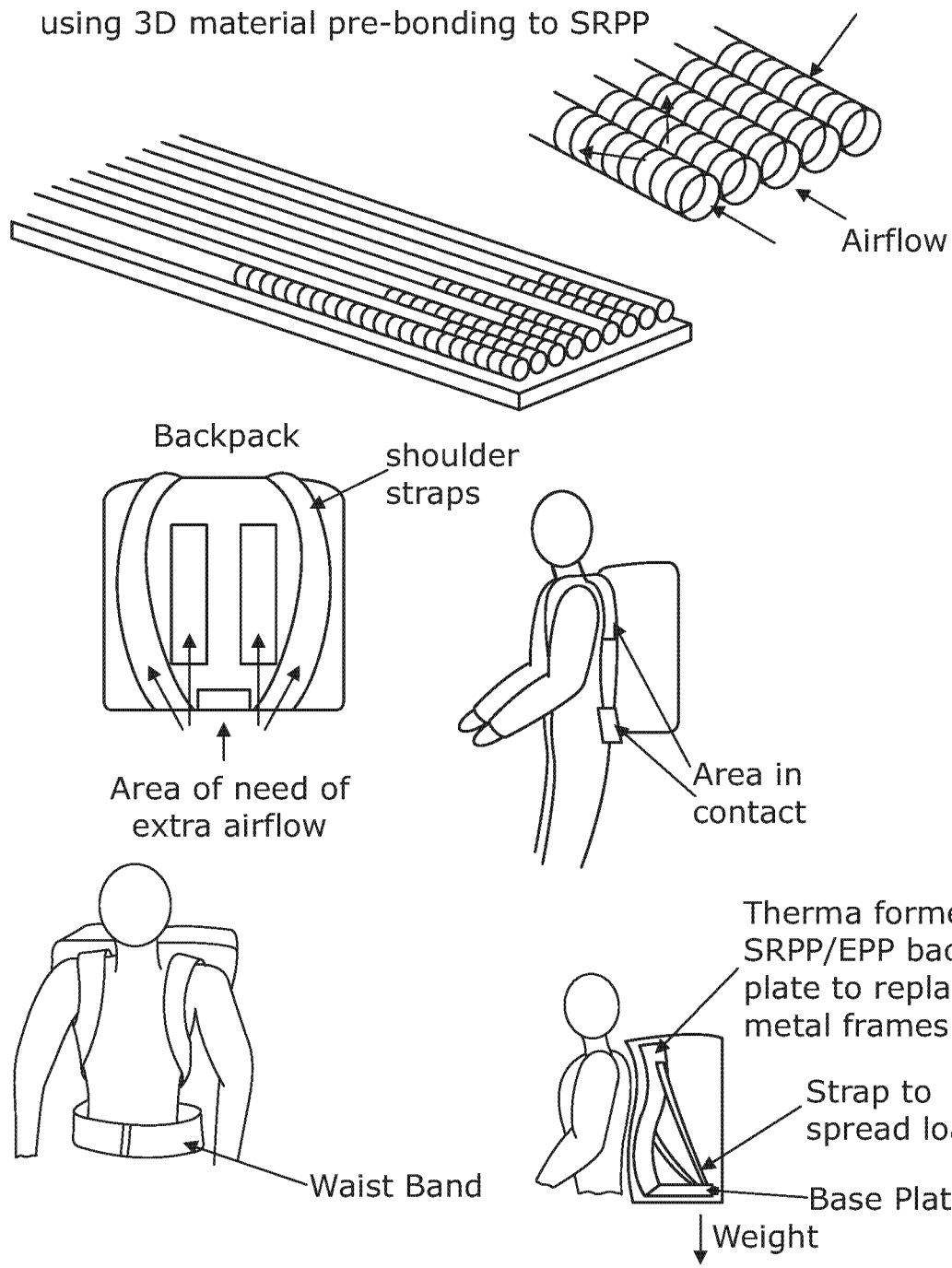
FIG. 45 shows a series of figures illustrating further example backpacks and straps, including a breathable back panel.
Figure 46:
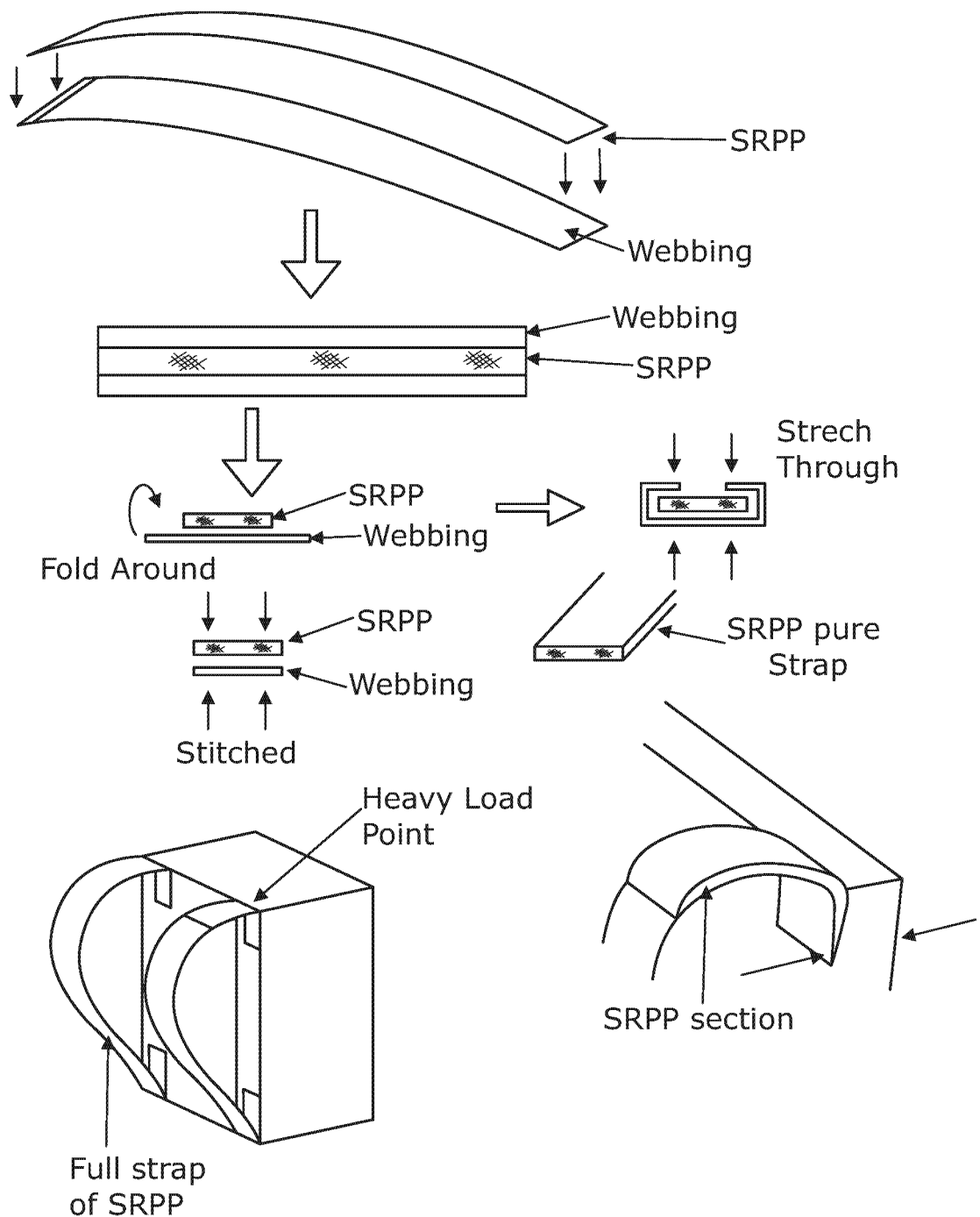
FIG. 46 shows further example straps and their method of manufacture and application in backpacks and cases.

FIG. 45 shows the structure of a backpack including a further material that may be bonded to srPP, especially for the straps. This provides an improved breathability and airflow. An example material is Armorweave® but other hollow fibered or tubed material may be used. FIG. 46 illustrates enhancements to the srPP-based strap system, structure and method of manufacture.

Figure 47:
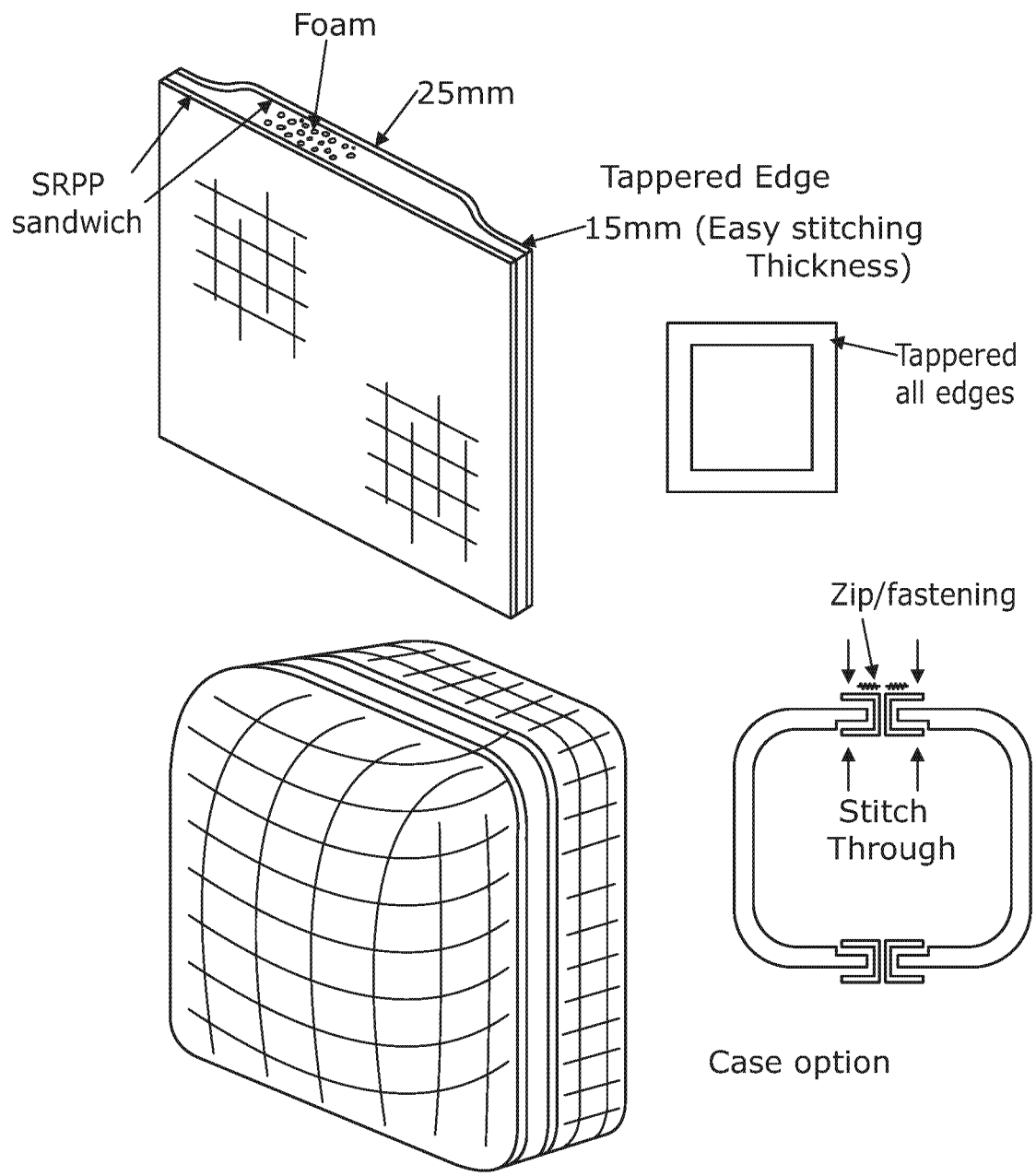
FIG. 47 shows further example cases and reinforcement materials.

FIG. 47 shows a further example case structure and form, including srPP.

The use of flat sheet srPP and/or ePP when combined with stitching, gluing or riveting (or other bonding) techniques can also be used to make protective gear for humans (body armour and the like, or protective garments for animals (including working animals such as horses and dogs). Such protective garments could be employed for military and emergency services use (e.g. in riots, for customs sniffer dogs), or alternatively for sports use (such as show jumping, horse-riding, or polo). SrPP and ePP give excellent protection in view of its weight properties, and is therefore beneficial compared to more than other currently used materials can offer.

FIG. 48 shows an example of an equine protective garment, formed from srPP. In particular, FIG. 48(b) shows a horse coat, for covering the substantial part of the horse torso. The garment is comprised of flat panel layers of srPP. Although the garment is shown in FIG. 48 is a horse coat, it will be understood that a similar structure with similar properties could be used for a protective garment for another animal, for example a dog or other working animal. In fact, human body armour may also be produced with similar characteristics.

In one embodiment (as shown in FIG. 48(a)), the garment is composed of a layer of srPP 480 on a foam substrate layer 482 (such as ePP). The garment further comprises an inner, lining layer 484 and an outer fabric 486. The outer fabric 486 may have waterproof or decorative properties, for instance, whereas the lining layer 484 may be selected for comfort.

The protective garment of FIG. 48 includes perforations, cut-out or vents 488. This is to allow the skin of the animal wearing the garment to breathe and for perspiration to be released through the protective garment. Such perforations 488 also help to further reduce the weight of the garment. Nevertheless, in view of the strength of the srPP material and the ability to withstand tears and other damage due to penetration, the garment still provide superior protection, even with the described perforations. The perforations may be may in the garment by drilling, waterjet or laser cut, for example.

Figure 49:
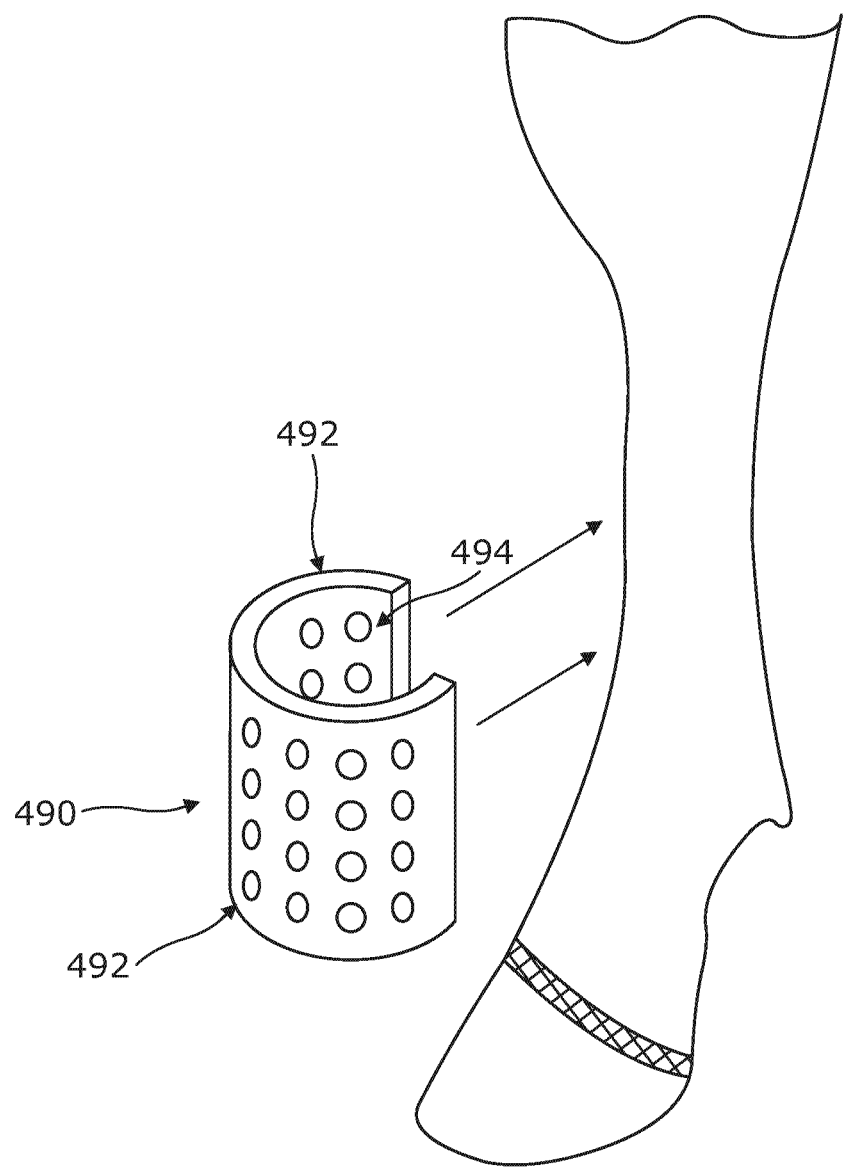
FIG. 49 shows a schematic figure of srPP used for equine protective garments.

FIG. 49 shows an alternative protective garment, which is both breathable and lightweight. In particular, the garment shown in FIG. 49 is for a horse, although it will be understood that a similar garment can be used for other animals. Specifically, FIG. 49 shows a sheath or wrap 490 for an animal's limb. The sheath comprises a first layer of foam such as ePP 494. This provides a resilient shape, contoured to closely fit the animal limb. The substrate is covered with an outer layer of srPP 492. The ePP provides added strength an protection from penetration or tearing of the sheath, without significant additional weight. The sheath may be fitted or contoured to fit the animal limb simply as a result of its shape. In a preferred example, the sheath further comprises fasteners to secure the sheath around the animal limb. The fasteners may be Velcro®, poppers or zips, for instance. The sheath may include holes, perforations or cut outs 496, to allow the animal's skin to breath under the garment, and for perspiration to escape.

FIG. 50 shows a hat or cap formed from srPP. In a first example, a hat band 500 is formed using a foam substrate 502 (such as ePP) to contour the hat band to an appropriate size and shape. The hat band is then covered with a layer of srPP 504. A top section 506 for the hat or cap can then be applied or joined to the hat band, the top section formed from a flat panel of srPP 508. Optionally, the srPP top section may be layered on an ePP substrate, in order to improve the shape or rigidity of the hat or cap. The joined top section and hat band can be covered by a finishing fabric 510 (for example, which is decorative, or includes a pattern such as a camouflage pattern). Such a hat or cap 512 offers lightweight but durable head protection.

Figure 51:
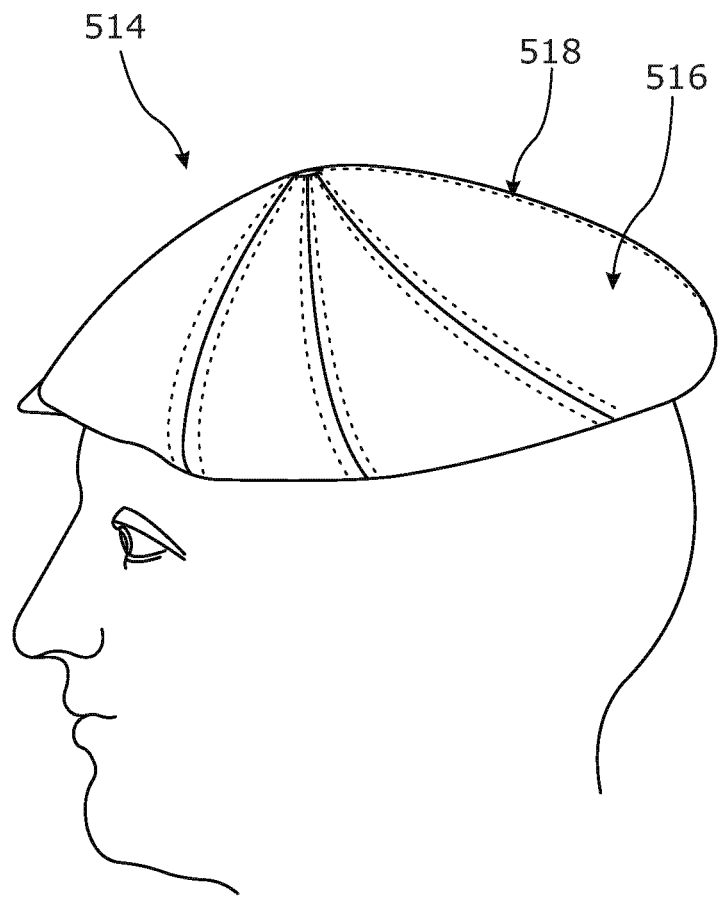
FIG. 51 shows a schematic figure of srPP used for a cover for a hat or helmet.

FIG. 51 describes a cover 514 for an existing hat, helmet or cap. The cover 514 could, for instance, be retrofitted to an existing hat, helmet or cap, or could be a removable cover. For instance, the cover could be used to cover a military or emergency services head protection, or in sports (such as to cover a cycle helmet, or a horse riding helmet). The cover consists of panels 516 of srPP, stitched 518 together to form a cover of an appropriate shape or size. The stitched panels of srPP may themselves be covered with a further material for waterproofing or decorative purpose, for instance. The cover may include fasteners, to attach to the existing hat or helmet, or may include an elasticated band to wrap around the edges of the existing hat or helmet.

Many combinations, modifications or alterations to the features of the above embodiments will be readily apparent to the skilled person and are intended to form part of the invention.

The cover or case within this disclosure may be used for transportation of any type of goods including (but not exclusively) medical, military, aeronautical (for instance, plane cover, prop covers, or parts covers), aerospace, emergency services and construction equipment. The case or cover may further be used to house specialised sporting equipment or other hobby equipment such as musical equipment, photography equipment, computer equipment, audio-visual equipment, fine art items and pictures, monitors, motorbike accessories, drones, or dinghy covers. In addition, the cases or covers may be used for protection of bottled goods such as fine wines, champagnes, whiskeys, condiments and foodstuffs.

The invention claimed is:

1. A protective material comprising:
   a layer of a substrate;
   a layer of self-reinforcing polypropylene (srPP), arranged to cover at least part of an outer surface of the substrate;
   wherein the layer of srPP and the layer of the substrate are bonded, and wherein the bonding comprises:
   a stitch, a rivet or a staple through the layer of srPP and the substrate; or
   the layer of srPP and the substrate being glued together; or
   the layer of srPP and the substrate being fused together by prior application of heat.

2. The protective material of claim 1, wherein the layer of srPP is a first layer of srPP, and the protective material further comprises:
   a second layer of self-reinforced polypropylene (srPP) on the substrate, arranged so that the substrate is between the first and second layer of self-reinforced polypropylene (srPP); and
   wherein the first and second layers of srPP and the substrate are bonded, wherein the bonding comprises:
   a stitch, a rivet or a staple through the first layer of srPP, the substrate and the second layer of srPP; or
   the first layer of srPP, the substrate and the second layer of srPP being glued together; or
   the first layer of srPP, the substrate and the second layer of srPP being fused together by prior application of heat.

3. The protective material of claim 1, wherein the substrate is a type of foam.

4. The protective material of claim 1, wherein the substrate is selected from any one or more of EVA, EPE, EPS, ePP, and or natural fibers.

5. The protective material of claim 2, wherein the first layer of srPP, the substrate and the second layer of srPP are bent or formed into a shape or curve.

6. The protective material of claim 2, further comprising a lining layer adjacent the first or second layer of self-reinforced polypropylene (srPP), such that the said first or second self-reinforced polypropylene (srPP) is between the substrate layer and lining layer.

7. The protective material of claim 6, further comprising a fabric layer, configured such that the substrate, the first and the second layer of self-reinforced polypropylene (srPP) are arranged between the lining layer and the fabric layer.

8. The protective material of claim 1, further comprising perforations or cut-outs.

9. A protective garment formed from the protective material of claim 1.

10. The protective garment of claim 9, configured for wearing by a human, a horse, a dog, or another working animal.

11. The protective garment of claim 9, wherein the protective garment is one of the group comprising: a glove, a body armour, a protective jacket, a protective limb sheath, a hat, a helmet, a protective shell or cover for an existing hat or helmet, an equine garment, a canine garment, a horse coat, a dog coat, a horse limb sheath, a dog limb sheath.

12. The protective garment of claim 9, wherein the protective garment is a glove, and wherein panels of the protective material are incorporated at the knuckle regions of the glove.

13. The protective garment of claim 9, wherein the protective garment is for use by the military, police or emergency services.

14. A method of manufacture for a protective material, comprising the steps of:
   providing a layer of a substrate;
   providing a layer of self-reinforcing polypropylene (srPP), arranged to cover at least part of an outer surface of the substrate; and
   bonding the layer of srPP and the layer of the substrate by:
   stitching, riveting or stapling through the layer of srPP and the substrate; or
   gluing the layer of srPP and the substrate together; or
   fusing the layer of srPP and the substrate together by application of heat.

15. The method of manufacture of claim 14, wherein the layer of srPP is a first layer of srPP, and further comprising, prior to bonding:
   placing a second layer of self-reinforced polypropylene (srPP) on the substrate, so that the substrate is arranged between the first and second layer of self-reinforced polypropylene (srPP); and
   wherein the bonding step comprises:
   bonding the first and second layers of srPP and substrate by:
   stitching, or riveting through the first layer of srPP, the substrate and the second layer of srPP; or
   gluing the first layer of srPP, the substrate and the second layer of srPP together; or
   fusing the first layer of srPP, the substrate and the second layer of srPP together by application of heat.

16. The method of manufacture of claim 14, wherein the substrate is a type of foam.

17. The method of manufacture of claim 15, further comprising, before or during the bonding step, bending or forming the first layer of srPP, the substrate and the second layer of srPP into a shape or curve.

18. The method of manufacture of claim 17, further comprising:
   cutting through each of the first layer of srPP, the substrate and the second layer of srPP to create a cut out segment; and
   overlapping at least a first edge of the cut out segment with at least a second edge of the cut out segment to form the first layer of srPP, the substrate and the second layer of srPP into the shape or curve.

19. The method of manufacture according claim 15, further comprising providing a lining layer, and arranging the lining layer adjacent the first or second layer of self-reinforced polypropylene (srPP), such that the said first or second layer of self-reinforced polypropylene (srPP) is between the substrate layer and lining layer.

20. The method of manufacture according claim 19, further comprising providing a fabric layer, and arranging the substrate, the first and the second layer of self-reinforced polypropylene (srPP) between the lining layer and the fabric layer.

* * * * *